United States Patent
Hayashi et al.

(10) Patent No.: US 6,294,242 B1
(45) Date of Patent: Sep. 25, 2001

(54) MAGNETIC RECORDING MEDIUM

(75) Inventors: Kazuyuki Hayashi; Hiroko Morii, both of Hiroshima; Mamoru Kamigaki, Kure; Yasuyuki Tanaka, Onoda; Keisuke Iwasaki, Hiroshima, all of (JP)

(73) Assignee: Toda Kogyo Corporation, Hiroshima-ken (JP)

( * ) Notice: Subject to any disclaimer, the term of this patent is extended or adjusted under 35 U.S.C. 154(b) by 0 days.

(21) Appl. No.: 09/557,631

(22) Filed: Apr. 21, 2000

Related U.S. Application Data

(63) Continuation-in-part of application No. 09/311,641, filed on May 14, 1999, now abandoned.

(30) Foreign Application Priority Data

May 15, 1998 (JP) .................................................. 10-152162
May 14, 1999 (EP) .................................................. 99303761

(51) Int. Cl.$^7$ .................................................. G11B 5/706
(52) U.S. Cl. .................. 428/141; 428/328; 428/329; 428/403; 428/404; 428/405; 428/446; 428/447; 428/694 BA; 428/900
(58) Field of Search ................................... 428/141, 328, 428/329, 403, 404, 405, 446, 447, 694 BA, 900

(56) References Cited

U.S. PATENT DOCUMENTS

| | | | |
|---|---|---|---|
| 4,076,890 | 2/1978 | Yamada et al. | 428/337 |
| 5,422,193 | 6/1995 | Nakamura et al. | 428/694 BG |

FOREIGN PATENT DOCUMENTS

| | | |
|---|---|---|
| 0913431A2 | 5/1999 | (EP) . |
| 0924690A2 | 6/1999 | (EP) . |
| 0936507A2 | 8/1999 | (EP) . |
| 3-102617 | 4/1991 | (JP) . |

*Primary Examiner*—Stevan A. Resan
(74) *Attorney, Agent, or Firm*—Nixon & Vanderhye

(57) ABSTRACT

A magnetic recording medium of the present invention comprises: a non-magnetic base film; and a magnetic recording layer comprising a binder resin and black magnetic acicular composite particles having an average particle diameter of 0.051 to 0.72 $\mu$m, comprising: magnetic acicular core particles; a coating formed on surface of said magnetic acicular core particles, comprising at least one organosilicon compound selected from the group consisting of: (1) organosilane compounds obtainable from alkoxysilane compounds, (2) polysiloxanes or modified polysiloxanes, and (3) fluoroalkyl organosilane compounds obtainable from fluoroalkylsilane compounds; and a carbon black coat formed on said coating layer comprising said organosilicon compound, in an amount of 0.5 to 10 parts by weight based on 100 parts by weight of said magnetic acicular particles.

Such a magnetic recording medium capable of not only showing a low light transmittance and a low surface resistivity even when the amount of carbon black fine particles added to a magnetic recording layer thereof is as small as possible, but also having a smooth surface.

39 Claims, 4 Drawing Sheets

(×30000)

(×30000)

(×30000)

(×30000)

(×30000)

(×30000)

(×30000)

MAGNETIC RECORDING MEDIUM

CROSS REFERENCE TO RELATED APPLICATION

This application is a continuation-in-part of application Ser. No. 09/311,641, filed May 14, 1999, the entire content of which is hereby incorporated by reference in this application now abandoned.

BACKGROUND OF THE INVENTION

The present invention relates to a magnetic recording medium, and more particularly, to a magnetic recording medium capable of not only showing a low light transmittance and a low surface resistivity even when the amount of carbon black fine particles added to a magnetic recording layer thereof is as small as possible, but also having a smooth surface by using therein black magnetic acicular composite particles which are excellent in dispersibility in a vehicle due to less amount of carbon black fallen-off from the surface of each black magnetic acicular composite particle, and have a high blackness and a low volume resistivity.

With a development of miniaturized, lightweight video or audio magnetic recording and reproducing apparatuses for long-time recording, magnetic recording media such as a magnetic tape and magnetic disk have been increasingly and strongly desired to have a higher performance, namely, a higher recording density, higher output characteristic, in particular, an improved frequency characteristic and a lower noise level.

Especially, video tapes have recently been desired more and more to have a higher picture quality, and the frequencies of carrier signals recorded in recent video tapes are higher than those recorded in conventional video tapes. In other words, the signals in the short-wave region have come to be used, and as a result, the magnetization depth from the surface of a magnetic tape has come to be remarkably small.

In order to enhance output characteristics of magnetic recording media, especially an S/N ratio thereof with respect to signals having a short wavelength, there have been demanded fineness of magnetic particles, reduction in thickness of a magnetic recording layer, high dispersibility of magnetic particles and surface smoothness of a magnetic coating film.

On the other hand, at the present time, the end position of a magnetic recording medium such as magnetic tapes has been detected by sensing a high light transmittance portion of the magnetic recording medium by means of a video deck. In the case where the particle size of magnetic particles dispersed in the magnetic recording layer become finer and the thickness of the magnetic recording medium is reduced in order to meet the requirement for high performance of the magnetic recording medium as described hereinbefore, the magnetic recording medium shows a high light transmittance as a whole, so that it has been difficult to detect the end position thereof by means of the video deck. In order to solve this problem, carbon black fine particles have been added to the magnetic recording layer in an amount of usually about 6 to 12 parts by weight based on 100 parts by weight of the magnetic particles, thereby reducing the light transmittance of the magnetic recording medium. For this reason, in current videotapes, it is essential to add carbon black fine particles, etc., to the magnetic recording layer thereof.

However, when a large amount of such non-magnetic carbon black fine particles are added to the magnetic recording layer, the magnetic recording medium suffers from deterioration in signal recording property, thereby hindering high-density recording thereon, and the reduction in thickness of the magnetic recording layer becomes incapable. Further, due to the fact that the carbon black fine particles have an average particle size as fine as 0.002 to 0.05 $\mu$m and a large BET specific surface area value, and are deteriorated in solvent-wettability, it has been difficult to disperse these carbon black fine particles in vehicle, thereby failing to obtain a magnetic recording medium having a smooth surface.

Therefore, it has been strongly demanded to provide a magnetic recording medium having a sufficiently low light transmittance even when the amount of carbon black fine particles added to the magnetic recording layer is as small as possible, especially when the carbon black fine particles is used in an amount as small as less than 6 parts by weight based on 100 parts by weight of magnetic particles.

Further, in the case where the magnetic recording medium has a high surface resistivity, the electrostatic charge amount thereof is increased, so that cut chips or dusts tend to adhere onto the surface of the magnetic recording medium upon the production or use thereof, thereby causing such a problem that the dropout frequently occurs. Therefore, in order to reduce not only the light transmittance of the magnetic recording medium but also the surface resistivity thereof, especially below about $10^{10}$ $\Omega$/sq, the carbon black fine particles have been conventionally added to the magnetic recording layer of the magnetic recording medium.

However, as described above, in the case where the amount of such carbon black fine particles or the like which do not contribute to magnetic properties of the magnetic recording layer, is increased, there are caused such problems that the magnetic recording medium suffers from deterioration in signal recording property, the reduction in thickness of the magnetic recording layer becomes incapable, and further the surface smoothness of the magnetic recording layer is deteriorated.

Also, since the carbon black fine particles are bulky particles having a bulk density as low as about 0.1 g/cm$^3$, the handling property and workability thereof are deteriorated. In addition, it has been pointed out that the use of such carbon black fine particles causes problems concerning safety and hygiene such as carcinogenesis.

As the conventional method of reducing the light transmittance and surface resistivity of the magnetic recording medium by lessening the amount of carbon black fine particles added to the magnetic recording layer, there is known a method of increasing the blackness of magnetic particles themselves by incorporating Fe$^{2+}$ into magnetic acicular cobalt-coated iron oxide particles in an amount of not less than 6.0% by weight based on the weight of the magnetic acicular cobalt-coated iron oxide particles (Japanese Patent Application Laid-Open (KOKAI) No. 3-102617 (1991) or the like).

However, at present, although it has been most strongly demanded to provide a magnetic recording medium capable of not only showing a low light transmittance and a low surface resistivity even when the amount of carbon black fine particles added to the magnetic recording layer thereof is as small as possible, but also having a smooth surface, such magnetic recording medium which is capable of satisfying all of these properties, cannot be obtained yet.

That is, in the case of the known magnetic recording medium of Japanese Patent Application Laid-Open (KOKAI) No. 3-102617 (1991) in which the magnetic acicular cobalt-coated iron oxide particles containing $Fe^{2+}$ in the magnetic particles in an amount of not less than 6.0% by weight are used as magnetic particles, the blackness of the magnetic particles is still unsatisfactory, so that the magnetic recording medium can show neither a sufficiently low light transmittance nor a sufficiently low surface resistivity as described in Comparative Examples hereinafter. Further, since the magnetic particles are deteriorated in dispersibility in vehicle due to the inclusion of $Fe^{2+}$, it has been difficult to obtain a magnetic recording layer having a smooth surface.

As a result of the present inventor's earnest studies, it has been found that by using as magnetic particles of a magnetic recording medium, black magnetic acicular composite particles having an average particle diameter of 0.051 to 0.72 µm, which comprise:

magnetic acicular particles as core particles, a coating layer formed on surface of the magnetic acicular particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds, and a carbon black coat formed on the said coating layer comprising the said organosilicon compound, in an amount of 0.5 to 10 parts by weight based on 100 parts by weight of the said magnetic acicular particles, the obtained magnetic recording medium can show a low light transmittance and a low surface resistivity, can have a smooth surface due to the fact that the amount of carbon black fine particles added to the magnetic recording layer can be lessened and the dispersibility of the black magnetic acicular particles themselves in vehicle can be enhanced, and, therefore, can be suitably used as a magnetic recording medium for high-density recording. The present invention has been attained on the basis of the finding.

SUMMARY OF THE INVENTION

It is an object of the present invention to provide a magnetic recording medium capable of not only showing a low light transmittance and a low surface resistivity even when the amount of carbon black fine particles added to a magnetic recording layer thereof is as small as possible, but also having a smooth surface.

To accomplish the aims, in a first aspect of the present invention, there is provided a magnetic recording medium comprising:

a non-magnetic base film; and a magnetic recording layer formed on the non-magnetic base film, comprising a binder resin and black magnetic acicular composite particles having an average particle diameter of 0.051 to 0.72 µm, which black magnetic acicular composite particles comprise:

magnetic acicular particles, a coating formed on surface of said magnetic acicular particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds, and a carbon black coat formed on said coating layer comprising said organosilicon compound, in an amount of 0.5 to 10 parts by weight based on 100 parts by weight of said magnetic acicular particles.

In a second aspect of the present invention, there is provided a magnetic recording medium comprising:

a non-magnetic base film; and a magnetic recording layer formed on the non-magnetic base film, comprising a binder resin and black magnetic acicular composite particles having an average particle diameter of 0.051 to 0.72 µm, which black magnetic acicular composite particles comprise:

magnetic acicular particles having a coat formed on at least a part of the surface of the magnetic acicular particle, comprising at least one compound selected from the group consisting of hydroxides of aluminum, oxides of aluminum, hydroxides of silicon and oxides of silicon in amount of 0.01 to 20% by weight, calculated as Al or $SiO_2$, based on the weight of the magnetic acicular particles coated, a coating layer formed on surface of the coat on the magnetic acicular particles, comprising at least one organosilicon compound selected from the group consisting of:

(1) organosilane compounds obtained obtainable from alkoxysilane compounds, (2) polysiloxanes or modified polysiloxanes, and (3) fluoroalkyl organosilane compounds obtainable from fluoroalkylsilane compounds, and a carbon black coat formed on the said coating layer comprising the said organosilicon compound, in an amount of 0.5 to 10 parts by weight based on 100 parts by weight of the said magnetic acicular particles.

In a third aspect of the present invention, there are provided black magnetic acicular composite particles for a magnetic recording medium, having an average particle diameter of 0.051 to 0.72 µm, comprising:

magnetic acicular iron oxide particles which may contain Co, Al, Ni, P, Zn, Si or B, or may be coated with cobalt or both cobalt and iron as magnetic acicular particles, a coating formed on surface of said magnetic acicular particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds, and a carbon black coat formed on said coating layer comprising said organosilicon compound, in an amount of 0.5 to 10 parts by weight based on 100 parts by weight of said magnetic acicular particles.

In a fourth aspect of the present invention, there are provided black magnetic acicular composite particles for a magnetic recording medium, having an average particle diameter of 0.051 to 0.72 µm, which black magnetic acicular composite particles comprise:

magnetic acicular iron oxide particles which may contain Co, Al, Ni, P, Zn, Si or B, or may be coated with cobalt or both cobalt and iron as magnetic acicular particles, a coat formed on at least a part of the surface of the magnetic acicular iron oxide particle, comprising at least one compound selected from the group consisting of hydroxides of aluminum, oxides of aluminum, hydroxides of silicon and oxides of silicon in amount of 0.01 to 20% by weight, calculated as Al or $SiO_2$, based on the weight of the magnetic acicular iron oxide particles coated, a coating layer formed on surface of the coat on the magnetic acicular iron oxide particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds, and a carbon black coat formed on said coating layer comprising said organosilicon compound, in an amount of 0.5 to 10 parts by weight based on 100 parts by weight of said magnetic acicular iron oxide particles.

In a fifth aspect of the present invention, there are provided black magnetic acicular composite particles for a magnetic recording medium, having an average particle diameter of 0.051 to 0.72 $\mu$m, comprising:

magnetic acicular metal particles containing iron as a main component which contain Co, Al, Ni, P, Zn, Si, B or rare earth elements, or magnetic acicular iron alloy particles containing Co, Al, Ni, P, Zn, Si, B or rare earth elements, as magnetic acicular particles, a coating formed on surface of said magnetic acicular metal particles or magnetic acicular iron alloy particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds, and a carbon black coat formed on said coating layer comprising said organosilicon compound, in an amount of 0.5 to 10 parts by weight based on 100 parts by weight of said magnetic acicular metal particles or magnetic acicular iron alloy particles.

In a sixth aspect of the present invention, there are provided black magnetic acicular composite particles for a magnetic recording medium, having an average particle diameter of 0.051 to 0.72 $\mu$m, comprising:

magnetic acicular metal particles containing iron as a main component which contain Co, Al, Ni, P, Zn, Si, B or rare earth elements, or magnetic acicular iron alloy particles containing Co, Al, Ni, P, Zn, Si, B or rare earth elements, as magnetic acicular particles, a coat formed on at least a part of the surface of the magnetic acicular metal particles or magnetic acicular iron alloy particles, comprising at least one compound selected from the group consisting of hydroxides of aluminum, oxides of aluminum, hydroxides of silicon and oxides of silicon in amount of 0.01 to 20% by weight, calculated as Al or $SiO_2$, based on the weight of the magnetic acicular metal particles or magnetic acicular iron alloy particles coated, a coating layer formed on surface of the coat on the magnetic acicular metal particles or magnetic acicular iron alloy particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds, and a carbon black coat formed on said coating layer comprising said organosilicon compound, in an amount of 0.5 to 10 parts by weight based on 100 parts by weight of said magnetic acicular metal particles or magnetic acicular iron alloy particles.

In a seventh aspect of the present invention, there is provided a method of forming a magnetic recording medium comprising a non-magnetic base film, and a magnetic recording layer comprising a binder resin and magnetic particles, which method comprises using as magnetic particles black magnetic acicular composite particles having an average particle diameter of 0.051 to 0.72 $\mu$m, comprising:

magnetic acicular particles, a coating formed on surface of said magnetic acicular particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds, and a carbon black coat formed on said coating layer comprising said organosilicon compound, in an amount of 0.5 to 10 parts by weight based on 100 parts by weight of said magnetic acicular particles.

In an eighth aspect of the present invention, there is provided a method of producing a magnetic recording medium, comprising forming on a non-magnetic base film a magnetic recording layer comprising a binder resin and as magnetic particles black magnetic acicular composite particles having an average particle diameter of 0.051 to 0.72 $\mu$m, comprising magnetic acicular particles, a coating formed on surface of said magnetic acicular particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds, and a carbon black coat formed on said coating layer comprising said organosilicon compound, in an amount of 0.5 to 10 parts by weight based on 100 parts by weight of said magnetic acicular particles.

DETAILED DESCRIPTION OF THE INVENTION

Figure 1:
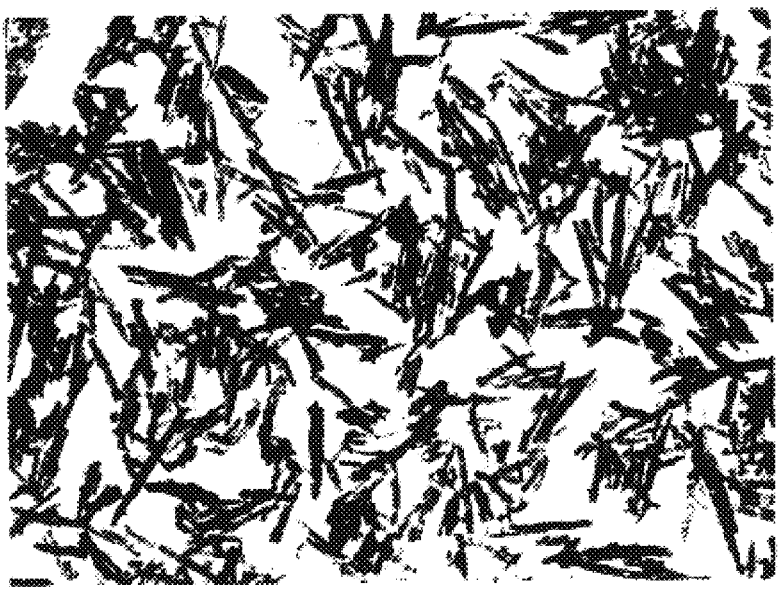
FIG. 1 is an electron micrograph (×30,000) showing a particle structure of acicular cobalt-coated magnetite particles used in Example 1.

The present invention is explained in more detail below.

First, black magnetic acicular composite particles for a magnetic recording layer of a magnetic recording medium according to the present invention are described.

The black magnetic acicular composite particles having an average particle diameter of 0.051 to 0.72 μm according to the present invention, comprise magnetic acicular particle as a core particle, a coating layer comprising an organosilicon compound which is formed on the surface of each magnetic acicular particle, and carbon black coat which are formed on the coating layer comprising the organosilicon compound.

As the magnetic acicular particles used as core particles in the present invention, there may be exemplified magnetic acicular iron oxide particles such as acicular magnetite particles ($Fe_3O_4$), acicular maghemite particles ($\gamma$-$Fe_2O_3$), acicular berthollide compounds particles ($FeO_x \cdot Fe_2O_3$; 0<X<1) which are intermediate oxides between maghemite and magnetite; magnetic acicular iron oxide particles obtained by incorporating different kinds of elements other than Fe such as Co, Al, Ni, P, Zn, Si or B into the above-mentioned magnetic acicular iron oxide particles; magnetic acicular coated iron oxide particles obtained by coating the surface of the above-mentioned magnetic acicular iron oxide particles or those containing different kinds of elements, with cobalt, both cobalt and iron or the like (hereinafter referred to merely as "magnetic acicular cobalt-coated iron oxide particles"); magnetic acicular metal particles containing iron as a main component which contain elements other than Fe such as Co, Al, Ni, P, Zn, Si, B or rare earth elements (hereinafter referred to merely as "magnetic acicular metal particles") (which may include magnetic acicular iron alloy particles containing elements other than Fe such as Co, Al, Ni, P, Zn, Si, B or rare earth elements); or the like.

Under the consideration of oxidation stability and dispersibility, the magnetic acicular cobalt-coated iron oxide particles are preferred. The amount of the cobalt coated on the surface of the acicular iron oxide particle as a core particle is preferably 0.5 to 10% by weight based on the weight of the magnetic acicular cobalt-coated iron oxide particles.

Under the consideration of high-density recording of recent magnetic recording media, as the magnetic acicular particles, the magnetic acicular cobalt-coated iron oxide particles, and the magnetic acicular metal particles are preferred. Among them, the magnetic acicular metal particles are more preferred.

More specifically, the magnetic acicular metal particles may be exemplified as follows.

1) Magnetic acicular metal particles comprises iron; and cobalt of usually 0.05 to 40% by weight, preferably 1.0 to 35% by weight, more preferably 3 to 30% by weight (calculated as Co) based on the weight of the magnetic acicular metal particles.

2) Magnetic acicular metal particles comprises iron; and aluminum of usually 0.05 to 10% by weight, preferably 0.1 to 7% by weight (calculated as Al) based on the weight of the magnetic acicular metal particles.

3) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; and aluminum of usually 0.05 to 10% by weight, preferably 0.1 to 7% by weight (calculated as Al) based on the weight of the magnetic acicular metal particles.

4) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

5) Magnetic acicular metal particles comprises iron; aluminum of usually 0.05 to 10% by weight, preferably 0.1 to 7% by weight (calculated as Al) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

6) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; and at least one selected from the group consisting of Nd, La and Y of usually 0.05 to 10% by weight, preferably 0.1 to 7% by weight (calculated as the corresponding element) based on the weight of the magnetic acicular metal particles.

7) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

8) Magnetic acicular metal particles comprises iron; aluminum of usually 0.05 to 10% by weight, preferably 0.1 to 7% by weight (calculated as Al) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

9) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

10) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; at least one selected from the group consisting of Nd, La and Y of usually 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

11) Magnetic acicular metal particles comprises iron; aluminum of usually 0.05 to 10% by weight, preferably 0.1 to 7% by weight (calculated as Al) based on the weight of the magnetic acicular metal particles; at least one selected from the group consisting of Nd, La and Y of ordinarily 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

12) Magnetic acicular metal particles comprises iron; cobalt of usually 0.05 to 40% by weight, preferably 1.0 to 35% by weight, more preferably 3 to 30% by weight (calculated as Co) based on the weight of the magnetic acicular metal particles; aluminum of usually 0.05 to 10% by weight, preferably 0.1 to 7% by weight (calculated as Al) based on the weight of the magnetic acicular metal particles; at least one selected from the group consisting of Nd, La and Y of usually 0.05 to 10% by weight, preferably 0.1 to 7% by weight (calculated as the corresponding element) based on the weight of the magnetic acicular metal particles; and at least one selected from the group consisting of Ni, P, Si, Zn, Ti, Cu and B of usually 0.05 to 10% by weight, preferably 0.1 to 7% by weight (calculated as the corresponding element) based on the weight of the magnetic acicular metal particles.

The iron content in the magnetic acicular metal particles is the balance, and is preferably 50 to 99% by weight, more preferably 60 to 95% by weight (calculated as Fe) based on the weight of the magnetic acicular metal particles.

The shape of the core particles used in the present invention have substantially acicular. The "acicular" shape may include not only a needle shape but also a spindle shape or a rice-ball shape.

The average major axis diameter of the magnetic acicular particles as core particles used in the present invention is usually 0.05 to 0.7 $\mu$m, preferably 0.05 to 0.5 $\mu$m, more preferably 0.05 to 0.3 $\mu$m.

When the average major axis diameter of the magnetic acicular particles is more than 0.7 $\mu$m, the obtained black magnetic acicular composite particles also may become large particles. In the case where such large particles are used for forming a magnetic recording layer, the surface smoothness of the magnetic recording layer tends to be deteriorated. On the other hand, when the average particle size is less than 0.05 $\mu$m, the intermolecular force between the particles may be increased due to the reduction in particle size, so that agglomeration of the particles tends to be caused. Therefore, it becomes difficult to uniformly coat the surfaces of the magnetic acicular particle with the organosilicon compound, and to uniformly form the carbon black coat on the surface of the coating layer comprising the organosilicon compounds.

The average minor axis diameter of the magnetic acicular particles as core particles used in the present invention is preferably 0.025 to 0.35 $\mu$m, more preferably 0.025 to 0.25 $\mu$m, still more preferably 0.025 to 0.15 $\mu$m.

The aspect ratio of the magnetic acicular particles as core particles used in the present invention (=average major axis diameter:average minor axis diameter, hereinafter referred to merely as "aspect ratio") is usually 2.0:1 to 20.0:1, preferably 2.5:1 to 18.0:1, more preferably 3.0:1 to 15.0:1. When the aspect ratio is more than 20.0:1, the magnetic acicular particles tend to be entangled with each other, and it also becomes difficult to uniformly coat the surfaces of the magnetic acicular particles with the organosilicon compounds and to uniformly form the carbon black coat on the surface of the coating layer comprising the organosilicon compounds. On the other hand, when the aspect ratio is less than 2.0:1, the strength of the coating film of the magnetic recording medium may be low.

The geometrical standard deviation value of the major axis diameter of the magnetic acicular particles as core particles used in the present invention is usually not more than 2.0, preferably not more than 1.8, more preferably not more than 1.6. When the geometrical standard deviation value thereof is more than 2.0, coarse particles may be contained therein, so that the magnetic acicular particles may be inhibited from being uniformly dispersed. Therefore, it also becomes difficult to uniformly coat the surfaces of the magnetic acicular particles with the organosilicon compounds and to uniformly form the carbon black coat on the surface of the coating layer comprising the organosilicon compounds. The lower limit of the geometrical standard deviation value is 1.01. It is industrially difficult to obtain particles having a geometrical standard deviation value of less than 1.01.

The BET specific surface area of the magnetic acicular particles as core particles used in the present invention is usually 15 to 150 m$^2$/g, preferably 20 to 120 m$^2$/g, more preferably 25 to 100 m$^2$/g. When the BET specific surface area is less than 15 m$^2$/g, the magnetic acicular particles may become coarse, or the sintering between the particles may be caused, so that the obtained black magnetic acicular composite particles also may become coarse particles and tend to be deteriorated in smooth surface of the magnetic recording layer. When the BET specific surface area value is more than 150 m$^2$/g, the particles tend to be agglomerated together due to the increase in intermolecular force between the particles because of the fineness thereof, so that it becomes difficult to uniformly coat the surfaces of the magnetic acicular particles with the organosilane compounds and to uniformly form the carbon black coat on the surface of the coating layer comprising the organosilicon compounds.

The blackness of the magnetic acicular particles as core particles used in the present invention, is usually more than 18.0 when represented by L* value, and the upper limit thereof is usually 34.0, preferably 32.0 when represented by L* value. When the L* value exceeds 34.0, the lightness of the particles may be high, so that it is difficult to obtain black magnetic acicular composite particles having a sufficient blackness.

The volume resistivity of the magnetite acicular particles as core particles used in the present invention is usually not more than $5.0 \times 10^{10}$ $\Omega \cdot$cm, preferably not more than $1.0 \times 10^{10}$ $\Omega \cdot$cm. The lower limit thereof is preferably about $1.0 \times 10^6$ $\Omega \cdot$cm.

As to the magnetic properties of the magnetic acicular particles as core particles used in the present invention, the coercive force value thereof is usually 250 to 3500 Oe, the saturation magnetization value is usually 60 to 170 emu/g.

In case of magnetic acicular iron oxide particles, the coercive force value thereof is usually 250 to 500 Oe, preferably 300 to 500 Oe; the saturation magnetization value is usually 60 to 90 emu/g, preferably 65 to 90 emu/g. In case of magnetic acicular cobalt-coated iron oxide particles, the coercive force value thereof is usually 500 to 1700 Oe, preferably 550 to 1700 Oe; the saturation magnetization value is usually 60 to 90 emu/g, preferably 65 to 90 emu/g. In case of magnetic acicular metal particles containing iron as a main component, the coercive-force value thereof is usually 800 to 3500 Oe, preferably 900 to 3500 Oe; the saturation magnetization value is usually 90 to 170 emu/g, preferably 100 to 170 emu/g.

The particle shape and particle size of the black magnetic acicular composite particles according to the present invention are considerably varied depending upon those of the magnetic acicular particles as core particles. The black magnetic acicular composite particles have a similar particle shape to that of the magnetic acicular particle as core particle, and a slightly larger particle size than that of the magnetic acicular particles as core particles.

More specifically, the black magnetic acicular composite particles according to the present invention, have an average major axis diameter of usually 0.051 to 0.72 $\mu$m, preferably 0.051 to 0.51 $\mu$m, more preferably 0.051 to 0.31 $\mu$m and an aspect ratio of usually 2.0:1 to 20.0:1, preferably 2.5:1 to 18.0:1, more preferably 3.0:1 to 15.0:1. The minor axis diameter thereof is preferably 0.0255 to 0.36 $\mu$m, more preferably 0.0255 to 0.255 $\mu$m, still more preferably 0.0255 to 0.155 $\mu$m.

When the average particle size of the black magnetic acicular composite particles is more than 0.72 $\mu$m, the black magnetic acicular composite particles may become coarse and to be deteriorated in surface smooth. On the other hand, when the average particle size thereof is less than 0.051 $\mu$m, the black magnetic acicular composite particles tends to be agglomerated by the increase of intermolecular force due to the reduction in particle size, thereby deteriorating the dispersibility in a vehicle upon production of the magnetic coating composition.

When the aspect ratio of the black magnetic acicular composite particles is more than 20.0:1, the particles tend to be frequently entangled or intertwined with each other. As a result, upon the production of a magnetic coating composition, there is a tendency that the dispersibility of the particles in vehicle is deteriorated and the viscosity of the obtained magnetic coating composition is increased. On the other hand, when the aspect ratio thereof is less than 2.0:1, the strength of the coating film of the obtained magnetic recording medium is low.

The geometrical standard deviation value of the black magnetic acicular composite particles according to the present invention is preferably not more than 2.0. When the geometrical standard deviation value thereof is more than 2.0, the surface smooth of the magnetic recording layer of the magnetic recording medium is likely to be deteriorated due to the existence of coarse particles therein. With the consideration of the surface smooth of the magnetic recording layer, the geometrical standard deviation value thereof is more preferably not more than 1.8, still more preferably not more than 1.6. In the consideration of the industrial productivity, the lower limit of the geometrical standard deviation value thereof is preferably 1.01. It is industrially difficult to obtain such particles having a geometrical standard deviation of less than 1.01.

The BET specific surface area of the black magnetic acicular composite particles according to the present invention, is usually 16 to 160 $m^2$/g, preferably 22 to 130 $m^2$/g, more preferably 27 to 110 $m^2$/g. When the BET specific surface area thereof is less than 16 $m^2$/g, the black magnetic acicular composite particles may become coarse, and the sintering between the black magnetic acicular composite particles is caused, thereby deteriorating the surface smooth of the magnetic recording layer. On the other hand, when the BET specific surface area is more than 160 $m^2$/g, the black magnetic acicular composite particles tend to be agglomerated together by the increase in intermolecular force due to the reduction in particle size, thereby deteriorating the dispersibility in the vehicle upon production of the magnetic coating composition.

As to the blackness of the black magnetic acicular composite particles according to the present invention, the upper limit of the blackness thereof is usually 23, preferably 22, more preferably 21 when represented by L* value. When the L* value thereof is more than 23, the lightness of the black magnetic acicular composite particles becomes high, so that the black magnetic acicular composite particles having a sufficient blackness may not be obtained. The lower limit of the blackness thereof is 15 when represented by L* value.

The volume resistivity of the black magnetic acicular composite particles is usually not more than $1.0 \times 10^7$ $\Omega \cdot$cm, preferably $1.0 \times 10^4$ to $5.0 \times 10^6$ $\Omega \cdot$cm, more preferably $1.0 \times 10^4$ to $1.0 \times 10^6$ $\Omega \cdot$cm. When the volume resistivity of the black magnetic acicular composite particles is more than $1.0 \times 10^7$ 106 ·cm, it is difficult to sufficiently reduce the surface resistivity of the obtained magnetic recording medium.

The percentage of desorption of carbon black from the black magnetic acicular composite particles according to the present invention, is preferably not more than 20%, more preferably not more than 10%. When the desorption percentage of the carbon black is more than 20%, the desorbed carbon black tend to hinder the black magnetic acicular composite particles from being uniformly dispersed in the vehicle upon production of the magnetic coating composition.

As the magnetic properties of the black magnetic acicular composite particles according to the present invention, the coercive force of the black magnetic acicular composite particles is usually 250 to 3500 Oe, the saturation magnetization thereof is 60 to 170 emu/g.

In case of using magnetic acicular iron oxide particle as the core particles, the coercive force thereof is usually 250 to 500 Oe, preferably 300 to 500 Oe; the saturation magnetization thereof is 60 to 90 emu/g, preferably 65 to 90 emu/g. In case of using magnetic acicular cobalt-coated iron oxide particle as the core particles, the coercive force of the black magnetic acicular composite particles is usually 500 to 1700 Oe, preferably 550 to 1700 Oe; the saturation magnetization thereof is 60 to 90 emu/g, preferably 65 to 90 emu/g. In case of magnetic acicular metal particles containing iron as a main component, the coercive force of the black magnetic acicular composite particles is usually 800 to 3500 Oe, preferably 900 to 3500 Oe; the saturation magnetization thereof is 90 to 170 emu/g, preferably 100 to 170 emu/g.

The coating formed on the surface of the core particle comprises at least one organosilicon compound selected from the group consisting of (1) organosilane compounds obtainable from alkoxysilane compounds; (2) polysiloxanes, or modified polysiloxanes selected from the group consisting of (2-A) polysiloxanes modified with at least one compound selected from the group consisting of polyethers, polyesters and epoxy compounds (hereinafter referred to merely as "modified polysiloxanes"), and (2-B) polysiloxanes whose molecular terminal is modified with at least one group selected from the group consisting of carboxylic acid groups, alcohol groups and a hydroxyl group (hereinafter referred to merely as "terminal-modified polysiloxanes"); and (3) fluoroalkyl organosilane compounds obtainable from fluoroalkylsilane compounds.

The organosilane compounds (1) may be produced by drying or heat-treating alkoxysilane compounds represented by the formula (I):

(I)

wherein $R^1$ is $C_6H_5$—, $(CH_3)_2CHCH_2$— or n—$C_bH_{2b+1}$— (wherein b is an integer of 1 to 18); X is $CH_3O$— or $C_2H_5O$—; and a is an integer of 0 to 3.

The drying or heat-treatment of the alkoxysilane compounds may be conducted, for example, at a temperature of usually 40 to 200° C., preferably 60 to 150° C. for usually 10 minutes to 12 hours, preferably 30 minutes to 3 hours.

Specific examples of the alkoxysilane compounds may include methyl triethoxysilane, dimethyl diethoxysilane, phenyl triethyoxysilane, diphenyl diethoxysilane, methyl trimethoxysilane, dimethyl dimethoxysilane, phenyl trimethoxysilane, diphenyl dimethoxysilane, isobutyl trimethoxysilane, decyl trimethoxysilane or the like. Among these alkoxysilane compounds, in view of the desorption percentage and the adhering effect of carbon black, methyl triethoxysilane, phenyl triethyoxysilane, methyl trimethoxysilane, dimethyl dimethoxysilane and isobutyl trimethoxysilane are preferred, and methyl triethoxysilane and methyl trimethoxysilane are more preferred.

As the polysiloxanes (2), there may be used those compounds represented by the formula (II):

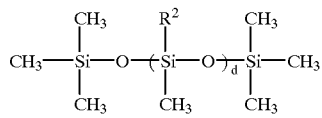
(II)

wherein $R^2$ is H— or $CH_3$—, and d is an integer of 15 to 450.

Among these polysiloxanes, in view of the desorption percentage and the adhering effect of carbon black, polysiloxanes having methyl hydrogen siloxane units are preferred.

As the modified polysiloxanes (2-A), there may be used:

(a) polysiloxanes modified with polyethers represented by the formula (III):

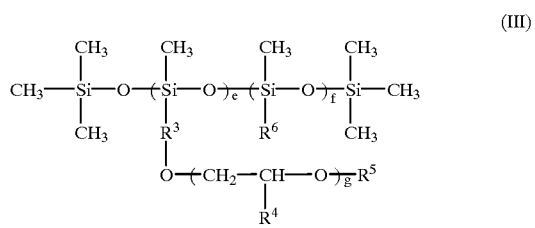
(III)

wherein $R^3$ is —(—$CH_2$—)$_h$—; $R^4$ is —(—$CH_2$—)$_i$—$CH_3$; $R^5$ is —OH, —COOH, —CH=$CH_2$, —C($CH_3$)=$CH_2$ or —(—$CH_2$—)$_j$—$CH_3$; $R^6$ is —(—$CH_2$—)$_k$—$CH_3$; g and h are an integer of 1 to 15; i, j and k are an integer of 0 to 15; e is an integer of 1 to 50; and f is an integer of 1 to 300;

(b) polysiloxanes modified with polyesters represented by the formula (IV):

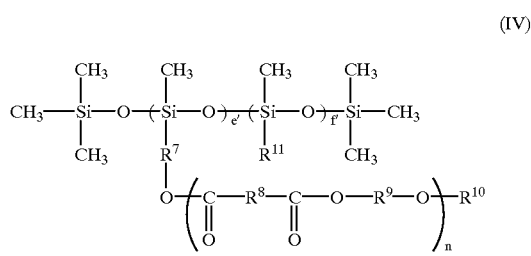
(IV)

wherein $R^7$, $R^8$ and $R^9$ are —(—$CH_2$—)$_q$— and may be the same or different; $R^{10}$ is —OH, —COOH, —CH=$CH_2$, —C($CH_3$)=$CH_2$ or —(—$CH_2$—)$_r$—$CH_3$; $R^{11}$ is —(—$CH_2$—)$_s$—$CH_3$; n and q are an integer of 1 to 15; r and s are an integer of 0 to 15; e' is an integer of 1 to 50; and f' is an integer of 1 to 300;

(c) polysiloxanes modified with epoxy compounds represented by the formula (V):

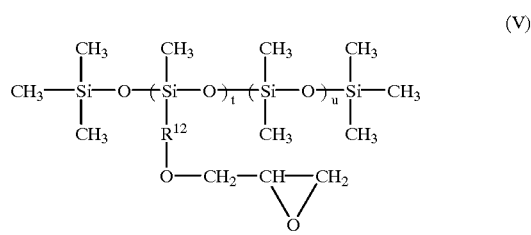
(V)

wherein $R^{12}$ is —(—$CH_2$—)$_v$—; v is an integer of 1 to 15; t is an integer of 1 to 50; and u is an integer of 1 to 300; or a mixture thereof.

Among these modified polysiloxanes (2-A), in view of the desorption percentage and the adhering effect of carbon black, the polysiloxanes modified with the polyethers represented by the formula (III), are preferred.

As the terminal-modified polysiloxanes (2-B), there may be used those represented by the formula (VI):

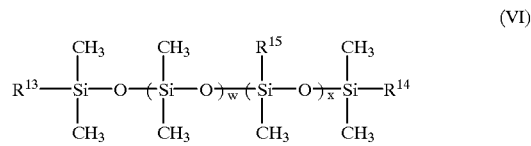
(VI)

wherein $R^{13}$ and $R^{14}$ are —OH, $R^{16}$OH or $R^{17}$COOH and may be the same or different; $R^{15}$ is —$CH_3$ or —$C_6H_5$; $R^{16}$ and $R^{17}$ are —(—$CH_2$—)$_y$—; y is an integer of 1 to 15; w is an integer of 1 to 200; and x is an integer of 0 to 100.

Among these terminal-modified polysiloxanes, in view of the desorption percentage and the adhering effect of carbon black, the polysiloxanes whose terminals are modified with carboxylic acid groups are preferred.

The fluoroalkyl organosilane compounds (3) may be produced by drying or heat-treating fluoroalkylsilane compounds represented by the formula (VII):

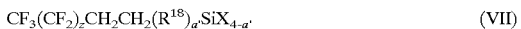
$$CF_3(CF_2)_zCH_2CH_2(R^{18})_{a'}SiX_{4-a'} \quad (VII)$$

wherein $R^{18}$ is $CH_3$—, $C_2H_5$—, $CH_3O$— or $C_2H_5O$—; X is $CH_3O$— or $C_2H_5O$—; and z is an integer of 0 to 15; and a' is an integer of 0 to 3.

The drying or the heat-treatment of the fluoroalkylsilane compounds may be conducted, for example, at a temperature of usually 40 to 200° C., preferably 60 to 150° C. for usually 10 minutes to 12 hours, preferably 30 minutes to 3 hours.

Specific examples of the fluoroalkylsilane compounds may include trifluoropropyl trimethoxysilane, tridecafluorooctyl trimethoxysilane, heptadecafluorodecyl trimethoxysilane, heptadecafluorodecylmethyl dimethoxysilane, trifluoropropyl triethoxysilane, tridecafluorooctyl triethoxysilane, heptadecafluorodecyl triethoxysilane, heptadecafluorodecylmethyl diethoxysilane or the like. Among these fluoroalkylsilane compounds, in view of the desorption percentage and the adhering effect of carbon particles, trifluoropropyl trimethoxysilane, tridecafluorooctyl trimethoxysilane and heptadecaf luorodecyl trimethoxysilane are preferred, and trifluoropropyl trimethoxysilane and tridecafluorooctyl trimethoxysilane are more preferred.

The coating amount of the organosilicon compounds is usually 0.02 to 5.0% by weight, preferably 0.03 to 4.0% by weight, more preferably 0.05 to 3.0% by weight (calculated as Si) based on the weight of the magnetic acicular particles coated with the organosilicon compounds.

When the coating amount of the organosilicon compounds is less than 0.02% by weight, it becomes difficult to coat the carbon black on the surfaces of the magnetic acicular particles in such an amount enough to improve the blackness of the obtained black magnetic acicular composite particles.

On the other hand, when the coating amount of the organosilicon compounds is more than 5.0% by weight, a sufficient amount of the carbon black can be formed on the surfaces of the magnetic acicular particles. However, the use of such unnecessarily large amount of the organosilicon compounds is meaningless because the effect of enhancing the blackness of the obtained black magnetic acicular composite particles is already saturated.

As the carbon black fine particles used in the present invention, there may be exemplified commercially available carbon blacks such as furnace black, channel black or the like. Specific examples of the commercially available carbon blacks usable in the present invention, may include #3050, #3150, #3250, #3750, #3950, MA-100, MA7, #1000, #2400B, #30, MA8, MA11, #50, #52, #45, #2200B, MA600, etc. (tradename, produced by MITSUBISHI CHEMICAL CORP.), SEAST 9H, SEAST 7H, SEAST 6, SEAST 3H, SEAST 300, SEAST FM, etc. (tradename, produced by TOKAI CARBON CO., LTD.), Raven 1250, Raven 860, Raven 1000, Raven 1190 ULTRA, etc. (tradename, produced by COLOMBIAN CHEMICALS COMPANY), Ketchen black EC, Ketchen black EC600JD, etc. (tradename, produced by KETCHEN INTERNATIONAL CO., LTD.), BLACK PEARLS-L, BLACK PEARLS 1000, BLACK PEARLS 4630, VULCAN XC72, REGAL 660, REGAL 400, etc. (tradename, produced by CABOTT SPECIALTY CHEMICALS INK CO., LTD.), or the like. In view of the compatibility with the organosilicon compounds, MA-100, MA7, #1000, #2400B and #30 are preferred.

The lower limit of the average particle size of the carbon black fine particles used is usually 0.005 $\mu$m, preferably 0.01 $\mu$m, and upper limit thereof is usually 0.05 $\mu$m. preferably 0.035 $\mu$m. When the average particle size of the carbon black fine particles used is less than 0.005 $\mu$m. the carbon black fine particles used are too fine to be well handled.

On the other hand, when the average particle size of the carbon black fine particles used is more than 0.05 $\mu$m, since the carbon black fine particles used is much larger, it is necessary to apply a larger mechanical shear force for forming the uniform carbon black coat on the coating layer composed of the organosilicon compounds, thereby rendering the coating process industrially disadvantageous.

The amount of the carbon black coat is 0.5 to 10 parts by weight based on 100 parts by weight of the magnetic acicular particles as core particles.

When the amount of the carbon black coat formed is less than 0.5 part by weight, the amount of the carbon black may be insufficient, so that it becomes difficult to obtain black magnetic acicular composite particles having a sufficient blackness.

On the other hand, when the amount of the carbon black coat formed is more than 10 parts by weight, the obtained black magnetic acicular composite particles can show a sufficient blackness. However, since the amount of the carbon black coat is considerably large, the carbon black tend to be desorbed from the coating layer composed of the organosilicon compound. As a result, the obtained black magnetic acicular composite particles tend to be deteriorated in dispersibility in a vehicle upon the production of magnetic coating composition.

The thickness of carbon black coat formed is preferably not more than 0.04 $\mu$m, more preferably not more than 0.03 $\mu$m, still more preferably not more than 0.02 $\mu$m. The lower limit thereof is more preferably 0.0001 $\mu$m.

At least a part of the surface of the magnetic acicular particle as a core particle used in the present invention may be coated with at least one selected from the group consisting of a hydroxide of aluminum, an oxide of aluminum, a hydroxide of silicon and an oxide of silicon (hereinafter referred to as "hydroxides and/or oxides of aluminum and/or silicon coat"). When the black magnetic acicular composite particles obtained by using as core particles the magnetic acicular particles which are coated with the hydroxides and/or oxides of aluminum and/or silicon, are dispersed in a vehicle, the treated particles have an affinity with the binder resin and it is more easy to obtain a desired dispersibility.

The amount of the hydroxides and/or oxides of aluminum and/or silicon coat is usually not more than 20% by weight, preferably 0.01 to 20% by weight (calculated as Al and/or $SiO_2$) based on the total weight of the magnetic acicular particles coated. If it is less than 0.01% by weight (calculated as Al and/or $SiO_2$) based on the total weight of the magnetic acicular particles coated, the dispersibility-improving effect by coating therewith may be insufficient. If the amount exceeds 20% by weight (calculated as Al and/or $SiO_2$) based on the total weight of the magnetic acicular particles coated, the dispersibility-improving effect by coating therewith becomes saturated, so that it is meaningless to add a coating material more than necessary. From the point of view of dispersibility in the vehicle and industrial productivity, the more preferable amount of coating material is 0.05 to 10% by weight (calculated as Al and/or $SiO_2$) based on the total weight of the magnetic acicular particles coated.

The particle size, geometrical standard deviation value, BET specific surface area, blackness $L^*$ value, volume resistivity, magnetic properties and desorption percentage of carbon black of the black magnetic acicular composite particles wherein the surface of the core particle is coated with the hydroxides and/or oxides of aluminum and/or silicon according to the present invention, are substantially the same as those of the black magnetic acicular composite particles wherein the core particle is uncoated with the hydroxides and/or oxides of aluminum and/or silicon according to the present invention. In addition, the dispersibility in the vehicle of the black magnetic acicular composite particles wherein the surface of the core particle is coated with the hydroxides and/or oxides of aluminum and/or silicon is more improved as compared with that of the black magnetic acicular composite particles wherein the core particle is uncoated therewith.

Next, the magnetic recording medium according to the present invention is described.

The magnetic recording medium according to the present invention comprises:

a non-magnetic base film; and a magnetic recording layer formed on the non-magnetic base film, comprising a binder resin and the black magnetic acicular composite particles.

As the non-magnetic base film, the following materials which are at present generally used for the production of a magnetic recording medium are usable as a raw material: a synthetic resin such as polyethylene terephthalate, polyethylene, polypropylene, polycarbonate, polyethylene naphthalate, polyamide, polyamideimide and polyimide; foil and plate of a metal such as aluminum and stainless steel; and various kinds of paper. The thickness of the non-magnetic base film varies depending upon the material, but it is usually about 1.0 to 300 $\mu$m. preferably 2.0 to 200 $\mu$m.

In the case of a magnetic disc, polyethylene terephthalate is usually used as the non-magnetic base film, and the thickness thereof is usually 50 to 300 $\mu$m, preferably 60 to 200 $\mu$m.

In a magnetic tape, when polyethylene terephthalate is used as the non-magnetic base film, the thickness thereof is usually 3 to 100 $\mu$m, preferably 4 to 20 $\mu$m; when polyethylene naphthalate is used, the thickness thereof is usually 3 to 50 $\mu$m, preferably 4 to 20 $\mu$m; and when polyamide is used, the thickness thereof is usually 2 to 10 $\mu$m, preferably 3 to 7 $\mu$m.

As the binder resin used in the present invention, the following resins which are at present generally used for the production of a magnetic recording medium are usable: vinyl chloride-vinyl acetate copolymer, urethane resin, vinyl chloride-vinyl acetate-maleic acid copolymer, urethane elastomer, butadiene-acrylonitrile copolymer, polyvinyl butyral, cellulose derivative such as nitrocellulose, polyester resin, synthetic rubber resin such as polybutadiene, epoxy resin, polyamide resin, polyisocyanate, electron radiation curing acryl urethane resin and mixtures thereof. Each of these resin binders may contain a functional group such as —OH, —COOH, —$SO_3M$, —$OPO_2M_2$ and —$NH_2$, wherein M represents H, Na or K. With the consideration of the dispersibility of the black magnetic acicular composite particles, a binder resin containing a functional group —COOH or —$SO_3M$ is preferable.

The thickness of the magnetic recording layer obtained by applying the magnetic coating composition on the surface of the non-magnetic base film and dried, is usually in the range of 0.01 to 5.0 $\mu$m. If the thickness is less than 0.01 $\mu$m, uniform coating may be difficult, so that unfavorable phenomenon such as unevenness on the coating surface is observed. On the other hand, when the thickness exceeds 5.0 $\mu$m, it may be difficult to obtain desired signal recording property due to an influence of diamagnetism. The preferable thickness is in the range of 0.1 to 4.0 $\mu$m.

The mixing ratio of the black magnetic acicular composite particles with the binder resin is usually 5 to 2000 parts by weight, preferably 100 to 1000 parts by weight based on 100 parts by weight of the binder resin.

When the amount of the black magnetic acicular composite particles blended is less than 5 parts by weight, the obtained magnetic coating composition contains a too small amount of the black magnetic acicular composite particles. As a result, when a coating film is produced from such a magnetic coating composition, it is not possible to obtain a coating film in which the black magnetic acicular composite particles are continuously dispersed, so that the surface smoothness and the strength of the coating film become unsatisfactory. On the other hand, when the amount of the black magnetic acicular composite particles blended is more than 2,000 parts by weight, the amount of the black magnetic acicular composite particles becomes too large relative to that of the binder resin, so that it is not possible to sufficiently disperse the black magnetic acicular composite particles in the magnetic coating composition. As a result, when a coating film is produced from such a magnetic coating composition, it is difficult to obtain a coating film having a sufficiently smooth surface. Further, since the black magnetic acicular composite particles cannot be sufficiently bound with each other by the binder resin, the obtained coating film tends to become brittle.

In the magnetic recording medium according to the present invention, the amount of carbon black fine particles added to the magnetic recording layer thereof can be reduced to usually less than 6 parts by weight, preferably less than 5 parts by weight, more preferably less than 3 parts by weight based on 100 parts by weight of the black magnetic acicular composite particles.

Further, in the case where the black magnetic acicular composite particles wherein a large amount of the carbon black can be coated onto the surface thereof, especially in an amount of 7 to 10 parts by weight based on 100 parts by weight of the magnetic acicular particles, are used as magnetic particles, it can be expected to omit the addition of the carbon black fine particles to the magnetic recording layer.

Incidentally, the magnetic recording layer may optionally contain a lubricant, an abrasive, an anti-static agent and other additives which are usually used for the production of magnetic recording media, in an amount of 0.1 to 50 parts by weight based on 100 parts of the binder resin.

The magnetic recording medium according to the present invention has a coercive force of usually 250 to 3500 Oe; a squareness (residual magnetic flux density Br/saturation magnetic flux density Bm) of usually 0.85 to 0.95; a gloss (of the coating film) of usually 150 to 300%; a surface roughness Ra (of the coating film) of usually not more than 12.0 nm; a Young's modulus (relative value to a commercially available video tape: AV T-120 produced by Victor Company of Japan, Limited) of usually 124 to 160; a linear adsorption coefficient (of the coating film) of usually 1.30 to 10.00 $\mu m^{-1}$; and a surface resistivity of not more than $1.0 \times 10^{10}$ $\Omega$/sq.

In case of using the black magnetic acicular composite particles as magnetic particles, wherein the magnetic acicular iron oxide particles are used as core particles, the magnetic recording medium according to the present invention has a coercive force of usually 250 to 500 Oe, preferably 300 to 500 Oe; a squareness (residual magnetic flux density Br/saturation magnetic flux density Bm) of usually 0.85 to 0.95, preferably 0.86 to 0.95; a gloss (of the coating film) of usually 150 to 300%, preferably 160 to 300%; a surface roughness Ra (of the coating film) of usually not more than 12.0 nm, preferably 2.0 to 11.0 nm, more preferably 2.0 to 10.0 nm, a Young's modulus (relative value to a commercially available video tape: AV T-120 produced by Victor Company of Japan, Limited) of usually 124 to 160, preferably 125 to 160; a linear adsorption coefficient (of the coating film) of usually 1.30 to 10.0 $\mu m^{-1}$, preferably 1.35 to 10.0 $\mu m^{-1}$; and a surface resistivity of usually not more than $1.0\times10^{10}$ Ω/sq, preferably not more than $7.5\times10^{9}$ Ω/sq, more preferably not more than $5.0\times10^{9}$ Ω/sq.

In case of using the black magnetic acicular composite particles as magnetic particles, wherein the magnetic acicular cobalt-coated iron oxide particles are used as core particles, the magnetic recording medium according to the present invention has a coercive force of usually 500 to 1700 Oe, preferably 550 to 1700 Oe; a squareness (residual magnetic flux density Br/saturation magnetic flux density Bm) of usually 0.85 to 0.95, preferably 0.86 to 0.95; a gloss (of the coating film) of usually 160 to 300%, preferably 165 to 300%; a surface roughness Ra (of the coating film) of usually not more than 12.0 nm, preferably 2.0 to 11.0 nm, more preferably 2.0 to 10.0 nm, a Young's modulus (relative value to a commercially available video tape: AV T-120 produced by Victor Company of Japan, Limited) of usually 124 to 160, preferably 125 to 160; a linear adsorption coefficient (of the coating film) of usually 1.30 to 10.0 $\mu m^{-1}$, preferably 1.35 to 10.0 $\mu m^{-1}$; and a surface resistivity of usually not more than $1.0\times10^{10}$ Ω/sq, preferably not more than $7.5\times10^{9}$ Ω/sq, more preferably not more than $5.0\times10^{9}$ Ω/sq.

In case of using the black magnetic acicular composite particles as magnetic particles, wherein the magnetic acicular metal particles containing iron are used as a main component as core particles, the magnetic recording medium according to the present invention has a coercive force of usually 800 to 3500 Oe, preferably 900 to 3500 Oe; a squareness (residual magnetic flux density Br/saturation magnetic flux density Bm) of usually 0.85 to 0.95, preferably 0.86 to 0.95; a gloss (of the coating film) of usually 180 to 300%, preferably 190 to 300%; a surface roughness Ra (of the coating film) of usually not more than 12.0 nm, preferably 2.0 to 11.0 nm, more preferably 2.0 to 10.0 nm, a Young's modulus (relative value to a commercially available video tape: AV T-120 produced by Victor Company of Japan, Limited) of usually 124 to 160, preferably 125 to 160; a linear adsorption coefficient (of the coating film) of usually 1.40 to 10.0 $\mu m^{-1}$, preferably 1.45 to 10.0 $\mu m^{-1}$; and a surface resistivity of usually not more than $1.0\times10^{10}$ Ω/sq, preferably not more than $7.5\times10^{9}$ Ω/sq, more preferably not more than $5.0\times10^{9}$ Ω/sq.

In case of using the black magnetic acicular composite particles as magnetic particles, wherein the magnetic acicular iron oxide particles coated with hydroxides and/or oxides of aluminum and/or silicon are used as core particles, the magnetic recording medium according to the present invention has a coercive force of usually 250 to 500 Oe, preferably 300 to 500 Oe; a squareness (residual magnetic flux density Br/saturation magnetic flux density Bm) of usually 0.85 to 0.95, preferably 0.86 to 0.95; a gloss (of the coating film) of usually 155 to 300%, preferably 165 to 300%; a surface roughness Ra (of the coating film) of usually not more than 11.0 nm, preferably 2.0 to 10.0 nm, more preferably 2.0 to 9.0 nm, a Young's modulus (relative value to a commercially available video tape: AV T-120 produced by Victor Company of Japan, Limited) of usually 126 to 160, preferably 127 to 160; a linear adsorption coefficient (of the coating film) of usually 1.30 to 10.0 $\mu m^{-1}$, preferably 1.35 to 10.0 $\mu m^{-1}$; and a surface resistivity of usually not more than $1.0\times10^{10}$ Ω/sq, preferably not more than $7.5\times10^{9}$ Ω/sq, more preferably not more than $5.0\times10^{9}$ Ω/sq.

In case of using the black magnetic acicular composite particles as magnetic particles, wherein the magnetic acicular cobalt-coated iron oxide particles which are coated with hydroxides and/or oxides of aluminum and/or silicon, are used as core particles, the magnetic recording medium according to the present invention has a coercive force of usually 500 to 1700 Oe, preferably 550 to 1700 Oe; a squareness (residual magnetic flux density Br/saturation magnetic flux density Bm) of usually 0.85 to 0.95, preferably 0.86 to 0.95; a gloss (of the coating film) of usually 165 to 300%, preferably 170 to 300%; a surface roughness Ra (of the coating film) of usually not more than 11.0 nm, preferably 2.0 to 10.0 nm, more preferably 2.0 to 9.0 nm, a Young's modulus (relative value to a commercially available video tape: AV T-120 produced by Victor Company of Japan, Limited) of usually 126 to 160, preferably 127 to 160; a linear adsorption coefficient (of the coating film) of usually 1.30 to 10.0 $\mu m^{-1}$, preferably 1.35 to 10.0 $\mu m^{-1}$; and a surface resistivity of usually not more than $1.0\times10^{10}$ Ω/sq, preferably not more than $7.5\times10^{9}$ Ω/sq, more preferably not more than $5.0\times10^{9}$ Ω/sq.

In case of using the black magnetic acicular composite particles as magnetic particles, wherein the magnetic acicular metal particles containing iron as a main component which are coated with hydroxides and/or oxides of aluminum and/or silicon, which are coated with hydroxides and/or oxides of aluminum and/or silicon, are used as core particles, the magnetic recording medium according to the present invention has a coercive force of usually 800 to 3500 Oe, preferably 900 to 3500 Oe; a squareness (residual magnetic flux density Br/saturation magnetic flux density Bm) of usually 0.85 to 0.95, preferably 0.86 to 0.95; a gloss (of the coating film) of usually 185 to 300%, preferably 195 to 300%; a surface roughness Ra (of the coating film) of usually not more than 11.0 nm, preferably 2.0 to 10.0 nm, more preferably 2.0 to 9.0 nm, a Young's modulus (relative value to a commercially available video tape: AV T-120 produced by Victor Company of Japan, Limited) of usually 126 to 160, preferably 127 to 160; a linear adsorption coefficient (of the coating film) of usually 1.40 to 10.0 $\mu m^{-1}$, preferably 1.45 to 10.0 $\mu m^{-1}$; and a surface resistivity of usually not more than $1.0\times10^{10}$ Ω/sq, preferably not more than $7.5\times10^{9}$ Ω/sq, more preferably not more than $5.0\times10^{9}$ Ω/sq.

The black magnetic acicular composite particles according to the present invention can be produced by the following method.

Among the magnetic acicular particles used in the present invention, the acicular magnetite particles may be produced by passing an oxygen-containing gas through a suspension containing either ferric hydroxide colloid, iron carbonate or iron-containing precipitate, which is obtained by reacting an aqueous ferric salt solution with alkali hydroxide, alkali carbonate or both alkali hydroxide and alkali carbonate, while controlling the pH value and temperature of the suspension to produce acicular, spindle-shaped or rice-ball goethite particles, subjecting the obtained goethite particles to filtration, washing with water and drying, and then heat-reducing the thus treated goethite particles at a temperature of 300 to 800° C. in a reducing gas atmosphere.

The acicular maghemite particles can be obtained by heating the above-mentioned magnetite particles in oxygen-containing gas at 300 to 600° C.

The magnetic acicular metal particles containing iron as a main component, can be obtained by heat-treating the above-mentioned acicular goethite particles or hematite particles obtained by heat-dehydrating the above-mentioned acicular goethite particles in a reducing gas at 300 to 500° C.

The coating of the magnetic acicular particles with the alkoxysilane compounds, the polysiloxanes, the modified polysiloxanes, the terminal-modified polysiloxanes or the fluoroalkylsilane compounds, may be conducted (i) by mechanically mixing and stirring the magnetic acicular particles together with the alkoxysilane compounds, the polysiloxanes, the modified polysiloxanes, the terminal-modified polysiloxanes or the fluoroalkylsilane compounds; or (ii) by mechanically mixing and stirring both the components together while spraying the alkoxysilane compounds, the polysiloxanes, the modified polysiloxanes, the terminal-modified polysiloxanes or the fluoroalkylsilane compounds onto the magnetic acicular particles. In these cases, substantially whole amount of the alkoxysilane compounds, the polysiloxanes, the modified polysiloxanes, the terminal-modified polysiloxanes or the fluoroalkylsilane compounds added can be applied onto the surfaces of the magnetic acicular particles.

In order to uniformly coat the surfaces of the magnetic acicular particles with the alkoxysilane compounds, the polysiloxanes, the modified polysiloxanes, the terminal-modified polysiloxanes or the fluoroalkylsilane compounds, it is preferred that the magnetic acicular particles are preliminarily diaggregated by using a pulverizer.

As apparatus (a) for mixing and stirring the core particles with the alkoxysilane compounds, the polysiloxanes, the modified polysiloxanes, the terminal-modified polysiloxanes or the fluoroalkylsilane compounds to form the coating layer thereof, and (b) for mixing and stirring carbon black fine particles with the particles whose surfaces are coated with the alkoxysilane compounds, the polysiloxanes, the modified polysiloxanes, the terminal-modified polysiloxanes or the fluoroalkylsilane compounds to form the carbon black coat, there may be preferably used those apparatus capable of applying a shear force to the particles, more preferably those apparatuses capable of conducting the application of shear force, spaturate force and compressed force at the same time. In addition, by conducting the above mixing or stirring treatment (a) of the core particles together with the alkoxysilane compounds, the polysiloxanes, the modified polysiloxanes, the terminal-modified polysiloxanes or the fluoroalkylsilane compounds, at least a part of the alkoxysilane compounds and the fluoroalkylsilane compounds coated on the core particles may be changed to the organosilane compounds and fluoroalkyl organosilane compounds, respectively.

As such apparatuses, there may be exemplified wheel-type kneaders, ball-type kneaders, blade-type kneaders, roll-type kneaders or the like. Among them, wheel-type kneaders are preferred.

Specific examples of the wheel-type kneaders may include an edge runner (equal to a mix muller, a Simpson mill or a sand mill), a multi-mull, a Stotz mill, a wet pan mill, a Conner mill, a ring muller, or the like. Among them, an edge runner, a multi-mull, a Stotz mill, a wet pan mill and a ring muller are preferred, and an edge runner is more preferred.

Specific examples of the ball-type kneaders may include a vibrating mill or the like. Specific examples of the blade-type kneaders may include a Henschel mixer, a planetary mixer, a Nawter mixer or the like. Specific examples of the roll-type kneaders may include an extruder or the like.

In order to coat the surfaces of the core particles with the alkoxysilane compounds, the polysiloxanes, the modified polysiloxanes, the terminal-modified polysiloxanes or the fluoroalkylsilane compounds as uniformly as possible, the conditions of the above mixing or stirring treatment may be appropriately controlled such that the linear load is usually 2 to 200 Kg/cm, preferably 10 to 150 Kg/cm, more preferably 15 to 100 Kg/cm; and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the alkoxysilane compounds, the polysiloxanes, the modified polysiloxanes, the terminal-modified polysiloxanes or the fluoroalkylsilane compounds added, is preferably 0.15 to 45 parts by weight based on 100 parts by weight of the magnetic acicular particles. When the amount of the the alkoxysilane compounds, the polysiloxanes, the modified polysiloxanes, the terminal-modified polysiloxanes or the fluoroalkylsilane compounds added is less than 0.15 part by weight, it may become difficult to form the carbon black coat in such an amount enough to improve the blackness and volume resistivity of the obtained black magnetic acicular composite particles. On the other hand, when the amount of the alkoxysilane compounds, the polysiloxanes, the modified polysiloxanes, the terminal-modified polysiloxanes or the fluoroalkylsilane compounds added is more than 45 parts by weight, a sufficient amount of the carbon black coat can be formed on the surface of the coating layer composed of the alkoxysilane compounds, the polysiloxanes, the modified polysiloxanes, the terminal-modified polysiloxanes or the fluoroalkylsilane compounds, but it is meaningless because the blackness and volume resistivity of the obtained black magnetic acicular composite particles cannot be further improved by using such an excess amount of the alkoxysilane compounds, the polysiloxanes, the modified polysiloxanes, the terminal-modified polysiloxanes or the fluoroalkylsilane compounds.

Next, the carbon black fine particles are added to the magnetic acicular particles coated with the alkoxysilane compounds, the polysiloxanes, the modified polysiloxanes, the terminal-modified polysiloxanes or the fluoroalkylsilane compounds, and the resultant mixture is mixed and stirred to form the carbon black coat on the surfaces of the coating layer composed of the alkoxysilane compounds, the polysiloxanes, the modified polysiloxanes, the terminal-modified polysiloxanes or the fluoroalkylsilane compounds. In addition, by conducting the above mixing or stirring treatment (b) of the carbon black fine particles together with the magnetic acicular particles coated with the alkoxysilane compounds, the polysiloxanes, the modified polysiloxanes, the terminal-modified polysiloxanes or the fluoroalkylsilane compounds, at least a part of the alkoxysilane compounds and the fluoroalkylsilane compounds coated on the magnetic acicular particles as the core particles may be changed to the organosilane compounds and fluoroalkyl organosilane compounds, respectively.

In the case where the alkoxysilane compounds (1) and the fluoroalkylsilane compounds (3) are used as the coating compound, after the carbon black coat is formed on the surface of the coating layer, the resultant composite particles may be dried or heat-treated, for example, at a temperature of usually 40 to 200° C., preferably 60 to 150° C. for usually 10 minutes to 12 hours, preferably 30 minutes to 3 hours, thereby forming a coating layer composed of the organosilane compounds (1) and the fluoroalkyl organosilane compounds (3), respectively.

It is preferred that the carbon black fine particles are added little by little and slowly, especially about 5 to 60 minutes.

In order to form carbon black coat onto the coating layer composed of the alkoxysilane compounds, the polysiloxanes, the modified polysiloxanes, the terminal-modified polysiloxanes or the fluoroalkylsilane compounds as uniformly as possible, the conditions of the above mixing or stirring treatment can be appropriately controlled such that the linear load is usually 2 to 200 Kg/cm, preferably 10 to 150 Kg/cm more preferably 15 to 100 Kg/cm; and the treating time is usually 5 to 120 minutes, preferably 10 to 90 minutes. It is preferred to appropriately adjust the stirring speed in the range of usually 2 to 2,000 rpm, preferably 5 to 1,000 rpm, more preferably 10 to 800 rpm.

The amount of the carbon black fine particles added, is preferably 0.5 to 10 parts by weight based on 100 parts by weight of the magnetic acicular particles. When the amount of the carbon black fine particles added is less than 0.5 part by weight, it may become difficult to form the carbon black coat in such an amount enough to improve the blackness and volume resistivity of the obtained composite particles. On the other hand, when the amount of the carbon black fine particles added is more than 10 parts by weight, a sufficient blackness and volume resistivity of the resultant composite particles can be obtained, but the carbon black tend to be desorbed from the surface of the coating layer because of too large amount of the carbon black adhered, resulting in deteriorated dispersibility in the vehicle upon the production of the magnetic coating composition.

At least a part of the surface of the magnetic acicular particles may be coated with at least one compound selected from the group consisting of hydroxides of aluminum, oxides of aluminum, hydroxides of silicon and oxides of silicon, if required, in advance of mixing and stirring with the alkoxysilane compounds, the polysiloxanes, the modified polysiloxanes, the terminal-modified polysiloxanes or the fluoroalkylsilane compounds.

The coating of the hydroxides and/or oxides of aluminum and/or silicon may be conducted by adding an aluminum compound, a silicon compound or both the compounds to a water suspension in which the magnetic acicular particles are dispersed, followed by mixing and stirring, and further adjusting the pH value of the suspension, if required, thereby coating the surfaces of the magnetic acicular particles with at least one compound selected from the group consisting of hydroxides of aluminum, oxides of aluminum, hydroxides of silicon and oxides of silicon. The thus obtained magnetic acicular particles coated with the hydroxides and/or oxides of aluminum and/or silicon are then filtered out, washed with water, dried and pulverized. Further, the particles coated with the hydroxides and/or oxides of aluminum and/or silicon may be subjected to post-treatments such as deaeration treatment and compaction treatment, if required.

As the aluminum compounds, there may be exemplified aluminum salts such as aluminum acetate, aluminum sulfate, aluminum chloride or aluminum nitrate, alkali aluminates such as sodium aluminate, alumina sols or the like.

The amount of the aluminum compound added is 0.01 to 20% by weight (calculated as Al) based on the weight of the magnetic acicular particles. When the amount of the aluminum compound added is less than 0.01% by weight, it may be difficult to sufficiently coat the surfaces of the magnetic acicular particles with hydroxides and/or oxides of aluminum, thereby failing to achieve the improvement of the dispersibility in the vehicle upon the production of the magnetic coating composition. On the other hand, when the amount of the aluminum compound added is more than 20% by weight, the coating effect is saturated and, therefore, it is meaningless to add such an excess amount of the aluminum compound.

As the silicon compounds, there may be exemplified #3 water glass, sodium orthosilicate, sodium metasilicate, colloidal silica or the like.

The amount of the silicon compound added is 0.01 to 20% by weight (calculated as $SiO_2$) based on the weight of the magnetic acicular particles. When the amount of the silicon compound added is less than 0.01% by weight, it may be difficult to sufficiently coat the surfaces of the magnetic acicular particles with hydroxides and/or oxides of silicon, thereby failing to achieve the improvement of the dispersibility in the vehicle upon the production of the magnetic coating composition. On the other hand, when the amount of the silicon compound added is more than 20% by weight, the coating effect is saturated and, therefore, it is meaningless to add such an excess amount of the silicon compound.

In the case where both the aluminum and silicon compounds are used in combination for the coating, the total amount of the aluminum and silicon compounds added is preferably 0.01 to 20% by weight (calculated as a sum of Al and $SiO_2$) based on the weight of the magnetic acicular particles.

The process of the magnetic recording medium according to the present invention is described as follows.

The magnetic recording medium according to the present invention can be produced by applying a magnetic coating composition containing the black magnetic acicular composite particles, a binder resin and a solvent, on the non-magnetic base film, followed by drying, to form a magnetic recording layer thereon.

As the solvents, there may be used methyl ethyl ketone, toluene, cyclohexanone, methyl isobutyl ketone, tetrahydrofuran, a mixture of these solvents or the like.

The total amount of the solvent used is 65 to 1,000 parts by weight based on 100 parts by weight of the black magnetic acicular composite particles. When the amount of the solvent used is less than 65 parts by weight, the viscosity of the magnetic coating composition prepared therefrom becomes too high, thereby making it difficult to apply the magnetic coating composition. On the other hand, when the amount of the solvent used is more than 1,000 parts by weight, the amount of the solvent volatilized during the formation of the coating film becomes too large, thereby rendering the coating process industrially disadvantageous.

A point of the present invention lies in that the black magnetic acicular composite particles comprising the magnetic acicular particles which may be coated with at least one compound selected from the group consisting of hydroxides of aluminum, oxides of aluminum, hydroxides of silicon and oxides of silicon; the organosilicon compounds coated on the magnetic acicular particle; the carbon black coat formed on the surface of the coating layer comprising the organosilicon compounds, in which the total amount of the carbon black coat formed on the coating layer comprising the organosilicon compounds is 0.5 to 10 parts by weight based on 100 parts by weight of the magnetic acicular particles, can show excellent in dispersibility in vehicle due to less amount of carbon black fallen-off from the surface of each black magnetic acicular composite particle, and have a high blackness and a low volume resistivity.

The reason why the black magnetic acicular composite particles according to the present invention can show an excellent blackness, is considered such that since the carbon black coat are uniformly and densely formed on the surfaces of the magnetic acicular particles, the color tone of the core particles is hidden behind the carbon black, so that an inherent color tone of carbon black can be exhibited.

The reason why the black magnetic acicular composite particles according to the present invention can show a low volume resistivity is considered as follows. That is, the carbon black coat having an excellent conductivity can be uniformly and densely formed onto the surface of each black magnetic acicular composite particle.

The reason why the amount of the carbon black desorbed or fallen-off from the surfaces of the black magnetic acicular composite particles according to the present invention, is small, is considered as follows. That is, the surfaces of the magnetic acicular particles and the organosilicon compounds are strongly bonded to each other, so that the carbon black bonded to the surfaces of the magnetic acicular particles through the organosilicon compounds can be prevented from being desorbed from the magnetic particles.

In particular, in the case of the alkoxysilane compounds (1) and the fluoroalkylsilane compounds (3), metalloxane bonds ($\equiv$—Si—O—M wherein M represents a metal atom contained in the magnetic acicular particles, such as Si, Al, Fe or the like) are formed between the surfaces of the magnetic acicular particles and alkoxy groups contained in the organosilicon compounds onto which the carbon black coat is formed, thereby forming a stronger bond between the organosilicon compounds on which the carbon black coat is formed, and the surfaces of the magnetic acicular particles.

The reason why the black magnetic acicular composite particles according to the present invention can show an excellent dispersibility in a vehicle upon the production of magnetic coating composition, is considered such that since only a small amount of the carbon black is desorbed or fallen-off from the surfaces of the black magnetic acicular composite particles, the black magnetic acicular composite particles is free from deterioration in dispersibility due to the desorbed or fallen-off carbon black, and further since the carbon black coat is formed onto the surfaces of the black magnetic acicular composite particles and, therefore, irregularities are formed on the surfaces of the black magnetic acicular composite particles, the contact between the particles can be suppressed.

The magnetic recording medium according to the present invention which is obtained by using the above-mentioned black magnetic acicular composite particles as magnetic particles, can show a low light transmittance and a low surface resistivity even when the amount of carbon black fine particles added to the magnetic recording layer is as small as possible, and the magnetic recording layer thereof can exhibit an improved surface smoothness.

The reason why the magnetic recording medium can show a low light transmittance even when the amount of carbon black fine particles added to the magnetic recording layer is small, is considered as follows. That is, in the case of the black magnetic acicular composite particles according to the present invention, the carbon black coat can be uniformly and densely formed onto the surface of each magnetic acicular particle and, therefore, can be dispersed in the coating film in such a condition close to primary particles, whereby the carbon black can effectively exhibit their own functions.

The reason why the surface resistivity of the magnetic recording medium can be kept low even when the amount of carbon black added to the magnetic recording layer is small, is considered as follows. That is, due to the fact that the black magnetic acicular composite particles are uniformly dispersed in the coating film, the carbon black coat uniformly and densely formed onto the surfaces thereof is continuously contacted with each other.

The reason why the magnetic recording medium according to the present invention can show an excellent surface smoothness, is considered as follows. That is, in the present invention, since the amount of the carbon black fallen-off from the surfaces of the black magnetic acicular composite particles is lessened and the amount of the carbon black fine particles added to the magnetic recording layer is reduced to as small a level as possible, the black magnetic acicular composite particles can maintain a good dispersibility in vehicle upon production of the magnetic coating composition without being adversely affected by the carbon black fine particles. Further, the black magnetic acicular composite particles themselves can exhibit an excellent dispersibility.

The black magnetic acicular composite particles according to the present invention, can show a high blackness, a low volume resistivity and an excellent dispersibility. Therefore, even though the amount of the carbon black fine particles added to the magnetic recording layer is reduced to as small a level as possible, it is possible to obtain a magnetic recording medium showing a low light transmittance, a low surface resistivity and a smooth surface. Accordingly, the black magnetic acicular composite particles can be suitably used as magnetic particles for high-density magnetic recording media.

As described above, due to the fact that the black magnetic acicular composite particles show an excellent blackness and a low volume resistivity, the magnetic recording medium according to the present invention can exhibit a low light transmittance and a low surface resistivity. Further, since the amount of carbon black fine particles added to the magnetic recording layer is reduced to as small a level as possible and the dispersibility of the black magnetic acicular composite particles themselves is enhanced, the magnetic recording medium can have a smooth surface. Therefore, the magnetic recording medium according to the present invention can be suitably used as those for high-density recording.

Furthermore, the magnetic recording medium according to the present invention is also preferred from the standpoints of safety and hygiene since the amount of the carbon black fine particles added to the magnetic recording layer can be reduced.

EXAMPLES

The present invention is described in more detail by Examples and Comparative Examples, but the Examples are only illustrative and, therefore, not intended to limit the scope of the present invention.

Various properties were evaluated by the following methods.

(1) The average major axis diameter and average minor axis diameter of magnetic acicular particles and black magnetic acicular composite particles, and average particle diameter of carbon black fine particles were respectively expressed by the average of values (measured in a predetermined direction) of about 350 particles which were sampled from a micrograph obtained by magnifying an original electron micrograph (×20,000) by four times in each of the longitudinal and transverse directions.

(2) The aspect ratio of the particles was expressed by the ratio of average major axis diameter to average minor axis diameter thereof.

(3) The geometrical standard deviation of major axis diameter was expressed by values obtained by the following method. That is, the major axis diameters were measured from the above-magnified electron micrograph. The actual major axis diameters and the number of the particles were calculated from the measured values. On a logarithmic normal probability paper, the major axis diameters were plotted at regular intervals on the abscissa-axis and the accumulative number (under integration sieve) of particles belonging to each interval of the major axis diameters were plotted by percentage on the ordinate-axis by a statistical technique.

The major axis diameters corresponding to the number of particles of 50% and 84.13%, respectively, were read from the graph, and the geometrical standard deviation was calculated from the following formula:

Geometrical standard deviation={major axis diameters corresponding to 84.13% under integration sieve}/{major axis diameters (geometrical average diameter) corresponding to 50% under integration sieve}

The closer to 1 the geometrical standard deviation value, the more excellent the particle size distribution.

(4) The specific surface area was expressed by the value measured by a BET method.

(5) The amounts of Al, Si and Co which were present within magnetic acicular particles or black magnetic acicular composite particles or on surfaces thereof, and the amount of Si contained in the organosilicon compounds, were measured by a fluorescent X-ray spectroscopy device 3063 (manufactured by Rigaku Denki Kogyo Co., Ltd.) according to JIS K0119 "General rule of fluorescent X-ray analysis".

(6) The content of $Fe^{2+}$ in the magnetic acicular particles is expressed by the value measured by the following chemical analysis method.

That is, 25 cc of a mixed solution composed of phosphoric acid and sulfuric acid at a mixing ratio of 2:1, was added to 0.5 g of magnetic acicular particles, thereby dissolving the magnetic acicular particles in the mixed solution. After several droplets of diphenylamine sulfonic acid as an indicator was added to the diluted solution, the solution was subjected to oxidation-reduction titration using an aqueous potassium bichromate solution. The titration was terminated when the diluted solution exhibited a violet color. The amount of $Fe^{2+}$ was measured from the amount of the aqueous potassium bichromate solution used up to the termination of the titration.

(7) The amount of carbon black coat formed on the magnetic acicular particles was measured by "Horiba Metal, Carbon and Sulfur Analyzer EMIA-2200 Model" (manufactured by Horiba Seisakusho Co., Ltd.).

(8) The thickness of carbon black coat formed on the surfaces of the magnetic acicular particles is expressed by the value which was obtained by first measuring an average thickness of carbon black coat formed on the surfaces of the magnetic acicular particles on a photograph (×5,000,000) obtained by magnifying (ten times) a micrograph (×500,000) produced at an accelerating voltage of 200 kV using a transmission-type electron microscope (JEM-2010, manufactured by Japan Electron Co., Ltd.), and then calculating an actual thickness of carbon black coat formed from the measured average thickness.

(9) The blackness of magnetic acicular particles and black magnetic acicular composite particles was measured by the following method. That is, 0.5 g of sample particles and 1.5 ml of castor oil were intimately kneaded together by a Hoover's muller to form a paste. 4.5 g of clear lacquer was added to the obtained paste and was intimately kneaded to form a paint. The obtained paint was applied on a cast-coated paper by using a 6-mil (150 $\mu$m) applicator to produce a coating film piece (having a film thickness of about 30 $\mu$m). The thus obtained coating film piece was measured according to JIS Z 8729 by a multi-light source spectrographic colorimeter MSC-IS-2D (manufactured by Suga Testing Machines Manufacturing Co., Ltd.) to determine an L* value of calorimetric indices thereof. The blackness was expressed by the L* value measured.

Here, the L* value represents a lightness, and the smaller the L* value, the more excellent the blackness.

(10) The volume resistivity of the magnetic acicular particles and the black magnetic acicular composite particles was measured by the following method.

That is, first, 0.5 g of a sample particles to be measured was weighted, and press-molded at 140 Kg/cm$^2$ using a KBr tablet machine (manufactured by Simazu Seisakusho Co., Ltd.), thereby forming a cylindrical test piece.

Next, the thus obtained cylindrical test piece was exposed to an atmosphere maintained at a temperature of 25° C. and a relative humidity of 60% for 12 hours. Thereafter, the cylindrical test piece was set between stainless steel electrodes, and a voltage of 15V was applied between the electrodes using a Wheatstone bridge (model 4329A, manufactured by Yokogawa-Hokushin Denki Co., Ltd.) to measure a resistance value R ($\Omega$).

The cylindrical test piece was measured with respect to an upper surface area A (cm$^2$) and a thickness $t_0$ (cm) thereof. The measured values were inserted into the following formula, thereby obtaining a volume resistivity X ($\Omega$·cm).

$X(\Omega \cdot cm) = R \times (A/t_0)$

(11) The desorption percentage of carbon black on the black magnetic acicular composite particles was measured by the following method. The closer to zero the desorption percentage, the smaller the amount of carbon black desorbed from the surfaces of black magnetic acicular composite particles.

That is, 3 g of the black magnetic acicular composite particles and 40 ml of ethanol were placed in a 50-ml precipitation pipe and then was subjected to ultrasonic dispersion for 20 minutes. Thereafter, the obtained dispersion was allowed to stand for 120 minutes, and the carbon black desorbed was separated from the black magnetic acicular composite particles on the basis of the difference in specific gravity between both the composite particles and carbon black. Next, the black magnetic acicular composite particles from which the desorbed carbon black were separated, were mixed again with 40 ml of ethanol, and the obtained mixture was further subjected to ultrasonic dispersion for 20 minutes. Thereafter, the obtained dispersion was allowed to stand for 120 minutes, thereby separating the black magnetic acicular composite particles and the carbon black desorbed from each other. The thus obtained black magnetic acicular composite particles were dried at 100° C. for one hour, and then the carbon content thereof was measured by the "Horiba Metal, Carbon and Sulfur Analyzer EMIA-2200 Model" (manufactured by Horiba Seisakusho Co., Ltd.). The desorption percentage of the carbon black was calculated according to the following formula:

Desorption percentage of carbon black=$\{(W_a - W_e)/W_a\} \times 100$ wherein $W_a$ represents an amount of carbon black initially coated on the black magnetic acicular composite particles;

and $W_e$ represents an amount of carbon black still coated on the black magnetic acicular composite particles after desorption test.

(12) The viscosity of the coating composition was obtained by measuring the viscosity of the coating composition at 25° C. at a shear rate D of 1.92 sec$^{-1}$ by using "E type viscometer EMD-R" (manufactured by Tokyo Keiki, Co., Ltd.).

(13) The gloss of the surface of the coating film of the magnetic recording layer was measured at an angle of incidence of 45° by "glossmeter UGV-5D" (manufactured by Suga Shikenki, Co., Ltd.).

(14) The surface roughness Ra is expressed by the average value of the center-line average roughness of the profile curve of the surface of the coating film of the magnetic recording layer by using "Surfcom-575A" (manufactured by Tokyo Seimitsu Co., Ltd.).

(15) The strenath of the coating film of the magnetic recording layer was expressed the Young's modulus obtained by "Autograph" (produced by Shimazu Seisakusho Co., Ltd.). The Young's modulus was expressed by the ratio of the Young's modulus of the coating film to that of a commercially available video tape "AV T-120" (produce by Victor Company of Japan, Limited). The higher the relative value, the more favorable.

(16) The magnetic properties of the magnetic acicular particles, black magnetic acicular composite particles and magnetic recording medium were measured under an external magnetic field of 10 kOe by "Vibration Sample Magnetometer VSM-3S-15 (manufactured by Toei Kogyo, Co., Ltd.)".

(17) The light transmittance is expressed by the linear adsorption coefficient calculated by substituting the light transmittance measured by using "UV-Vis Recording Spectrophotometer UV-2100" (manufactured by Shimazu Seisakusho, Ltd.) for the following formula. The larger the value, the more difficult it is for the magnetic recording medium to transmit light:

Linear adsorption coefficient $(\mu m^{-1}) = \{1 \text{ n } (1/t)\}/FT$ wherein t represents a light transmittance (–) at λ=900 nm, and FT represents thickness (μm) of the coating film used for the measurement.

(18) The surface resistivity of the coating film of the magnetic recording layer was measured by the following method. That is, the coating film to be measured was exposed to the environment maintained at a temperature of 25° C. and a relative humidity of 60%, for not less than 12 hours. Thereafter, the coating film was slit into 6 mm width, and the slit coating film was placed on two metal electrodes having a width of 6.5 mm such that a coating surface thereof was contacted with the electrodes. 170-gram weights were respectively suspended at opposite ends of the coating film so as to bring the coating film into close contact with the electrodes. D.C. 500 V was applied between the electrodes, thereby measuring the surface resistivity of the coating film.

(19) The thickness of each of the non-magnetic base film and the magnetic recording layer constituting the magnetic recording medium was measured in the following manner by using "Digital Electronic Micrometer R351C" (manufactured by Anritsu Corp.)

The thickness (A) of a non-magnetic base film was first measured. Similarly, the thickness (B) (B=the sum of the thicknesses of the non-magnetic base film and the magnetic recording layer) of a magnetic recording medium obtained by forming a magnetic recording layer on the non-magnetic base film was measured. The thickness of the magnetic recording layer is expressed by (B)–(A).

Example 1

Production of Black Magnetic Acicular Composite Particles 20 kg of acicular cobalt-coated magnetite particles shown in the electron micrograph (×30,000) of FIG. 1 (cobalt content: 2.21% by weight based on the weight of the acicular cobalt-coated magnetite particles; $Fe^{2+}$ content: 15.8% by weight based on the weight of the acicular cobalt-coated magnetite particles; average major axis diameter: 0.278 μm; average minor axis diameter: 0.0330 μm; aspect ratio: 8.4:1; geometrical standard deviation value: 1.38; BET specific surface area value: 38.7 m$^2$/g; blackness (L* value): 22.6; volume resistivity: 7.3×10$^7$ Ω·cm; coercive force value: 686 Oe; saturation magnetization value: 79.1 emu/g), were deagglomerated in 150 liters of pure water using a stirrer, and further passed through a "TK pipeline homomixer" (tradename, manufactured by Tokushu Kika Kogyo Co., Ltd.) three times, thereby obtaining a slurry containing the acicular cobalt-coated magnetite particles.

Successively, the obtained slurry containing the acicular cobalt-coated magnetite particles was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the acicular cobalt-coated magnetite particles were dispersed.

The particles in the obtained slurry which remained on a sieve of 325 meshes (mesh size: 44 μm) was 0%. The slurry was filtered and washed with water, thereby obtaining a filter cake containing the acicular cobalt-coated magnetite particles. After the obtained filter cake containing the acicular cobalt-coated magnetite particles was dried at 120° C., 11.0 kg of the dried particles were then charged into an edge runner "MPUV-2 Model" (tradename, manufactured by Matsumoto Chuzo Tekkosho Co., Ltd.), and mixed and stirred at 30 Kg/cm and a stirring speed of 22 rpm for 15 minutes, while introducing nitrogen gas thereinto at a rate of 2 liter/minute, thereby lightly deagglomerating the particles.

220 g of methyl triethoxysilane was mixed and diluted with 200 ml of ethanol to obtain a methyl triethoxysilane solution. The methyl triethoxysilane solution was added to the deagglomerated acicular cobalt-coated magnetite particles under the operation of the edge runner. The acicular cobalt-coated magnetite particles were continuously mixed and stirred at a linear load of 30 Kg/cm and a stirring speed of 22 rpm for 20 minutes.

Figure 2:
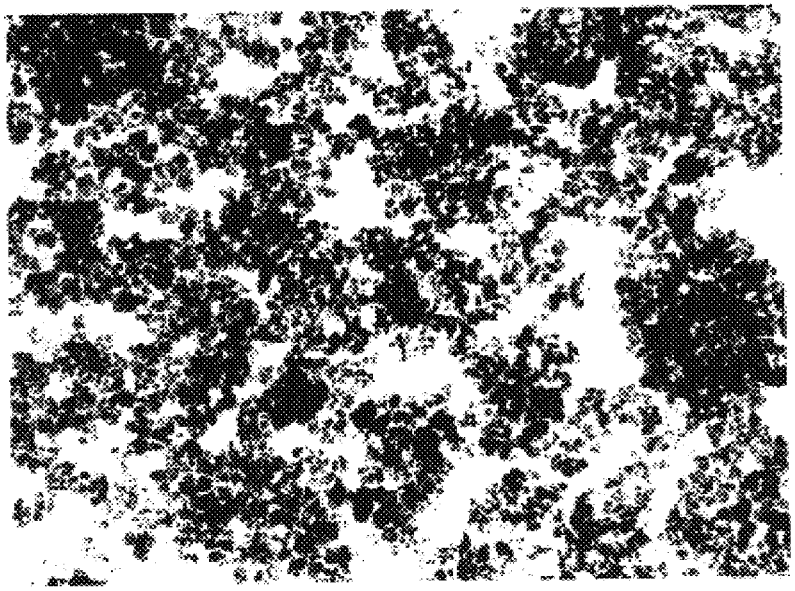
FIG. 2 is an electron micrograph (×30,000) showing a particle structure of carbon black fine particles used in Example 1.

Next, 550 g of carbon black fine particles shown in the electron micrograph (×30,000) of FIG. 2 (particle shape: granular shape; average particle size: 0.022 μm; geometrical standard deviation value: 1.68; BET specific surface area value: 134 m$^2$/g; and blackness (L* value): 16.6) were added to the acicular cobalt-coated magnetite particles coated with methyl triethoxysilane for 10 minutes while operating the edge runner. Further, the mixed particles were continuously stirred at a linear load of 30 Kg/cm and a stirring speed of 22 rpm for 30 minutes to form the carbon black coat on the coating layer composed of methyl triethoxysilane, thereby obtaining black magnetic acicular composite particles.

Figure 3:
FIG. 3 is an electron micrograph (×30,000) showing a particle structure of black magnetic acicular composite particles obtained in Example 1.

The obtained black magnetic acicular composite particles were heat-treated at 80° C. for 120 minutes by using a drier to evaporate water, ethanol or the like which were remained on surfaces of the black magnetic acicular composite particles. As shown in the electron micrograph (×30,000) of FIG. 3, the resultant black magnetic acicular composite particles had an average major axis diameter of 0.279 μm, an average minor axis diameter of 0.0335 μm, an aspect ratio of 8.3:1. In addition, the black magnetic acicular composite particles showed a geometrical standard deviation value of 1.38, a BET specific surface area value of 33.2 m$^2$/g, a blackness (L* value) of 19.5 and a volume resistivity of 5.2×10$^4$ Ω·cm. The desorption percentage of the carbon black from the black magnetic acicular composite particles was 6.8%. As to the magnetic properties, the coercive force value of the black magnetic acicular composite particles was 672 Oe and the saturation magnetization value was 77.3 emu/g. The coating amount of an organosilane compound produced from methyl triethoxysilane was 0.31% by weight (calculated as Si) based on the weight of the black magnetic acicular composite particles (corresponding to 2 parts by weight based on 100 parts by weight of the acicular cobalt-coated magnetite particles). The amount of the carbon black coat formed on the coating layer composed of the organosilane compound produced from methyl triethoxysilane is 4.70% by weight (calculated as C) based on the weight of the black magnetic acicular composite particles (corresponding to 5 parts by weight based on 100 parts by weight of the acicular cobalt-coated magnetite particles). The thickness of the carbon black coat formed was 0.0022 μm. Since no carbon black was observed on the electron micrograph of FIG. 3, it was determined that a whole amount of the carbon black used contributed to the formation of the carbon black coat on the coating layer composed of the organosilane compound produced from methyl triethoxysilane.

Figure 4:
FIG. 4 is an electron micrograph (×30,000) showing a particle structure of mixed particles composed of the acicular cobalt-coated magnetite particles and the carbon black fine particles, for comparative purpose.

Meanwhile, for comparison, the acicular cobalt-coated magnetite particles uncoated with the organosilicon compound and the carbon black fine particles were mixed and stirred together by an edge runner in the same manner as described above, thereby obtaining mixed particles. An electron micrograph (×30,000) of the thus treated particles is shown in FIG. 4. As shown in FIG. 4, it was confirmed that the carbon black fine particles were not adhered on the surfaces of the acicular cobalt-coated magnetite particles, and both the particles were present independently.

Production of Magnetic Recording Medium:
Formation of Magnetic Recording Layer 12 g of the thus obtained black magnetic acicular composite particles, 1.2 g of a polishing agent (AKP-30: trade name, produced by Sumitomo Chemical Co., Ltd.), 0.06 g of carbon black (#3250B, trade name, produced by Mitsubishi Chemical Corp.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mmo glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was as follows:

| | |
|---|---|
| Black magnetic acicular composite particles | 100 parts by weight |
| Vinyl chloride-vinyl acetate copolymer resin having a sodium sulfonate group | 10 parts by weight |
| Polyurethane resin having a sodium sulfonate group | 10 parts by weight |
| Polishing agent (AKP-30) | 10 parts by weight |
| Carbon black (#3250B) | 3.0 parts by weight |
| Lubricant (myristic acid: butyl stearate = 1:2) | 3.0 parts by weight |
| Hardening agent (polyisocyanate) | 5.0 parts by weight |
| Cyclohexanone | 65.8 parts by weight |
| Methyl ethyl ketone | 164.5 parts by weight |
| Toluene | 98.7 parts by weight |

The viscosity of the obtained magnetic coating composition was 2,304 cP.

The magnetic coating composition obtained was applied to a polyethylene terephthalate film (thickness: 12 μm) as a non-magnetic base film to a thickness of 45 μm by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the respective magnetic recording layer was 3.5 μm.

The coercive force value of the magnetic tape produced by forming a magnetic recording layer on the non-magnetic base film was 733 Oe, the squareness (Br/Bm) thereof was 0.89, the gloss thereof was 172%, the surface roughness Ra thereof was 7.8 nm, the Young's modulus (relative value) thereof was 138, the linear absorption coefficient thereof was 1.48 μm$^{-1}$, and the surface resistivity was 1.3×10$^8$ Ω/sq.

Example 2

Production of Black Magnetic Acicular Composite Particles 20 kg of acicular cobalt-coated magnetite particles shown in the electron micrograph (×30,000) of FIG. 1 (cobalt content: 2.21% by weight based on the weight of the acicular cobalt-coated magnetite particles; Fe$^{2+}$ content: 15.8% by weight based on the weight of the acicular cobalt-coated magnetite particles; average major axis diameter: 0.278 μm; average minor axis diameter: 0.0330 μm; aspect ratio: 8.4:1; geometrical standard deviation value: 1.38; BET specific surface area value: 38.7 m$^2$/g; blackness (L* value): 22.6; volume resistivity: 7.3×10$^7$ Ω·cm; coercive force value: 686 Oe; saturation magnetization value: 79.1 emu/g), were deagglomerated in 150 liters of pure water using a stirrer, and further passed through a "TK pipeline homomixer" (tradename, manufactured by Tokushu Kika Kogyo Co., Ltd.) three times, thereby obtaining a slurry containing the acicular cobalt-coated magnetite particles.

Successively, the obtained slurry containing the acicular cobalt-coated magnetite particles was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the acicular cobalt-coated magnetite particles were dispersed.

The particles in the obtained slurry which remained on a sieve of 325 meshes (mesh size: 44 μm) was 0%. The slurry was filtered and washed with water, thereby obtaining a filter cake containing the acicular cobalt-coated magnetite particles. After the obtained filter cake containing the acicular cobalt-coated magnetite particles was dried at 120° C., 11.0 kg of the dried particles were then charged into an edge runner "MPUV-2 Model" (tradename, manufactured by Matsumoto Chuzo Tekkosho Co., Ltd.), and mixed and stirred at 30 Kg/cm and a stirring speed of 22 rpm for 15 minutes, while introducing nitrogen gas thereinto at a rate of 2 liter/minute, thereby lightly deagglomerating the particles.

110 g of methyl hydrogen polysiloxane (tradename: "TSF484", produced by TOSHIBA SILICONE CO., LTD.) were added to the deagglomerated acicular cobalt-coated magnetite particles under the operation of the edge runner. The acicular cobalt-coated magnetite particles were continuously mixed and stirred at a linear load of 30 Kg/cm and a stirring speed of 22 rpm for 20 minutes.

Next, 550 g of carbon black fine particles shown in the electron micrograph (×30,000) of FIG. 2 (particle shape: granular shape; average particle size: 0.022 $\mu$m; geometrical standard deviation value: 1.68; BET specific surface area value: 134 m$^2$/g; and blackness (L* value): 16.6) were added to the acicular cobalt-coated magnetite particles coated with methyl hydrogen polysiloxane for 10 minutes while operating the edge runner. Further, the mixed particles were continuously stirred at a linear load of 30 Kg/cm and a stirring speed of 22 rpm for 20 minutes for 30 minutes to form the carbon black coat on the coating layer composed of methyl hydrogen polysiloxane, thereby obtaining black magnetic acicular composite particles.

The obtained black magnetic acicular composite particles were dried at 80° C. for 120 minutes by using a drier to evaporate water or the like which were remained on surfaces of the black magnetic acicular composite particles. As shown in the electron micrograph, the resultant black magnetic acicular composite particles had an average major axis diameter of 0.279 $\mu$m. an average minor axis diameter of 0.0332 $\mu$m, an aspect ratio of 8.4:1. In addition, the black magnetic acicular composite particles showed a geometrical standard deviation value of 1.38, a BET specific surface area value of 38.9 m$^2$/g, a blackness (L* value) of 19.4 and a volume resistivity of 3.6×10$^4$ $\Omega$·cm. The desorption percentage of the carbon black from the black magnetic acicular composite particles was 6.0%. As to the magnetic properties, the coercive force value of the black magnetic acicular composite particles was 676 Oe and the saturation magnetization value was 77.5 emu/g. The coating amount of the organosilane compound produced from methyl hydrogen polysiloxane was 0.44% by weight (calculated as Si) based on the weight of the black magnetic acicular composite particles (corresponding to 1 parts by weight based on 100 parts by weight of the acicular cobalt-coated magnetite particles). The amount of the carbon black coat formed on the coating layer composed of the organosilane compound produced from methyl hydrogen polysiloxane is 4.72% by weight (calculated as C) based on the weight of the black magnetic acicular composite particles (corresponding to 5 parts by weight based on 100 parts by weight of the acicular cobalt-coated magnetite particles). The thickness of the carbon black coat formed was 0.0022 $\mu$m. Since no carbon black was observed on the electron micrograph, it was determined that a whole amount of the carbon black used contributed to the formation of the carbon black coat on the coating layer composed of the organosilane compound produced from methyl hydrogen polysiloxane.

Production of Magnetic Recording Medium:
Formation of Magnetic Recording Layer 12 g of the thus obtained black magnetic acicular composite particles, 1.2 g of a polishing agent (AKP-30: trade name, produced by Sumitomo Chemical Co., Ltd.), 0.06 g of carbon black (#3250B, trade name, produced by Mitsubishi Chemical Corp.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mm$\phi$ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was the same as Example 1.

The viscosity of the obtained magnetic coating composition was 2,509 cP.

The magnetic coating composition obtained was applied to a polyethylene terephthalate film (thickness: 12 $\mu$m) as a non-magnetic base film to a thickness of 45 $\mu$m by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the respective magnetic recording layer was 3.4 $\mu$m.

The coercive force value of the magnetic tape produced by forming a magnetic recording layer on the non-magnetic base film was 736 Oe, the squareness (Br/Bm) thereof was 0.89, the gloss thereof was 178%, the surface roughness Ra thereof was 6.9 nm, the Young's modulus (relative value) thereof was 138, the linear absorption coefficient thereof was 1.51 $\mu$m$^{-1}$, and the surface resistivity was 1.8×10$^8$ $\Omega$/sq.

Example 3

Production of Black Magnetic Acicular Composite Particles 20 kg of acicular cobalt-coated magnetite particles shown in the electron micrograph (×30,000) of FIG. 1 (cobalt content: 2.21% by weight based on the weight of the acicular cobalt-coated magnetite particles; Fe$^{2+}$ content: 15.8% by weight based on the weight of the acicular cobalt-coated magnetite particles; average major axis diameter: 0.278 $\mu$m; average minor axis diameter: 0.0330 $\mu$m; aspect ratio: 8.4:1; geometrical standard deviation value: 1.38; BET specific surface area value: 38.7 m$^2$/g; blackness (L* value): 22.6; volume resistivity: 7.3×10$^7$ $\Omega$·cm; coercive force value: 686 Oe; saturation magnetization value: 79.1 emu/g), were deagglomerated in 150 liters of pure water using a stirrer, and further passed through a "TK pipeline homomixer" (tradename, manufactured by Tokushu Kika Kogyo Co., Ltd.) three times, thereby obtaining a slurry containing the acicular cobalt-coated magnetite particles.

Successively, the obtained slurry containing the acicular cobalt-coated magnetite particles was passed through a transverse-type sand grinder (tradename "MIGHTY MILL MHG-1.5L", manufactured by Inoue Seisakusho Co., Ltd.) five times at an axis-rotating speed of 2,000 rpm, thereby obtaining a slurry in which the acicular cobalt-coated magnetite particles were dispersed.

The particles in the obtained slurry which remained on a sieve of 325 meshes (mesh size: 44 μm) was 0%. The slurry was filtered and washed with water, thereby obtaining a filter cake containing the acicular cobalt-coated magnetite particles. After the obtained filter cake containing the acicular cobalt-coated magnetite particles was dried at 120° C., 11.0 kg of the dried particles were then charged into an edge runner "MPUV-2 Model" (tradename, manufactured by Matsumoto Chuzo Tekkosho Co., Ltd.), and mixed and stirred at 30 Kg/cm and a stirring speed of 22 rpm for 15 minutes, while introducing nitrogen gas thereinto at a rate of 2 liter/minute, thereby lightly deagglomerating the particles.

220 g of tridecafluorooctyl trimethoxysilane (tradename "TSL82571", produced by TOSHIBA SILICONE CO., LTD.) were added to the deagglomerated acicular cobalt-coated magnetite particles under the operation of the edge runner. The acicular cobalt-coated magnetite particles were continuously mixed and stirred at a linear load of 30 Kg/cm and a stirring speed of 22 rpm for 20 minutes.

Next, 550 g of carbon black fine particles shown in the electron micrograph (×30,000) of FIG. 2 (particle shape: granular shape; average particle size: 0.022 μm; geometrical standard deviation value: 1.68; BET specific surface area value: 134 m$^2$/g; and blackness (L* value): 16.6) were added to the acicular cobalt-coated magnetite particles coated with tridecafluorooctyl trimethoxysilane for 10 minutes while operating the edge runner. Further, the mixed particles were continuously stirred at a linear load of 30 Kg/cm and a stirring speed of 22 rpm for 30 minutes to form the carbon black coat on the coating layer composed of tridecafluorooctyl trimethoxysilane, thereby obtaining black magnetic acicular composite particles.

The obtained black magnetic acicular composite particles were aged at 80° C. for 120 minutes by using a drier to evaporate water or the like which were remained on surfaces of the black magnetic acicular composite particles. As seen in the electron micrograph, the resultant black magnetic acicular composite particles had an average major axis diameter of 0.279 μm, an average minor axis diameter of 0.0335 μm, an aspect ratio of 8.3:1. In addition, the black magnetic acicular composite particles showed a geometrical standard deviation value of 1.38, a BET specific surface area value of 38.2 m$^2$/g, a blackness (L* value) of 19.6 and a volume resistivity of 6.8×10$^4$ Ω·cm. The desorption percentage of the carbon black from the black magnetic acicular composite particles was 6.5% As to the magnetic properties, the coercive force value of the black magnetic acicular composite particles was 680 Oe and the saturation magnetization value was 77.1 emu/g. The coating amount of a fluoroalkyl organosilane compound produced from tridecafluorooctyl trimethoxysilane was 0.12% by weight (calculated as Si) based on the weight of the black magnetic acicular composite particles (corresponding to 2 parts by weight based on 100 parts by weight of the acicular cobalt-coated magnetite particles). The amount of the carbon black coat formed on the coating layer composed of the fluoroalkyl organosilane compound produced from tridecafluorooctyl trimethoxysilane is 4.69% by weight (calculated as C) based on the weight of the black magnetic acicular composite particles (corresponding to 5 parts by weight based on 100 parts by weight of the acicular cobalt-coated magnetite particles). The thickness of the carbon black coat formed was 0.0022 μm. Since no carbon black was observed on the electron micrograph, it was determined that a whole amount of the carbon black used contributed to the formation of the carbon black coat on the coating layer composed of the fluoroalkyl organosilane compound produced from tridecafluorooctyl trimethoxysilane.

Production of Magnetic Recording Medium: Formation of Magnetic Recording Layer 12 g of the thus obtained black magnetic acicular composite particles, 1.2 g of a polishing agent (AKP-30: trade name, produced by Sumitomo Chemical Co., Ltd.), 0.06 g of carbon black (#3250B, trade name, produced by Mitsubishi Chemical Corp.), a binder resin solution (30% by weight of vinyl chloride-vinyl acetate copolymer resin having a sodium sulfonate group and 70% by weight of cyclohexanone) and cyclohexanone were mixed to obtain a mixture (solid content: 78% by weight). The mixture was further kneaded by a plast-mill for 30 minutes to obtain a kneaded material.

The thus-obtained kneaded material was charged into a 140 ml-glass bottle together with 95 g of 1.5 mmφ glass beads, a binder resin solution (30% by weight of polyurethane resin having a sodium sulfonate group and 70% by weight of a solvent (methyl ethyl ketone:toluene=1:1)), cyclohexanone, methyl ethyl ketone and toluene, and the mixture was mixed and dispersed by a paint shaker for 6 hours. Then, the lubricant and hardening agent were added to the mixture, and the resultant mixture was mixed and dispersed by a paint shaker for 15 minutes.

The thus-obtained magnetic coating composition was the same as Example 1.

The viscosity of the obtained magnetic coating composition was 2,560 cP.

The magnetic coating composition obtained was applied to a polyethylene terephthalate film (thickness: 12 μm) as a non-magnetic base film to a thickness of 45 μm by an applicator, and the magnetic recording medium obtained was oriented and dried in a magnetic field, and then calendered. The magnetic recording medium was then subjected to a curing reaction at 60° C. for 24 hours, and thereafter slit into a width of 0.5 inch, thereby obtaining a magnetic tape. The thickness of the respective magnetic recording layer was 3.5 μm.

The coercive force value of the magnetic tape produced by forming a magnetic recording layer on the non-magnetic undercoat layer was 735 Oe, the squareness (Br/Bm) thereof was 0.89, the gloss thereof was 176%, the surface roughness Ra thereof was 7.2 nm, the Young's modulus (relative value) thereof was 138, the linear absorption coefficient thereof was 1.50 μm$^{-1}$, and the surface resistivity was 1.5×10$^8$ Ω/sq.

Core Particles 1 to 5

Various magnetic acicular particles were prepared by known methods. The same procedure as defined in Example 1 was conducted by using the thus magnetic acicular particles, thereby obtaining deagglomerated magnetic acicular particles as core particles.

Various properties of the thus obtained magnetic acicular particles are shown in Table 1.

Core Particles 6

The same procedure as defined in Example 1 was conducted by using 20 kg of the deagglomerated acicular cobalt-coated maghemite particles (core particles 1) and 150 liters of water, thereby obtaining a slurry containing the acicular cobalt-coated maghemite particles. The pH value of the obtained re-dispersed slurry containing the acicular cobalt-coated maghemite particles was adjusted to 10.5 by adding an aqueous sodium hydroxide solution, and then the concentration of the slurry was adjusted to 98 g/liter by adding water thereto. After 150 liters of the slurry was heated to 60° C., 5,444 ml of a 1.0 mol/liter sodium aluminate solution (equivalent to 1.0% by weight (calculated as Al) based on the weight of the acicular cobalt-coated maghemite particles) was added to the slurry. After allowing the slurry to stand for 30 minutes, the pH value of the slurry was adjusted to 7.5 by adding an aqueous acetic acid solution. After further allowing the slurry to stand for 30 minutes, the slurry was subjected to filtration, washing with water, drying and pulverization, thereby obtaining the octahedral magnetite particles coated with hydroxides of aluminum.

Main production conditions are shown in Table 2, and various properties of the obtained acicular cobalt-coated maghemite particles are shown in Table 3.

Core Particles 7 to 10

The same procedure as defined in the production of the core particles 6 above, was conducted except that kind of core particles, and kind and amount of additives used in the surface treatment were varied, thereby obtaining surface-treated magnetic acicular particles.

Main production conditions are shown in Table 2, and various properties of the obtained surface-treated magnetic acicular particles are shown in Table 3.

Examples 4 to 13 and

Comarative Examples 1 to 5

The same procedure as defined in Example 1 was conducted except that kind of core particles to be treated, addition or non-addition of an alkoxysilane compound in the coating treatment with the alkoxysilane compound, kind and amount of the alkoxysilane compound added, treating conditions of edge runner in the coating treatment, kind and amount of carbon black fine particles, and treating conditions of edge runner used in the forming process of the carbon black coat, were varied, thereby obtaining black magnetic acicular composite particles. The black magnetic acicular composite particles obtained in Examples 4 to 13 were observed by an electron microscope. As a result, almost no carbon black was recognized. Therefore, it was confirmed that a substantially whole amount of the carbon black used contributed to the formation of the carbon black coat on the coating layer composed of organosilane compound produced from the alkoxysilane compound.

Various properties of the carbon black fine particles A to C are shown in Table 4.

Main production conditions are shown in Table 5, and various properties of the obtained black magnetic acicular composite particles are shown in Table 6.

Figure 5:
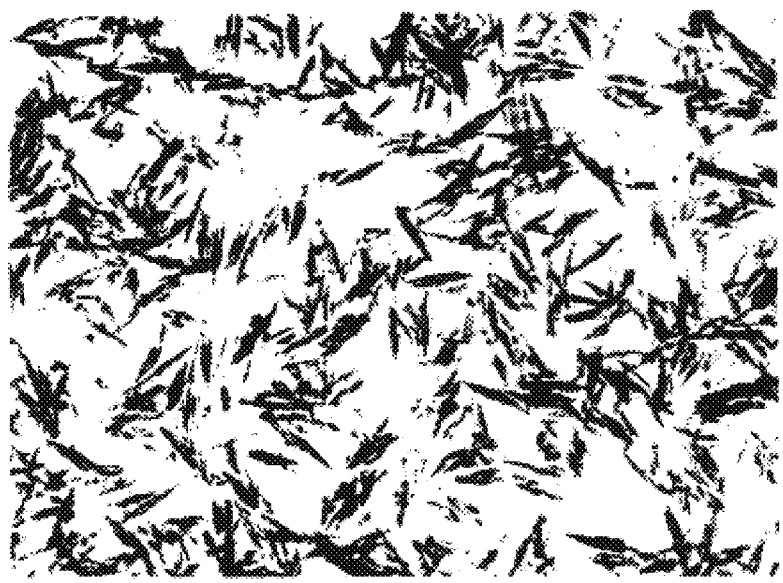
FIG. 5 is an electron micrograph (×30,000) showing a particle structure of surface-treated spindle-shaped cobalt-coated maghemite particles obtained in "Core particles 7".
Figure 6:
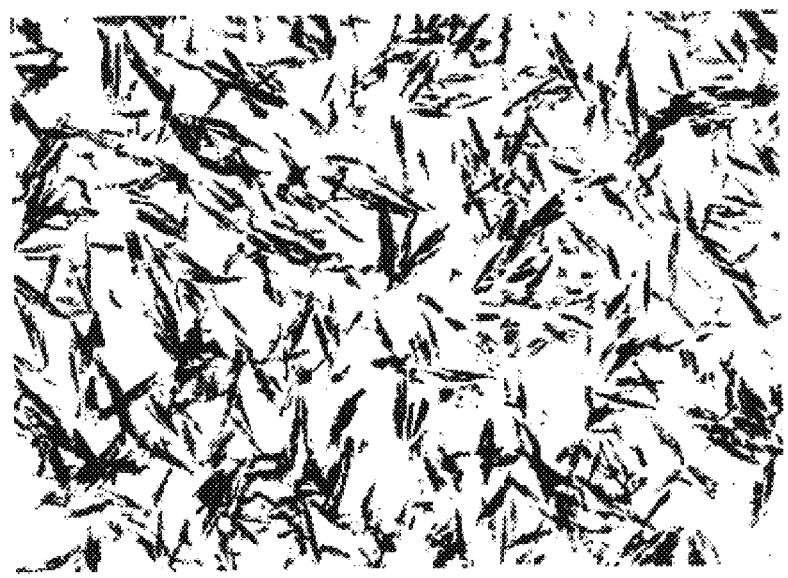
FIG. 6 is an electron micrograph (×30,000) showing a particle structure of black magnetic spindle-shaped composite particles obtained in Example 10.

The electron micrograph (×30,000) of the surface-treated cobalt-coated spindle-shaped maghemite particles as the core particles 7 is shown in FIG. 5. Further, the electron micrograph (×30,000) of the black magnetic spindle-shaped composite particles obtained in Example 10 by using the surface-treated cobalt-coated spindle-shaped maghemite particles as the core particles 7, is shown in FIG. 6.

Figure 7:
FIG. 7 is an electron micrograph (×30,000) showing a particle structure of mixed particles composed of the surface-treated spindle-shaped cobalt-coated maghemite particles and the carbon black fine particles, for comparative purpose.

Meanwhile, as a reference, the electron micrograph (×30,000) of the treated particles obtained by mixing and stirring the surface-treated cobalt-coated spindle-shaped maghemite particles as the core particles 7 and the carbon black fine particles together by an edge runner without coating with methyl triethoxy silane, is shown in FIG. 7. As is shown in the electron micrograph of FIG. 7, it was confirmed that the carbon black was not coated onto the surfaces of the surface-treated cobalt-coated spindle-shaped maghemite particles, and both the particles were present independently and separately from each other.

Examples 14 to 26

Comparative Examples 6 to 20

Production of Magnetic Recording Medium

The same procedure as defined in Example 1 was conducted except for varying the kind of the magnetic acicular particles, the kind and amount of the carbon black fine particles added, thereby producing a magnetic recording medium.

The main producing conditions and various properties are shown in Tables 7 to 8.

Examples 27 to 56 and

Comparative Examples 21 to 29

The same procedure as defined in Example 2 was conducted except that kind of core particles to be treated, addition or non-addition of an polysiloxane compound in the coating treatment, kind and amount of the polysiloxane compound added, treating conditions of edge runner in the coating treatment, kind and amount of carbon black fine particles, and treating conditions of edge runner used in the forming process of the carbon black coat, were varied, thereby obtaining black magnetic acicular composite particles. The black magnetic acicular composite particles obtained in Examples 27 to 56 were observed by an electron microscope. As a result, almost no carbon black was recognized. Therefore, it was confirmed that a substantially whole amount of the carbon black used contributed to the formation of the carbon black coat on the coating layer composed of polysiloxane.

Main production conditions are shown in Tables 9, 11 and 13, and various properties of the obtained black magnetic acicular composite particles are shown in Tables 10, 12 and 14.

Examples 57 to 95

Comparative Examples 30 to 38

Production of Magnetic Recording Medium

The same procedure as defined in Example 2 was conducted except for varying the kind of the black magnetic acicular composite particles, the kind and amount of the carbon black fine particles added, thereby producing a magnetic recording medium.

The main producing conditions and various properties are shown in Tables 15 to 17.

Examples 96 to 105 and

Comparative Examples 39 to 41

The same procedure as defined in Example 3 was conducted except that kind of core particles to be treated, addition or non-addition of a fluoroalkylsilane compound in the coating treatment with the fluoroalkyl organosilane compound, kind and amount of the fluoroalkylsilane compound added, treating conditions of edge runner in the coating treatment, kind and amount of carbon black fine particles, and treating conditions of edge runner used in the forming process of the carbon black coat, were varied, thereby obtaining black magnetic acicular composite particles. The black magnetic acicular composite particles obtained in Examples 96 to 105 were observed by an electron microscope. As a result, almost no carbon black was recognized. Therefore, it was confirmed that a substantially whole amount of the carbon black used contributed to the formation of the carbon black coat on the coating layer composed of fluoroalkyl organosilane compound produced from the fluoroalkylsilane compound.

Main production conditions are shown in Table 18, and various properties of the obtained black magnetic acicular composite particles are shown in Table 19.

Examples 106 to 118

Comparative Examples 42 to 44

Production of Magnetic Recording Medium

The same procedure as defined in Example 3 was conducted except for varying the kind of the magnetic acicular particles, the kind and amount of the carbon black fine particles added, thereby producing a magnetic recording medium.

The main producing conditions and various properties are shown in Table 20.

TABLE 1

| Core particles | Kind of core particles | Properties of magnetic acicular particles Particle shape |
|---|---|---|
| Core particles 1 | Co-coated maghemite particles (Co content: 2.64 wt. %) | Acicular |
| Core particles 2 | Co-coated maghemite particles (Co content: 4.21 wt. %) | Spindle-shaped |
| Core particles 3 | Co-coated magnetite particles (Co content: 2.21 wt. %) ($Fe^{2+}$ content: 15.6 wt. %) | Acicular |
| Core particles 4 | Co-coated magnetite particles (Co content: 4.82 wt. %) ($Fe^{2+}$ content: 13.8 wt. %) | Spindle-shaped |
| Core particles 5 | Magnetic acicular metal particles containing iron as a main component (Al content: 2.74 wt. %) (Co content: 5.61 wt. %) | Spindle-shaped |

| | Properties of magnetic acicular particles | | |
|---|---|---|---|
| | Average major axis diameter ($\mu$m) | Average minor axis diameter ($\mu$m) | Aspect ratio (–) |
| Core particles 1 | 0.275 | 0.0335 | 8.2:1 |
| Core particles 2 | 0.211 | 0.0285 | 7.4:1 |
| Core particles 3 | 0.289 | 0.0361 | 8.0:1 |
| Core particles 4 | 0.151 | 0.0221 | 6.8:1 |
| Core particles 5 | 0.127 | 0.0177 | 7.2:1 |

TABLE 1-continued

| | Properties of magnetic acicular particles | | |
|---|---|---|---|
| | Geometrical standard deviation value (–) | BET specific surface area value ($m^2$/g) | Coercive force value (Oe) |
| Core particles 1 | 1.40 | 35.5 | 689 |
| Core particles 2 | 1.36 | 40.8 | 845 |
| Core particles 3 | 1.43 | 31.2 | 712 |
| Core particles 4 | 1.44 | 53.2 | 913 |
| Core particles 5 | 1.39 | 53.4 | 1,915 |

| | Properties of magnetic acicular particles | | |
|---|---|---|---|
| | Saturation magnetization value (emu/g) | Volume resistivity ($\Omega$.cm) | Blackness (L* value) (–) |
| Core particles 1 | 76.3 | $5.2 \times 10^8$ | 24.0 |
| Core particles 2 | 78.9 | $3.2 \times 10^8$ | 25.1 |
| Core particles 3 | 83.1 | $8.5 \times 10^7$ | 22.5 |
| Core particles 4 | 81.3 | $4.8 \times 10^7$ | 22.3 |
| Core particles 5 | 135.6 | $1.6 \times 10^7$ | 22.4 |

TABLE 2

| Kind of Core particles | core particles | Surface-treating process Additives Kind | Calculated as | Amount (wt. %) |
|---|---|---|---|---|
| Core particles 6 | Core particles 1 | Sodium aluminate | Al | 1.0 |
| Core particles 7 | Core particles 2 | Water glass #3 | $SiO_2$ | 0.75 |
| Core particles 8 | Core particles 3 | Aluminum sulfate | Al | 2.0 |
| | | Water glass #3 | $SiO_2$ | 0.5 |
| Core particles 9 | Core particles 4 | Sodium aluminate | Al | 0.25 |
| | | Colloidal silica | $SiO_2$ | 3.0 |
| Core particles 10 | Core particles 5 | Water glass #3 | $SiO_2$ | 5.0 |

| Core particles | Surface-treating process Coating material | | |
|---|---|---|---|
| | Kinds | Calculated as | Amount (wt. %) |
| Core particles 6 | A | Al | 0.98 |
| Core particles 7 | S | $SiO_2$ | 0.72 |

TABLE 2-continued

| Core particles | | | |
|---|---|---|---|
| Core particles 8 | A | Al | 1.93 |
| | S | SiO$_2$ | 0.46 |
| Core particles 9 | A | Al | 0.24 |
| | S | SiO$_2$ | 2.80 |
| Core particles 10 | S | SiO$_2$ | 4.74 |

Note;
A: Hydroxide of aluminum
S: Oxide of silicon

TABLE 3

Properties of surface-treated magnetic acicular particles

| Core particles | Average major axis diameter (μm) | Average minor axis diameter (μm) | Aspect ratio (−) |
|---|---|---|---|
| Core particles 6 | 0.275 | 0.0335 | 8.2:1 |
| Core particles 7 | 0.211 | 0.0286 | 7.4:1 |
| Core particles 8 | 0.289 | 0.0362 | 8.0:1 |
| Core particles 9 | 0.151 | 0.0221 | 6.8:1 |
| Core particles 10 | 0.127 | 0.0178 | 7.1:1 |

Properties of surface-treated magnetic acicular particles

| Core particles | Geometrical standard deviation value (−) | BET specific surface area value (m$^2$/g) | Coercive force value (Oe) |
|---|---|---|---|
| Core particles 6 | 1.40 | 35.3 | 681 |
| Core particles 7 | 1.36 | 42.1 | 832 |
| Core particles 8 | 1.43 | 33.3 | 703 |
| Core particles 9 | 1.44 | 54.2 | 890 |
| Core particles 10 | 1.39 | 55.6 | 1,893 |

Properties of surface-treated magnetic acicular particles

| Core particles | Saturation magnetization value (emu/g) | Volume resistivity (Ω.cm) | Blackness (L* value) (−) |
|---|---|---|---|
| Core particles 6 | 75.8 | 8.6 × 10$^8$ | 24.1 |
| Core particles 7 | 78.7 | 4.4 × 10$^8$ | 25.6 |
| Core particles 8 | 81.9 | 8.4 × 10$^7$ | 21.8 |
| Core particles 9 | 79.0 | 9.1 × 10$^7$ | 22.3 |
| Core particles 10 | 130.4 | 3.8 × 10$^7$ | 20.6 |

TABLE 4

Properties of carbon black fine particles

| Kind of carbon black fine particles | Particle shape | Average particle size (μm) | Geometrical standard deviation value (−) |
|---|---|---|---|
| Carbon black A | Granular | 0.022 | 1.78 |
| Carbon black B | Granular | 0.015 | 1.56 |
| Carbon black C | Granular | 0.030 | 2.06 |

Properties of carbon black fine particles

| Kind of carbon black fine particles | BET specific surface area (m$^2$/g) | Blackness (L* value) (−) |
|---|---|---|
| Carbon black A | 133.5 | 14.6 |
| Carbon black B | 265.3 | 15.2 |
| Carbon black C | 84.6 | 17.0 |

TABLE 5

Production of black magnetic acicular composite particles
Coating with alkoxysilane or silicon compound
Additives

| Examples and Comparative Examples | Kind of core particles | Kind | Amount added (part by weight) |
|---|---|---|---|
| Example 4 | Core particles 1 | Methyl triethoxysilane | 1.0 |
| Example 5 | Core particles 2 | Methyl trimethoxysilane | 1.5 |
| Example 6 | Core particles 3 | Dimethyl dimethoxysilane | 3.5 |
| Example 7 | Core particles 4 | Phenyl triethoxysilane | 1.0 |
| Example 8 | Core particles 5 | Isobutyl trimethoxysilane | 5.0 |
| Example 9 | Core particles 6 | Methyl triethoxysilane | 2.0 |
| Example 10 | Core particles 7 | Methyl trimethoxysilane | 1.0 |
| Example 11 | Core particles 8 | Dimethyl dimethoxysilane | 2.0 |
| Example 12 | Core particles 9 | Phenyl triethoxysilane | 4.5 |
| Example 13 | Core particles 10 | Isobutyl trimethoxysilane | 3.0 |
| Comparative Example 1 | Core particles 1 | — | — |
| Comparative Example 2 | Core particles 1 | Methyl triethoxysilane | 1.0 |
| Comparative Example 3 | Core particles 4 | Dimethyl dimethoxysilane | 0.5 |
| Comparative Example 4 | Core particles 4 | Methyl triethoxysilane | 0.005 |
| Comparative Example 5 | Core particles 1 | γ-aminopropyl triethoxysilane | 1.0 |

TABLE 5-continued

Production of black magnetic acicular composite particles
Coating with alkoxysilane or silicon compound

| Examples and Comparative Examples | Edge runner treatment Linear load (Kg/cm) | Time (min) | Coating amount (calculated as Si) (wt. %) |
|---|---|---|---|
| Example 4 | 30 | 30 | 0.16 |
| Example 5 | 45 | 20 | 0.30 |
| Example 6 | 30 | 20 | 0.79 |
| Example 7 | 30 | 20 | 0.12 |
| Example 8 | 15 | 20 | 0.75 |
| Example 9 | 45 | 20 | 0.31 |
| Example 10 | 60 | 30 | 0.20 |
| Example 11 | 25 | 20 | 0.46 |
| Example 12 | 30 | 20 | 0.50 |
| Example 13 | 15 | 20 | 0.46 |
| Comparative Example 1 | — | — | — |
| Comparative Example 2 | 30 | 20 | 0.16 |
| Comparative Example 3 | 30 | 20 | 0.12 |
| Comparative Example 4 | 30 | 20 | $7 \times 10^{-4}$ |
| Comparative Example 5 | 30 | 20 | 0.13 |

Production of black magnetic acicular composite particles
Coating of carbon black

| Examples and Comparative Examples | Carbon black Kind | Amount added (part by weight) |
|---|---|---|
| Example 4 | A | 5.0 |
| Example 5 | A | 3.0 |
| Example 6 | B | 1.0 |
| Example 7 | B | 1.5 |
| Example 8 | C | 2.0 |
| Example 9 | A | 5.0 |
| Example 10 | A | 3.0 |
| Example 11 | B | 1.0 |
| Example 12 | B | 2.0 |
| Example 13 | C | 1.0 |
| Comparative Example 1 | A | 2.0 |
| Comparative Example 2 | — | — |
| Comparative Example 3 | A | 0.01 |
| Comparative Example 4 | B | 2.0 |
| Comparative Example 5 | C | 2.0 |

Production of black magnetic acicular composite particles
Coating of carbon black

| Examples and Comparative Examples | Edge runner treatment Linear load (Kg/cm) | Time (min) | Amount carbon black coat (calculated as C) (wt. %) |
|---|---|---|---|
| Example 4 | 30 | 30 | 4.75 |
| Example 5 | 45 | 20 | 2.82 |
| Example 6 | 60 | 30 | 0.97 |
| Example 7 | 30 | 20 | 1.45 |
| Example 8 | 15 | 20 | 1.89 |
| Example 9 | 30 | 20 | 4.76 |
| Example 10 | 20 | 20 | 2.89 |
| Example 11 | 60 | 20 | 0.99 |
| Example 12 | 45 | 20 | 1.96 |
| Example 13 | 15 | 20 | 0.98 |
| Comparative Example 1 | 30 | 20 | 1.95 |
| Comparative Example 2 | — | — | — |
| Comparative Example 3 | 30 | 20 | 0.009 |
| Comparative Example 4 | 30 | 20 | 1.96 |
| Comparative Example 5 | 30 | 20 | 1.95 |

TABLE 6

Properties of black magnetic acicular composite particles

| Examples and Comparative Examples | Average major axis diameter (μm) | Average minor axis diameter (μm) | Aspect ratio (-) | Geometrical standard deviation value (-) |
|---|---|---|---|---|
| Example 4 | 0.276 | 0.0336 | 8.2:1 | 1.40 |
| Example 5 | 0.212 | 0.0286 | 7.4:1 | 1.36 |
| Example 6 | 0.290 | 0.0363 | 8.0:1 | 1.43 |
| Example 7 | 0.153 | 0.0224 | 6.8:1 | 1.44 |
| Example 8 | 0.129 | 0.0178 | 7.2:1 | 1.39 |
| Example 9 | 0.277 | 0.0337 | 8.2:1 | 1.40 |
| Example 10 | 0.212 | 0.0287 | 7.4:1 | 1.36 |
| Example 11 | 0.291 | 0.0363 | 8.0:1 | 1.43 |
| Example 12 | 0.152 | 0.0222 | 6.8:1 | 1.44 |
| Example 13 | 0.128 | 0.0180 | 7.1:1 | 1.39 |
| Comparative Example 1 | 0.275 | 0.0336 | 8.2:1 | — |
| Comparative Example 2 | 0.275 | 0.0335 | 8.2:1 | 1.40 |
| Comparative Example 3 | 0.151 | 0.0221 | 6.8:1 | — |
| Comparative Example 4 | 0.152 | 0.0223 | 6.8:1 | — |
| Comparative Example 5 | 0.275 | 0.0337 | 8.2:1 | — |

Properties of black magnetic acicular composite particles

| Examples and Comparative Examples | BET specific surface area value (m²/g) | Coercive force value (Oe) | Saturation magnetization value (emu/g) |
|---|---|---|---|
| Example 4 | 29.8 | 683 | 74.2 |
| Example 5 | 35.4 | 832 | 76.5 |
| Example 6 | 26.5 | 698 | 80.6 |
| Example 7 | 45.6 | 905 | 79.2 |
| Example 8 | 51.3 | 1,894 | 133.8 |
| Example 9 | 28.9 | 670 | 73.2 |
| Example 10 | 36.0 | 821 | 76.5 |
| Example 11 | 27.1 | 689 | 78.6 |
| Example 12 | 46.2 | 881 | 77.1 |
| Example 13 | 46.8 | 1,889 | 129.5 |
| Comparative Example 1 | 36.3 | 679 | 75.9 |
| Comparative Example 2 | 33.5 | 682 | 76.0 |
| Comparative Example 3 | 48.1 | 898 | 81.0 |
| Comparative Example 4 | 58.6 | 904 | 80.1 |
| Comparative Example 5 | 32.4 | 680 | 75.4 |

TABLE 6-continued

Properties of black magnetic acicular composite particles

| Examples and Comparative Examples | black Volume resistivity ($\Omega \cdot cm$) | Thickness Blackness (L* value) (−) | Carbon desorption percentage (%) | Carbon of carbon black coat ($\mu m$) |
|---|---|---|---|---|
| Example 4 | $6.6 \times 10^4$ | 18.9 | 8.1 | 0.0022 |
| Example 5 | $2.6 \times 10^5$ | 19.6 | 7.6 | 0.0021 |
| Example 6 | $9.6 \times 10^5$ | 20.4 | 8.6 | 0.0019 |
| Example 7 | $8.3 \times 10^5$ | 19.9 | 9.1 | 0.0020 |
| Example 8 | $5.5 \times 10^5$ | 19.4 | 7.2 | 0.0020 |
| Example 9 | $1.4 \times 10^4$ | 18.6 | 4.8 | 0.0022 |
| Example 10 | $8.8 \times 10^4$ | 20.2 | 3.2 | 0.0021 |
| Example 11 | $6.8 \times 10^5$ | 18.9 | 4.6 | 0.0019 |
| Example 12 | $1.8 \times 10^5$ | 18.6 | 2.6 | 0.0020 |
| Example 13 | $5.1 \times 10^5$ | 19.0 | 4.1 | 0.0019 |
| Comparative Example 1 | $5.6 \times 10^7$ | 23.5 | 61.6 | — |
| Comparative Example 2 | $5.6 \times 10^8$ | 24.6 | — | — |
| Comparative Example 3 | $6.4 \times 10^7$ | 22.4 | — | — |
| Comparative Example 4 | $7.6 \times 10^6$ | 22.0 | 41.2 | — |
| Comparative Example 5 | $2.6 \times 10^7$ | 23.5 | 55.8 | — |

TABLE 7

Production of magnetic coating composition

| Examples | Kind of magnetic acicular particles | Weight ratio of particles to resin (−) | Amount of carbon black added (ratio to magnetic particles) (part by weight) |
|---|---|---|---|
| Example 14 | Example 4 | 5.0:1 | 0.50 |
| Example 15 | Example 5 | 5.0:1 | 0.50 |
| Example 16 | Example 6 | 5.0:1 | 0.50 |
| Example 17 | Example 7 | 5.0:1 | 0.50 |
| Example 18 | Example 8 | 5.0:1 | 0.50 |
| Example 19 | Example 9 | 5.0:1 | 0.50 |
| Example 20 | Example 10 | 5.0:1 | 0.50 |
| Example 21 | Example 11 | 5.0:1 | 0.50 |
| Example 22 | Example 12 | 5.0:1 | 0.50 |
| Example 23 | Example 13 | 5.0:1 | 0.50 |
| Example 24 | Example 4 | 5.0:1 | 0.00 |
| Example 25 | Example 6 | 5.0:1 | 2.50 |
| Example 26 | Example 8 | 5.0:1 | 1.50 |

| Examples | Properties of coating composition Viscosity (cP) | Properties of magnetic recording medium Thickness of magnetic layer ($\mu m$) | Properties of magnetic recording medium Coercive force value (Oe) |
|---|---|---|---|
| Example 14 | 2,304 | 3.3 | 732 |
| Example 15 | 2,816 | 3.5 | 896 |
| Example 16 | 3,072 | 3.4 | 747 |
| Example 17 | 2,944 | 3.5 | 954 |
| Example 18 | 5,120 | 4.3 | 1,954 |
| Example 19 | 2,381 | 3.3 | 728 |
| Example 20 | 2,816 | 3.3 | 890 |
| Example 21 | 2,765 | 3.4 | 741 |
| Example 22 | 2,688 | 3.5 | 950 |
| Example 23 | 4,864 | 3.8 | 1,939 |
| Example 24 | 2,048 | 3.5 | 732 |
| Example 25 | 3,840 | 3.5 | 742 |
| Example 26 | 5,632 | 3.6 | 1,946 |

| Examples | Properties of magnetic recording medium Br/Bm (−) | Gloss (%) | Surface roughness Ra (nm) |
|---|---|---|---|
| Example 14 | 0.89 | 171 | 8.4 |
| Example 15 | 0.89 | 174 | 6.8 |
| Example 16 | 0.88 | 171 | 8.6 |
| Example 17 | 0.88 | 173 | 7.6 |
| Example 18 | 0.88 | 231 | 8.0 |
| Example 19 | 0.90 | 175 | 7.6 |
| Example 20 | 0.91 | 176 | 6.4 |
| Example 21 | 0.89 | 171 | 8.6 |
| Example 22 | 0.88 | 174 | 7.2 |
| Example 23 | 0.89 | 235 | 7.2 |
| Example 24 | 0.89 | 175 | 8.0 |
| Example 25 | 0.88 | 167 | 9.7 |
| Example 26 | 0.88 | 213 | 8.8 |

| Examples | Properties of magnetic recording medium Young's modulus (relative value) | Linear absorption ($\mu m^{-1}$) | Surface resistivity ($\Omega$/sq) |
|---|---|---|---|
| Example 14 | 138 | 1.44 | $2.3 \times 10^8$ |
| Example 15 | 134 | 1.35 | $5.4 \times 10^8$ |
| Example 16 | 141 | 1.52 | $8.7 \times 10^8$ |
| Example 17 | 134 | 1.45 | $1.9 \times 10^9$ |
| Example 18 | 136 | 1.48 | $7.1 \times 10^8$ |
| Example 19 | 139 | 1.43 | $7.8 \times 10^8$ |
| Example 20 | 136 | 1.36 | $6.3 \times 10^8$ |
| Example 21 | 143 | 1.49 | $1.4 \times 10^8$ |
| Example 22 | 135 | 1.46 | $2.5 \times 10^9$ |
| Example 23 | 135 | 1.50 | $1.0 \times 10^9$ |
| Example 24 | 138 | 1.36 | $1.2 \times 10^9$ |
| Example 25 | 136 | 1.64 | $1.1 \times 10^8$ |
| Example 26 | 133 | 1.58 | $2.6 \times 10^8$ |

TABLE 8

Production of magnetic coating composition

| Comparative Examples | Kind of magnetic acicular particles | Weight ratio of particles to resin (−) | Amount of carbon black added (ratio to magnetic particles) (part by weight) |
|---|---|---|---|
| Comparative Example 6 | Core particles 1 | 5.0:1 | 0.50 |
| Comparative Example 7 | Core particles 2 | 5.0:1 | 0.50 |
| Comparative Example 8 | Core particles 3 | 5.0:1 | 0.50 |
| Comparative Example 9 | Core particles 4 | 5.0:1 | 0.50 |
| Comparative Example 10 | Core particles 5 | 5.0:1 | 0.50 |
| Comparative Example 11 | Comparative Example 1 | 5.0:1 | 0.50 |
| Comparative Example 12 | Comparative Example 2 | 5.0:1 | 0.50 |
| Comparative Example 13 | Comparative Example 3 | 5.0:1 | 0.50 |
| Comparative Example 14 | Comparative Example 4 | 5.0:1 | 0.50 |

TABLE 8-continued

| Comparative Examples | | | |
|---|---|---|---|
| Comparative Example 15 | Comparative Example 5 | 5.0:1 | 0.50 |
| Comparative Example 16 | Core particles 1 | 5.0:1 | 10.00 |
| Comparative Example 17 | Core particles 3 | 5.0:1 | 10.00 |
| Comparative Example 18 | Core particles 3 | 5.0:1 | 5.50 |
| Comparative Example 19 | Core particles 5 | 5.0:1 | 10.00 |
| Comparative Example 20 | Core particles 5 | 5.0:1 | 5.50 |

| Comparative Examples | Properties of coating composition Viscosity (cP) | Properties of magnetic recording medium Thickness of magnetic layer ($\mu$m) | Coercive force value (Oe) |
|---|---|---|---|
| Comparative Example 6 | 2,560 | 3.5 | 730 |
| Comparative Example 7 | 2,688 | 3.4 | 899 |
| Comparative Example 8 | 2,944 | 3.3 | 745 |
| Comparative Example 9 | 3,328 | 3.5 | 950 |
| Comparative Example 10 | 5,376 | 3.5 | 1,940 |
| Comparative Example 11 | 4,096 | 3.4 | 730 |
| Comparative Example 12 | 2,381 | 3.4 | 735 |
| Comparative Example 13 | 2,739 | 3.3 | 941 |
| Comparative Example 14 | 4,352 | 3.5 | 945 |
| Comparative Example 15 | 2,816 | 3.4 | 731 |
| Comparative Example 16 | 5,888 | 3.7 | 725 |
| Comparative Example 17 | 6,477 | 3.7 | 739 |
| Comparative Example 18 | 4,122 | 3.5 | 742 |
| Comparative Example 19 | 12,902 | 3.9 | 1,932 |
| Comparative Example 20 | 5,376 | 3.6 | 1,936 |

| Comparative Examples | Properties of magnetic recording medium Br/Bm (—) | Gloss (%) | Surface roughness Ra (nm) |
|---|---|---|---|
| Comparative Example 6 | 0.88 | 168 | 10.2 |
| Comparative Example 7 | 0.88 | 167 | 10.2 |
| Comparative Example 8 | 0.87 | 163 | 10.8 |
| Comparative Example 9 | 0.87 | 168 | 11.2 |
| Comparative Example 10 | 0.87 | 208 | 13.8 |
| Comparative Example 11 | 0.83 | 156 | 15.6 |
| Comparative Example 12 | 0.86 | 169 | 11.2 |
| Comparative Example 13 | 0.85 | 165 | 10.2 |
| Comparative Example 14 | 0.84 | 161 | 14.8 |
| Comparative Example 15 | 0.84 | 159 | 13.1 |
| Comparative Example 16 | 0.82 | 131 | 21.6 |
| Comparative Example 17 | 0.82 | 125 | 23.6 |
| Comparative Example 18 | 0.85 | 153 | 14.5 |
| Comparative Example 19 | 0.74 | 136 | 36.8 |
| Comparative Example 20 | 0.79 | 185 | 16.7 |

| Comparative Examples | Properties of magnetic recording medium Young's modulus (relative value) | Linear absorption ($\mu$m$^{-1}$) | Surface resistivity ($\Omega$/sq) |
|---|---|---|---|
| Comparative Example 6 | 134 | 0.64 | $6.2 \times 10^{12}$ |
| Comparative Example 7 | 133 | 0.48 | $2.2 \times 10^{13}$ |
| Comparative Example 8 | 133 | 1.05 | $8.1 \times 10^{11}$ |
| Comparative Example 9 | 134 | 0.89 | $3.6 \times 10^{11}$ |
| Comparative Example 10 | 128 | 1.08 | $4.7 \times 10^{11}$ |
| Comparative Example 11 | 121 | 1.15 | $1.3 \times 10^{11}$ |
| Comparative Example 12 | 126 | 0.64 | $9.7 \times 10^{11}$ |
| Comparative Example 13 | 132 | 0.93 | $9.1 \times 10^{11}$ |
| Comparative Example 14 | 128 | 1.19 | $5.6 \times 10^{10}$ |
| Comparative Example 15 | 122 | 1.16 | $8.0 \times 10^{11}$ |
| Comparative Example 16 | 117 | 1.38 | $5.3 \times 10^{9}$ |
| Comparative Example 17 | 112 | 1.44 | $1.1 \times 10^{9}$ |
| Comparative Example 18 | 127 | 1.14 | $2.2 \times 10^{10}$ |
| Comparative Example 19 | 105 | 1.39 | $3.7 \times 10^{9}$ |
| Comparative Example 20 | 114 | 1.15 | $1.7 \times 10^{10}$ |

TABLE 9

| Examples and Comparative Examples | Production of black magnetic acicular composite particles Coating with polysiloxane | | |
|---|---|---|---|
| | Kind of core particles | Additives Kind | Amount added (part by weight) |
| Example 27 | Core particles 1 | TSF484 | 1.0 |
| Example 28 | Core particles 2 | TSF484 | 3.0 |
| Example 29 | Core particles 3 | KF99 | 2.0 |
| Example 30 | Core particles 4 | L-9000 | 0.5 |
| Example 31 | Core particles 5 | TSF484/TSF451 | 0.4/0.1 |
| Example 32 | Core particles 6 | TSF484/L-45 | 0.5/1.5 |
| Example 33 | Core particles 7 | TSF451 | 2.0 |
| Example 34 | Core particles 8 | TSF484 | 1.0 |

TABLE 9-continued

| | | | |
|---|---|---|---|
| Example 35 | Core particles 9 | TSF484 | 1.5 |
| Example 36 | Core particles 10 | KF99 | 1.0 |
| Comparative Example 21 | Core particles 1 | TSF484 | 1.0 |
| Comparative Example 22 | Core particles 4 | TSF484 | 0.5 |
| Comparative Example 23 | Core particles 4 | TSF484 | 0.005 |

Production of black magnetic acicular composite particles
Coating with polysiloxane

| Examples and Comparative Examples | Edge runner treatment Linear load (kg/cm) | Time (min) | Coating amount (calculated as Si) (wt. %) |
|---|---|---|---|
| Example 27 | 60 | 30 | 0.43 |
| Example 28 | 30 | 60 | 1.23 |
| Example 29 | 45 | 20 | 0.87 |
| Example 30 | 75 | 30 | 0.21 |
| Example 31 | 30 | 30 | 0.22 |
| Example 32 | 60 | 45 | 0.85 |
| Example 33 | 60 | 20 | 0.86 |
| Example 34 | 45 | 30 | 0.44 |
| Example 35 | 45 | 45 | 0.63 |
| Example 36 | 60 | 20 | 0.42 |
| Comparative Example 21 | 30 | 20 | 0.43 |
| Comparative Example 22 | 30 | 20 | 0.22 |
| Comparative Example 23 | 30 | 20 | $2 \times 10^{-3}$ |

Production of black magnetic acicular composite particles
Coating of carbon black

| Examples and Comparative Examples | Carbon black Kind | Amount added (part by weight) |
|---|---|---|
| Example 27 | A | 10.0 |
| Example 28 | A | 2.5 |
| Example 29 | B | 5.0 |
| Example 30 | B | 7.5 |
| Example 31 | C | 10.0 |
| Example 32 | A | 3.0 |
| Example 33 | A | 7.5 |
| Example 34 | B | 5.0 |
| Example 35 | B | 10.0 |
| Example 36 | C | 10.0 |
| Comparative Example 21 | — | — |
| Comparative Example 22 | A | 0.01 |
| Comparative Example 23 | B | 2.0 |

Production of black magnetic acicular composite particles
Coating of carbon black

| Examples and Comparative Examples | Edge runner treatment Linear load (kg/cm) | Time (min) | Amount of carbon black coat (calculated as C) (wt. %) |
|---|---|---|---|
| Example 27 | 45 | 30 | 9.08 |
| Example 28 | 30 | 60 | 2.43 |
| Example 29 | 60 | 30 | 4.76 |
| Example 30 | 45 | 30 | 6.96 |
| Example 31 | 30 | 45 | 9.07 |
| Example 32 | 60 | 45 | 2.91 |
| Example 33 | 45 | 45 | 6.95 |
| Example 34 | 75 | — | 4.75 |
| Example 35 | 60 | 60 | 9.06 |
| Example 36 | 30 | — | 9.07 |
| Comparative Example 21 | — | — | — |
| Comparative Example 22 | 30 | 20 | 0.009 |
| Comparative Example 23 | 30 | 20 | 1.96 |

TABLE 10

Properties of black magnetic acicular composite particles

| Examples and Comparative Examples | Average major axis diameter (μm) | Average minor axis diameter (μm) | Aspect ratio (—) | Geometrical standard deviation value (—) |
|---|---|---|---|---|
| Example 27 | 0.276 | 0.0335 | 8.2:1 | 1.40 |
| Example 28 | 0.212 | 0.0286 | 7.4:1 | 1.36 |
| Example 29 | 0.290 | 0.0364 | 8.0:1 | 1.43 |
| Example 30 | 0.153 | 0.0223 | 6.9:1 | 1.44 |
| Example 31 | 0.129 | 0.0178 | 7.2:1 | 1.39 |
| Example 32 | 0.278 | 0.0336 | 8.3:1 | 1.40 |
| Example 33 | 0.211 | 0.0288 | 7.3:1 | 1.36 |
| Example 34 | 0.290 | 0.0365 | 7.9:1 | 1.43 |
| Example 35 | 0.153 | 0.0222 | 6.9:1 | 1.44 |
| Example 36 | 0.128 | 0.0180 | 7.1:1 | 1.39 |
| Comparative Example 21 | 0.275 | 0.0336 | 8.2:1 | 1.40 |
| Comparative Example 22 | 0.152 | 0.0222 | 6.8:1 | — |
| Comparative Example 23 | 0.152 | 0.0222 | 6.8:1 | — |

Properties of black magnetic acicular composite particles

| Examples and Comparative Examples | BET specific Surface area value (m2/g) | Coercive force value (Oe) | Saturation magnetization value (emu/g) |
|---|---|---|---|
| Example 27 | 35.4 | 685 | 74.3 |
| Example 28 | 40.3 | 833 | 77.1 |
| Example 29 | 31.8 | 700 | 81.2 |
| Example 30 | 50.2 | 910 | 79.0 |
| Example 31 | 57.6 | 1,895 | 132.1 |
| Example 32 | 34.1 | 673 | 73.6 |
| Example 33 | 41.8 | 824 | 76.8 |
| Example 34 | 32.2 | 694 | 80.1 |
| Example 35 | 51.8 | 888 | 80.0 |
| Example 36 | 51.8 | 1,896 | 128.9 |
| Comparative Example 21 | 38.4 | 683 | 76.1 |
| Comparative Example 22 | 52.8 | 900 | 80.9 |
| Comparative Example 23 | 62.1 | 906 | 80.3 |

TABLE 10-continued

Properties of black magnetic acicular composite particles

| Examples and Comparative Examples | Volume resistivity (Ω · cm) | Blackness (L* values) (—) | Carbon black desorption percentage (%) | Thickness of carbon black coat (μm) |
|---|---|---|---|---|
| Example 27 | $5.2 \times 10^4$ | 18.8 | 7.8 | 0.0024 |
| Example 28 | $3.1 \times 10^5$ | 20.0 | 8.3 | 0.0020 |
| Example 29 | $8.6 \times 10^5$ | 20.3 | 9.1 | 0.0022 |
| Example 30 | $6.3 \times 10^5$ | 20.1 | 8.6 | 0.0023 |
| Example 31 | $5.1 \times 10^5$ | 19.2 | 7.1 | 0.0024 |
| Example 32 | $2.1 \times 10^4$ | 20.8 | 4.8 | 0.0021 |
| Example 33 | $6.6 \times 10^4$ | 20.2 | 3.6 | 0.0023 |
| Example 34 | $7.1 \times 10^5$ | 18.8 | 2.6 | 0.0022 |
| Example 35 | $1.4 \times 10^5$ | 18.8 | 3.4 | 0.0024 |
| Example 36 | $3.8 \times 10^5$ | 19.1 | 5.2 | 0.0024 |
| Comparative Example 21 | $6.5 \times 10^8$ | 24.5 | — | — |
| Comparative Example 22 | $8.1 \times 10^7$ | 23.1 | — | — |
| Comparative Example 23 | $1.2 \times 10^7$ | 22.2 | 46.6 | — |

TABLE 11

Production of black magnetic acicular composite particles
Coating with modified polysiloxane

| Examples and Comparative Examples | Kind of core particles | Additives Kind | Amount added (part by weight) |
|---|---|---|---|
| Example 37 | Core particles 1 | BYK-080 | 1.0 |
| Example 38 | Core particles 2 | BYK-080 | 0.5 |
| Example 39 | Core particles 3 | BYK-310 | 2.0 |
| Example 40 | Core particles 4 | BYK-322 | 3.0 |
| Example 41 | Core particles 5 | TSF4446 | 1.0 |
| Example 42 | Core particles 6 | TSF4460 | 1.5 |
| Example 43 | Core particles 7 | YF3965 | 1.0 |
| Example 44 | Core particles 8 | BYK-080 | 1.0 |
| Example 45 | Core particles 9 | BYK-080 | 3.0 |
| Example 46 | Core particles 10 | BYK-310 | 1.0 |
| Comparative Example 24 | Core particles 1 | BYK-080 | 1.0 |
| Comparative Example 25 | Core particles 4 | BYK-080 | 0.5 |
| Comparative Example 26 | Core particles 4 | BYK-080 | 0.005 |

Production of black magnetic acicular composite particles
Coating with modified polysiloxane

| Examples and Comparative Examples | Edge runner treatment Linear load (Kg/cm) | Time (min) | Coating amount (calculated as Si) (wt. %) |
|---|---|---|---|
| Example 37 | 60 | 30 | 0.17 |
| Example 38 | 30 | 20 | 0.08 |
| Example 39 | 60 | 30 | 0.33 |
| Example 40 | 45 | 45 | 0.56 |
| Example 41 | 60 | 30 | 0.17 |
| Example 42 | 45 | 30 | 0.25 |
| Example 43 | 60 | 20 | 0.16 |
| Example 44 | 30 | 30 | 0.18 |
| Example 45 | 60 | 45 | 0.53 |
| Example 46 | 60 | 30 | 0.16 |
| Comparative Example 24 | 30 | 20 | 0.17 |
| Comparative Example 25 | 30 | 20 | 0.08 |
| Comparative Example 26 | 30 | 20 | $8 \times 10^{-4}$ |

Production of black magnetic acicular composite particles
Coating of carbon black

| Examples and Comparative Examples | Carbon black Kind | Amount added (part by weight) |
|---|---|---|
| Example 37 | A | 10.0 |
| Example 38 | A | 5.0 |
| Example 39 | B | 7.5 |
| Example 40 | B | 10.0 |
| Example 41 | C | 3.0 |
| Example 42 | A | 10.0 |
| Example 43 | A | 10.0 |
| Example 44 | B | 7.5 |
| Example 45 | B | 10.0 |
| Example 46 | C | 5.0 |
| Comparative Example 24 | — | — |
| Comparative Example 25 | A | 0.01 |
| Comparative Example 26 | B | 2.0 |

Production of black magnetic acicular composite particles
Coating of carbon black

| Examples and Comparative Examples | Edge runner treatment Linear load (Kg/cm) | Time (min) | Amount of carbon black coat (calculated as C) (wt. %) |
|---|---|---|---|
| Example 37 | 60 | 30 | 9.08 |
| Example 38 | 30 | 45 | 4.76 |
| Example 39 | 60 | 30 | 6.96 |
| Example 40 | 60 | 30 | 9.07 |
| Example 41 | 45 | 20 | 2.88 |
| Example 42 | 45 | 45 | 9.08 |
| Example 43 | 60 | 30 | 9.08 |
| Example 44 | 30 | 30 | 6.95 |
| Example 45 | 45 | 30 | 9.06 |
| Example 46 | 60 | 30 | 4.72 |
| Comparative Example 24 | — | — | — |
| Comparative Example 25 | 30 | 20 | 0.009 |
| Comparative Example 26 | 30 | 20 | 1.95 |

TABLE 12

Properties of black magnetic acicular composite particles

| Examples and Comparative Examples | Average major axis diameter ($\mu$m) | Average minor axis diameter ($\mu$m) | Aspect ratio (-) | Geometrical standard deviation value (-) |
|---|---|---|---|---|
| Example 37 | 0.276 | 0.0336 | 8.2:1 | 1.40 |
| Example 38 | 0.212 | 0.0286 | 7.4:1 | 1.36 |
| Example 39 | 0.290 | 0.0363 | 8.0:1 | 1.43 |
| Example 40 | 0.152 | 0.0223 | 6.8:1 | 1.44 |
| Example 41 | 0.128 | 0.0177 | 7.2:1 | 1.39 |
| Example 42 | 0.278 | 0.0336 | 8.3:1 | 1.40 |
| Example 43 | 0.213 | 0.0287 | 7.4:1 | 1.36 |
| Example 44 | 0.290 | 0.0365 | 7.9:1 | 1.43 |
| Example 45 | 0.152 | 0.0223 | 6.8:1 | 1.44 |
| Example 46 | 0.128 | 0.0179 | 7.2:1 | 1.39 |
| Comparative Example 24 | 0.276 | 0.0336 | 8.2:1 | 1.40 |
| Comparative Example 25 | 0.152 | 0.0222 | 6.8:1 | — |
| Comparative Example 26 | 0.152 | 0.0221 | 6.9:1 | — |

Properties of black magnetic acicular composite particles

| Examples and Comparative Examples | BET specific surface area value ($m^2/g$) | Coercive force value (Oe) | Saturation magnetization value (emu/g) |
|---|---|---|---|
| Example 37 | 36.0 | 683 | 74.1 |
| Example 38 | 40.2 | 830 | 76.9 |
| Example 39 | 31.9 | 701 | 81.0 |
| Example 40 | 50.3 | 912 | 79.5 |
| Example 41 | 54.9 | 1,906 | 133.8 |
| Example 42 | 34.3 | 671 | 73.5 |
| Example 43 | 41.9 | 821 | 76.5 |
| Example 44 | 32.3 | 693 | 81.0 |
| Example 45 | 51.9 | 885 | 80.8 |
| Example 46 | 56.4 | 1,891 | 129.6 |
| Comparative Example 24 | 38.6 | 684 | 76.1 |
| Comparative Example 25 | 52.4 | 898 | 80.8 |
| Comparative Example 26 | 62.3 | 905 | 80.4 |

Properties of black magnetic acicular composite particles

| Examples and Comparative Examples | Volume resistivity ($\Omega \cdot cm$) | Blackness (L* value) (-) | Carbon black desorption percentage (%) | Thickness of carbon black coat ($\mu$m) |
|---|---|---|---|---|
| Example 37 | $3.6 \times 10^4$ | 18.6 | 6.8 | 0.0024 |
| Example 38 | $3.1 \times 10^5$ | 19.6 | 6.1 | 0.0022 |
| Example 39 | $8.4 \times 10^5$ | 19.2 | 7.3 | 0.0023 |
| Example 40 | $6.4 \times 10^5$ | 19.6 | 7.5 | 0.0024 |
| Example 41 | $7.1 \times 10^5$ | 19.8 | 6.2 | 0.0021 |
| Example 42 | $1.3 \times 10^4$ | 19.8 | 3.6 | 0.0024 |
| Example 43 | $6.5 \times 10^4$ | 19.6 | 2.1 | 0.0024 |
| Example 44 | $4.6 \times 10^5$ | 18.4 | 3.1 | 0.0023 |
| Example 45 | $3.6 \times 10^5$ | 18.2 | 2.1 | 0.0024 |
| Example 46 | $7.2 \times 10^5$ | 19.4 | 2.2 | 0.0022 |
| Comparative Example 24 | $4.3 \times 10^8$ | 24.4 | — | — |
| Comparative Example 25 | $6.9 \times 10^7$ | 23.8 | — | — |
| Comparative Example 26 | $2.2 \times 10^7$ | 23.1 | 43.3 | — |

TABLE 13

Production of black magnetic acicular composite particles
Coating with terminal-modified polysiloxane
Additives

| Examples and Comparative Examples | Kind of core particles | Kind | Amount added (part by weight) |
|---|---|---|---|
| Example 47 | Core particles 1 | TSF4770 | 2.0 |
| Example 48 | Core particles 2 | TSF4770 | 1.0 |
| Example 49 | Core particles 3 | TSF4751 | 0.5 |
| Example 50 | Core particles 4 | TSF47S1 | 3.0 |
| Example 51 | Core particles 5 | XF3905 | 5.0 |
| Example 52 | Core particles 6 | XF3905 | 1.5 |
| Example 53 | Core particles 7 | YF3804 | 2.0 |
| Example 54 | Core particles 8 | TSF4770 | 1.5 |
| Example 55 | Core particles 9 | TSF4770 | 1.0 |
| Example 56 | Core particles 10 | TSF4751 | 1.0 |
| Comparative Example 27 | Core particles 1 | TSF4770 | 1.0 |
| Comparative Example 28 | Core particles 4 | TSF4770 | 0.5 |
| Comparative Example 29 | Core particles 4 | TSF4770 | 0.005 |

Production of black magnetic acicular composite particles
Coating with terminal-modified polysiloxane

| Examples and Comparative Examples | Edge runner treatment Linear load (Kg/cm) | Time (min) | Coating amount (calculated as Si) (wt. %) |
|---|---|---|---|
| Example 47 | 30 | 30 | 0.68 |
| Example 48 | 60 | 20 | 0.33 |
| Example 49 | 60 | 20 | 0.17 |
| Example 50 | 45 | 45 | 1.05 |
| Example 51 | 30 | 30 | 1.71 |
| Example 52 | 60 | 30 | 0.50 |
| Example 53 | 60 | 20 | 0.39 |
| Example 54 | 45 | 45 | 0.50 |
| Example 55 | 30 | 30 | 0.33 |
| Example 56 | 60 | 30 | 0.35 |
| Comparative Example 27 | 30 | 20 | 0.34 |
| Comparative Example 28 | 30 | 20 | 0.16 |
| Comparative Example 29 | 30 | 20 | $1 \times 10^{-3}$ |

Production of black magnetic acicular composite particles
Coating of carbon black
Carbon black

| Examples and Comparative Examples | Kind | Amount added (part by weight) |
|---|---|---|
| Example 47 | A | 10.0 |
| Example 48 | A | 5.0 |
| Example 49 | B | 10.0 |
| Example 50 | B | 10.0 |
| Example 51 | C | 7.5 |
| Example 52 | A | 2.0 |

TABLE 13-continued

| | | |
|---|---|---|
| Example 53 | A | 10.0 |
| Example 54 | B | 7.5 |
| Example 55 | B | 10.0 |
| Example 56 | C | 5.0 |
| Comparative Example 27 | — | — |
| Comparative Example 28 | A | 0.01 |
| Comparative Example 29 | B | 2.0 |

Production of black magnetic acicular composite particles
Coating of carbon black

| Examples and Comparative Examples | Edge runner treatment Linear load (Kg/cm) | Time (min) | Amount of carbon black coat (calculated as C) (wt. %) |
|---|---|---|---|
| Example 47 | 60 | 60 | 9.08 |
| Example 48 | 45 | 30 | 4.75 |
| Example 49 | 30 | 30 | 9.07 |
| Example 50 | 60 | 60 | 9.07 |
| Example 51 | 30 | 60 | 6.95 |
| Example 52 | 45 | 30 | 1.93 |
| Example 53 | 30 | 30 | 9.09 |
| Example 54 | 30 | 60 | 6.95 |
| Example 55 | 60 | 60 | 9.06 |
| Example 56 | 60 | 20 | 4.71 |
| Comparative Example 27 | — | — | — |
| Conparative Example 28 | 30 | 20 | 0.009 |
| Comparative Example 29 | 30 | 20 | 1.95 |

TABLE 14

Properties of black magnetic acicular composite particles

| Examples and Comparative Examples | Average major axis diameter (μm) | Average minor axis diameter (μm) | Aspect ratio (-) | Geometrical standard deviation value (-) |
|---|---|---|---|---|
| Example 47 | 0.276 | 0.0335 | 8.2:1 | 1.41 |
| Example 48 | 0.212 | 0.0286 | 7.4:1 | 1.36 |
| Example 49 | 0.290 | 0.0363 | 8.0:1 | 1.42 |
| Example 50 | 0.153 | 0.0223 | 6.9:1 | 1.44 |
| Example 51 | 0.128 | 0.0178 | 7.2:1 | 1.39 |
| Example 52 | 0.276 | 0.0336 | 8.2:1 | 1.41 |
| Example 53 | 0.212 | 0.0287 | 7.4:1 | 1.36 |
| Example 54 | 0.291 | 0.0364 | 8.0:1 | 1.43 |
| Example 55 | 0.153 | 0.0224 | 6.8:1 | 1.44 |
| Example 56 | 0.128 | 0.0179 | 7.2:1 | 1.39 |
| Comparative Example 27 | 0.275 | 0.0335 | 8.2:1 | 1.40 |
| Comparative Example 28 | 0.151 | 0.0222 | 6.8:1 | — |
| Comparative Example 29 | 0.152 | 0.0221 | 6.9:1 | — |

TABLE 14-continued

Properties of black magnetic acicular composite particles

| Examples and Comparative Examples | BET specific surface area value ($m^2/g$) | Coercive force value (Oe) | Saturation magnetization value (emu/g) |
|---|---|---|---|
| Example 47 | 35.8 | 682 | 74.0 |
| Example 48 | 39.9 | 831 | 76.4 |
| Example 49 | 31.9 | 698 | 80.6 |
| Example 50 | 50.5 | 913 | 78.9 |
| Example 51 | 55.2 | 1,904 | 132.6 |
| Example 52 | 35.6 | 678 | 74.7 |
| Example 53 | 42.1 | 823 | 76.3 |
| Example 54 | 32.5 | 695 | 81.6 |
| Example 55 | 52.1 | 886 | 79.5 |
| Example 56 | 56.7 | 1,889 | 129.5 |
| Comparative Example 27 | 38.6 | 683 | 76.3 |
| Comparative Example 28 | 52.5 | 899 | 81.0 |
| Comparative Example 29 | 62.1 | 903 | 80.9 |

Properties of black magnetic acicular composite particles

| Examples and Comparative Examples | Volume resistivity (Ω·cm) | Blackness (L* value) (-) | Carbon black desorption percentage (%) | Thickness of carbon black coat (μm) |
|---|---|---|---|---|
| Example 47 | $5.1 \times 10^4$ | 18.5 | 5.6 | 0.0024 |
| Example 48 | $3.2 \times 10^5$ | 19.6 | 6.8 | 0.0022 |
| Example 49 | $8.3 \times 10^5$ | 19.0 | 9.2 | 0.0024 |
| Example 50 | $6.1 \times 10^5$ | 19.5 | 8.3 | 0.0024 |
| Example 51 | $6.5 \times 10^5$ | 19.3 | 6.6 | 0.0023 |
| Example 52 | $5.2 \times 10^4$ | 19.8 | 2.6 | 0.0020 |
| Example 53 | $9.2 \times 10^4$ | 19.3 | 4.1 | 0.0024 |
| Example 54 | $1.8 \times 10^5$ | 18.1 | 3.8 | 0.0023 |
| Example 55 | $6.4 \times 10^5$ | 18.2 | 2.9 | 0.0024 |
| Example 56 | $7.4 \times 10^5$ | 19.2 | 3.3 | 0.0022 |
| Comparative Example 27 | $3.2 \times 10^8$ | 24.2 | — | — |
| Comparative Example 28 | $7.1 \times 10^7$ | 24.0 | — | — |
| Comparative Example 29 | $1.5 \times 10^7$ | 23.4 | 45.5 | — |

TABLE 15

Production of magnetic coating composition

| Examples and Comparative Examples | Kind of magnetic acicular particles | Weight ratio of particles to resin (-) | Amount of carbon black added (ratio to magnetic particles) (part by weight) |
|---|---|---|---|
| Example 57 | Example 27 | 5.0:1 | 0.50 |
| Example 58 | Example 28 | 5.0:1 | 0.50 |
| Example 59 | Example 29 | 5.0:1 | 0.50 |
| Example 60 | Example 30 | 5.0:1 | 0.50 |
| Example 61 | Example 31 | 5.0:1 | 0.50 |
| Example 62 | Example 32 | 5.0:1 | 0.50 |
| Example 63 | Example 33 | 5.0:1 | 0.50 |
| Example 64 | Example 34 | 5.0:1 | 0.50 |
| Example 65 | Example 35 | 5.0:1 | 0.50 |
| Example 66 | Example 36 | 5.0:1 | 0.50 |
| Example 67 | Example 27 | 5.0:1 | 0.00 |
| Example 68 | Example 29 | 5.0:1 | 2.50 |
| Example 69 | Example 31 | 5.0:1 | 1.50 |
| Comparative Example 30 | Comparative Example 21 | 5.0:1 | 0.50 |

TABLE 15-continued

| Examples and Comparative Examples | Kind of magnetic acicular particles | Weight ratio of particles to resin (-) | Amount of carbon black added (ratio to magnetic particles) (part by weight) |
|---|---|---|---|
| Comparative Example 31 | Comparative Example 22 | 5.0:1 | 0.50 |
| Comparative Example 32 | Comparative Example 23 | 5.0:1 | 0.50 |

| Examples and Comparative Examples | Properties of coating composition Viscosity (cP) | Properties of magnetic recording medium | |
|---|---|---|---|
| | | Thickness of magnetic layer ($\mu$m) | Coercive force value (Oe) |
| Example 57 | 2,432 | 3.3 | 731 |
| Example 58 | 2,534 | 3.5 | 893 |
| Example 59 | 2,688 | 3.4 | 745 |
| Example 60 | 2,611 | 3.3 | 959 |
| Example 61 | 5,376 | 4.0 | 1,968 |
| Example 62 | 2,406 | 3.5 | 736 |
| Example 63 | 2,944 | 3.4 | 893 |
| Example 64 | 2,790 | 3.5 | 747 |
| Example 65 | 3,302 | 3.4 | 958 |
| Example 66 | 5,146 | 3.9 | 1,952 |
| Example 67 | 2,308 | 3.3 | 733 |
| Example 68 | 3,891 | 3.4 | 742 |
| Example 69 | 5,018 | 3.5 | 1,952 |
| Comparative Example 30 | 3,610 | 3.6 | 735 |
| Comparative Example 31 | 3,354 | 3.5 | 939 |
| Comparative Example 32 | 3,098 | 3.6 | 941 |

| Examples and Comparative Examples | Properties of magnetic recording medium | | |
|---|---|---|---|
| | Br/Bm (-) | Gloss (%) | Surface roughness Ra (nm) |
| Example 57 | 0.89 | 172 | 8.2 |
| Example 58 | 0.88 | 175 | 6.9 |
| Example 59 | 0.89 | 170 | 8.4 |
| Example 60 | 0.89 | 173 | 7.9 |
| Example 61 | 0.88 | 230 | 7.9 |
| Example 62 | 0.89 | 170 | 7.8 |
| Example 63 | 0.90 | 171 | 8.1 |
| Example 64 | 0.90 | 173 | 8.0 |
| Example 65 | 0.89 | 175 | 7.6 |
| Example 66 | 0.88 | 231 | 7.1 |
| Example 67 | 0.89 | 176 | 7.6 |
| Example 68 | 0.89 | 170 | 8.0 |
| Example 69 | 0.88 | 232 | 7.8 |
| Comparative Example 30 | 0.85 | 164 | 12.1 |
| Comparative Example 31 | 0.85 | 163 | 11.8 |
| Comparative Example 32 | 0.83 | 160 | 13.6 |

| Examples and Comparative Examples | Properties of magnetic recording medium | | |
|---|---|---|---|
| | Young's modulus (relative value) | Linear absorption ($\mu$m$^{-1}$) | Surface resistivity ($\Omega$/sq) |
| Example 57 | 138 | 1.44 | $1.6 \times 10^8$ |
| Example 58 | 135 | 1.36 | $2.6 \times 10^8$ |
| Example 59 | 140 | 1.53 | $6.8 \times 10^8$ |
| Example 60 | 135 | 1.46 | $3.1 \times 10^9$ |
| Example 61 | 135 | 1.50 | $2.1 \times 10^8$ |
| Example 62 | 136 | 1.42 | $4.6 \times 10^8$ |
| Example 63 | 140 | 1.38 | $3.2 \times 10^8$ |
| Example 64 | 137 | 1.47 | $1.9 \times 10^8$ |
| Example 65 | 143 | 1.43 | $2.8 \times 10^9$ |
| Example 66 | 135 | 1.51 | $1.1 \times 10^9$ |
| Example 67 | 136 | 1.36 | $1.3 \times 10^9$ |
| Example 68 | 136 | 1.51 | $1.9 \times 10^8$ |
| Example 69 | 136 | 1.48 | $4.2 \times 10^8$ |
| Comparative Example 30 | 125 | 0.68 | $8.8 \times 10^{11}$ |
| Comparative Example 31 | 128 | 0.98 | $9.0 \times 10^{11}$ |
| Comparative Example 32 | 127 | 1.16 | $5.3 \times 10^{10}$ |

TABLE 16

| Examples and Comparative Examples | Production of magnetic coating composition | | |
|---|---|---|---|
| | Kind of magnetic acicular particles | Weight ratio of particles to resin (-) | Amount of carbon black added (ratio to magnetic particles) (part by weight) |
| Example 70 | Example 37 | 5.0:1 | 0.50 |
| Example 71 | Example 38 | 5.0:1 | 0.50 |
| Example 72 | Example 39 | 5.0:1 | 0.50 |
| Example 73 | Example 40 | 5.0:1 | 0.50 |
| Example 74 | Example 41 | 5.0:1 | 0.50 |
| Example 75 | Example 42 | 5.0:1 | 0.50 |
| Example 76 | Example 43 | 5.0:1 | 0.50 |
| Example 77 | Example 44 | 5.0:1 | 0.50 |
| Example 78 | Example 45 | 5.0:1 | 0.50 |
| Example 79 | Example 46 | 5.0:1 | 0.50 |
| Example 80 | Example 37 | 5.0:1 | 0.00 |
| Example 81 | Example 39 | 5.0:1 | 2.50 |
| Example 82 | Example 41 | 5.0:1 | 1.50 |
| Comparative Example 33 | Comparative Example 24 | 5.0:1 | 0.50 |
| Comparative Example 34 | Comparative Example 25 | 5.0:1 | 0.50 |
| Comparative Example 35 | Comparative Example 26 | 5.0:1 | 0.50 |

| Examples and Comparative Examples | Properties of coating composition Viscosity (cP) | Properties of magnetic recording medium | |
|---|---|---|---|
| | | Thickness of magnetic layer ($\mu$m) | Coercive force value (Oe) |
| Example 70 | 2,688 | 3.5 | 733 |
| Example 71 | 2,764 | 3.4 | 896 |
| Example 72 | 3,021 | 3.3 | 743 |
| Example 73 | 2,944 | 3.4 | 965 |
| Example 74 | 5,863 | 3.4 | 1,988 |
| Example 75 | 3,302 | 3.3 | 738 |
| Example 76 | 3,046 | 3.3 | 891 |
| Example 77 | 2,790 | 3.4 | 750 |
| Example 78 | 2,560 | 3.1 | 961 |
| Example 79 | 5,111 | 3.4 | 1,964 |
| Example 80 | 2,586 | 3.2 | 733 |
| Example 81 | 3,610 | 3.3 | 743 |
| Example 82 | 3,090 | 3.5 | 1,977 |
| Comparative Example 33 | 3,046 | 3.6 | 732 |
| Comparative Example 34 | 3,302 | 3.5 | 932 |
| Comparative Example 35 | 2,944 | 3.5 | 940 |

TABLE 16-continued

Examples and Comparative Examples

Properties of magnetic recording medium

| | Br/Bm (-) | Gloss (%) | Surface roughness Ra (nm) |
|---|---|---|---|
| Example 70 | 0.88 | 173 | 8.0 |
| Example 71 | 0.89 | 176 | 7.4 |
| Example 72 | 0.88 | 171 | 8.2 |
| Example 73 | 0.89 | 174 | 7.4 |
| Example 74 | 0.88 | 233 | 7.2 |
| Example 75 | 0.89 | 173 | 7.9 |
| Example 76 | 0.89 | 172 | 8.2 |
| Example 77 | 0.89 | 175 | 7.5 |
| Example 78 | 0.89 | 175 | 7.5 |
| Example 79 | 0.89 | 231 | 7.6 |
| Example 80 | 0.89 | 175 | 6.8 |
| Example 81 | 0.88 | 171 | 7.5 |
| Example 82 | 0.88 | 228 | 7.6 |
| Comparative Example 33 | 0.85 | 162 | 12.3 |
| Comparative Example 34 | 0.84 | 160 | 12.3 |
| Comparative Example 35 | 0.83 | 160 | 13.8 |

Properties of magnetic recording medium

| | Young's modulus (relative value) | Linear absorption ($\mu m^{-1}$) | Surface resistivity $\Omega$/sq |
|---|---|---|---|
| Example 70 | 137 | 1.45 | $3.2 \times 10^8$ |
| Example 71 | 135 | 1.38 | $4.6 \times 10^8$ |
| Example 72 | 139 | 1.52 | $7.9 \times 10^8$ |
| Example 73 | 136 | 1.48 | $2.1 \times 10^9$ |
| Example 74 | 136 | 1.40 | $7.6 \times 10^8$ |
| Example 75 | 136 | 1.43 | $6.5 \times 10^8$ |
| Example 76 | 140 | 1.36 | $7.1 \times 10^8$ |
| Example 77 | 137 | 1.51 | $4.3 \times 10^8$ |
| Example 78 | 142 | 1.50 | $1.3 \times 10^9$ |
| Example 79 | 136 | 1.39 | $3.6 \times 10^9$ |
| Example 80 | 136 | 1.46 | $1.3 \times 10^9$ |
| Example 81 | 137 | 1.53 | $4.1 \times 10^8$ |
| Example 82 | 136 | 1.36 | $9.4 \times 10^8$ |
| Comparative Example 33 | 124 | 0.66 | $8.6 \times 10^{11}$ |
| Comparative Example 34 | 127 | 0.93 | $8.8 \times 10^{11}$ |
| Comparative Example 35 | 126 | 1.12 | $4.9 \times 10^{10}$ |

TABLE 17

Examples and Comparative Examples

Production of magnetic coating composition

| | Kind of magnetic acicular particles | Weight ratio of particles to resin (-) | Amount of carbon black added (ratio to magnetic particles) (part by weight) |
|---|---|---|---|
| Example 83 | Example 47 | 5.0:1 | 0.50 |
| Example 84 | Example 48 | 5.0:1 | 0.50 |
| Example 85 | Example 49 | 5.0:1 | 0.50 |
| Example 86 | Example 50 | 5.0:1 | 0.50 |
| Example 87 | Example 51 | 5.0:1 | 0.50 |
| Example 88 | Example 52 | 5.0:1 | 0.50 |
| Example 89 | Example 53 | 5.0:1 | 0.50 |
| Example 90 | Example 54 | 5.0:1 | 0.50 |
| Example 91 | Example 55 | 5.0:1 | 0.50 |
| Example 92 | Example 56 | 5.0:1 | 0.50 |
| Example 93 | Example 47 | 5.0:1 | 0.00 |
| Example 94 | Example 49 | 5.0:1 | 2.50 |
| Example 95 | Example 51 | 5.0:1 | 1.50 |
| Comparative Example 36 | Comparative Example 27 | 5.0:1 | 0.50 |
| Comparative Example 37 | Comparative Example 28 | 5.0:1 | 0.50 |
| Comparative Example 38 | Comparative Example 29 | 5.0:1 | 0.50 |

| | Properties of coating composition Viscosity (cP) | Properties of magnetic recording medium | |
|---|---|---|---|
| | | Thickness of magnetic layer ($\mu m$) | Coercive force value (Oe) |
| Example 83 | 2,560 | 3.3 | 734 |
| Example 84 | 3,064 | 3.5 | 897 |
| Example 85 | 2,944 | 3.4 | 746 |
| Example 86 | 2,560 | 3.3 | 967 |
| Example 87 | 5,211 | 3.5 | 1,981 |
| Example 88 | 2,649 | 3.3 | 743 |
| Example 89 | 2,586 | 3.4 | 893 |
| Example 90 | 2,560 | 3.3 | 751 |
| Example 91 | 2,944 | 3.5 | 963 |
| Example 92 | 4,308 | 3.4 | 1,972 |
| Example 93 | 2,509 | 3.4 | 736 |
| Example 94 | 3,046 | 3.5 | 746 |
| Example 95 | 2,730 | 3.3 | 1,977 |
| Comparative Example 36 | 3,149 | 3.3 | 735 |
| Comparative Example 37 | 2,893 | 3.4 | 933 |
| Comparative Example 38 | 3,020 | 3.4 | 942 |

Properties of magnetic recording medium

| | Br/Bm (-) | Gloss (%) | Surface roughness Ra (nm) |
|---|---|---|---|
| Example 83 | 0.88 | 175 | 7.3 |
| Example 84 | 0.88 | 178 | 6.6 |
| Example 85 | 0.89 | 171 | 7.8 |
| Example 86 | 0.88 | 175 | 7.2 |
| Example 87 | 0.88 | 229 | 7.4 |
| Example 88 | 0.89 | 177 | 7.3 |
| Example 89 | 0.89 | 175 | 7.0 |
| Example 90 | 0.90 | 173 | 8.0 |
| Example 91 | 0.90 | 172 | 8.2 |
| Example 92 | 0.89 | 235 | 6.8 |
| Example 93 | 0.89 | 173 | 7.6 |
| Example 94 | 0.88 | 175 | 7.3 |
| Example 95 | 0.89 | 226 | 8.1 |
| Comparative Example 36 | 0.85 | 160 | 12.9 |
| Comparative Example 37 | 0.85 | 160 | 13.1 |
| Comparative Example 38 | 0.85 | 158 | 14.4 |

TABLE 17-continued

| Examples and Comparative Examples | Properties of magnetic recording medium | | |
|---|---|---|---|
| | Young's modulus (relative value) | Linear absorption ($\mu m^{-1}$) | Surface resistivity $\Omega$/sq |
| Example 83 | 136 | 1.48 | $3.6 \times 10^8$ |
| Example 84 | 135 | 1.36 | $6.4 \times 10^8$ |
| Example 85 | 140 | 1.53 | $6.3 \times 10^8$ |
| Example 86 | 136 | 1.55 | $1.2 \times 10^9$ |
| Example 87 | 136 | 1.50 | $6.0 \times 10^8$ |
| Example 88 | 138 | 1.42 | $9.0 \times 10^8$ |
| Example 89 | 140 | 1.37 | $7.2 \times 10^8$ |
| Example 90 | 136 | 1.52 | $2.6 \times 10^8$ |
| Example 91 | 140 | 1.50 | $1.8 \times 10^9$ |
| Example 92 | 136 | 1.44 | $3.1 \times 10^9$ |
| Example 93 | 135 | 1.48 | $1.1 \times 10^9$ |
| Example 94 | 136 | 1.55 | $3.2 \times 10^8$ |
| Example 95 | 136 | 1.43 | $6.6 \times 10^8$ |
| Comparative Example 36 | 124 | 0.65 | $8.8 \times 10^{11}$ |
| Comparative Example 37 | 124 | 0.91 | $8.9 \times 10^{11}$ |
| Comparative Example 38 | 123 | 1.11 | $6.1 \times 10^{10}$ |

TABLE 18

| Examples and Comparative Examples | Kind of core particles | Production of black magnetic acicular composite particles Coating with fluoroalkylsilane compound Additives | |
|---|---|---|---|
| | | Kind | Amount added (part by weight) |
| Example 96 | Core particles 1 | Tridecafluorooctyl trimethoxysilane | 1.0 |
| Example 97 | Core particles 2 | Heptadecafluorodecyl trimethoxysilane | 2.0 |
| Example 98 | Core particles 3 | Trifluoropropyl trimethoxysilane | 1.5 |
| Example 99 | Core particles 4 | Tridecafluorooctyl trimethoxysilane | 0.5 |
| Example 100 | Core particles 5 | Heptadecafluorodecyl trimethoxysilane | 5.0 |
| Example 101 | Core particles 6 | Trifluoropropyl trimethoxysilane | 1.0 |
| Example 102 | Core particles 7 | Tridecafluorooctyl trimethoxysilane | 1.5 |
| Example 103 | Core particles 8 | Tridecafluorooctyl trimethoxysilane | 3.0 |
| Example 104 | Core particles 9 | Heptadecafluorodecyl trimethoxysilane | 2.0 |
| Example 105 | Core particles 10 | Tridecafluorooctyl trimethoxysilane | 1.0 |
| Comparative Example 39 | Core particles 1 | Tridecafluorooctyl trimethoxysilane | 1.0 |
| Comparative Example 40 | Core particles 4 | Tridecafluorooctyl trimethoxysilane | 0.5 |
| Comparative Example 41 | Core particles 4 | Tridecafluorooctyl trimethoxysilane | 0.005 |

TABLE 18-continued

| Examples and Comparative Examples | Production of black magnetic acicular composite particles Coating with fluoroalkylsilane compound | | |
|---|---|---|---|
| | Edge runner treatment | | Coating amount (calculated as Si) (wt. %) |
| | Linear load (Kg/cm) | Time (min) | |
| Example 96 | 60 | 30 | 0.06 |
| Example 97 | 45 | 30 | 0.10 |
| Example 98 | 30 | 45 | 0.19 |
| Example 99 | 30 | 30 | 0.03 |
| Example 100 | 30 | 30 | 0.25 |
| Example 101 | 60 | 45 | 0.13 |
| Example 102 | 60 | 30 | 0.09 |
| Example 103 | 30 | 20 | 0.18 |
| Example 104 | 60 | 30 | 0.10 |
| Example 105 | 60 | 30 | 0.06 |
| Comparative Example 39 | 30 | 20 | 0.06 |
| Comparative Example 40 | 30 | 20 | 0.03 |
| Comparative Example 41 | 30 | 20 | $3 \times 10^{-4}$ |

| Examples and Comparative Examples | Production of black magnetic acicular composite particle Coating of carbon black Carbon black | |
|---|---|---|
| | Kind | Amount added (part by weight) |
| Example 96 | A | 10.0 |
| Example 97 | A | 7.5 |
| Example 98 | B | 5.0 |
| Example 99 | B | 10.0 |
| Example 100 | C | 5.0 |
| Example 101 | A | 10.0 |
| Example 102 | A | 7.5 |
| Example 103 | B | 5.0 |
| Example 104 | B | 3.0 |
| Example 105 | C | 10.0 |
| Comparative Example 39 | — | — |
| Comparative Example 40 | A | 0.01 |
| Comparative Example 41 | B | 2.0 |

| Examples and Comparative Examples | Production of black magnetic acicular composite particles Coating of carbon black | | |
|---|---|---|---|
| | Edge runner treatment | | Amount of carbon black coat (calculated as C) (wt. %) |
| | Linear load (Kg/cm) | Time (min) | |
| Example 96 | 60 | 30 | 9.09 |
| Example 97 | 30 | 40 | 6.95 |
| Example 98 | 60 | 30 | 4.74 |
| Example 99 | 45 | 30 | 9.08 |
| Example 100 | 60 | 30 | 4.71 |
| Example 101 | 60 | 30 | 9.07 |
| Example 102 | 60 | 20 | 6.96 |
| Example 103 | 30 | 40 | 4.73 |
| Example 104 | 45 | 20 | 2.90 |
| Example 105 | 60 | 30 | 9.08 |
| Comparative Example 39 | — | — | — |

TABLE 18-continued

| | | | |
|---|---|---|---|
| Comparative Example 40 | 30 | 20 | 0.009 |
| Comparative Example 41 | 30 | 20 | 1.96 |

TABLE 19

Properties of black magnetic acicular composite particles

| Examples and Comparative Examples | Average major axis diameter (μm) | Average minor axis diameter (μm) | Aspect ratio (-) | Geometrical standard deviation value (-) |
|---|---|---|---|---|
| Example 96 | 0.276 | 0.0335 | 8.2:1 | 1.41 |
| Example 97 | 0.212 | 0.0286 | 7.4:1 | 1.36 |
| Example 98 | 0.290 | 0.0366 | 7.9:1 | 1.42 |
| Example 99 | 0.152 | 0.0223 | 6.8:1 | 1.44 |
| Example 100 | 0.128 | 0.0178 | 7.2:1 | 1.39 |
| Example 101 | 0.280 | 0.0336 | 8.3:1 | 1.41 |
| Example 102 | 0.212 | 0.0287 | 7.4:1 | 1.36 |
| Example 103 | 0.291 | 0.0367 | 7.9:1 | 1.42 |
| Example 104 | 0.153 | 0.0224 | 6.8:1 | 1.43 |
| Example 105 | 0.129 | 0.0180 | 7.2:1 | 1.40 |
| Comparative Example 39 | 0.275 | 0.0335 | 8.2:1 | 1.40 |
| Comparative Example 40 | 0.152 | 0.0222 | 6.8:1 | — |
| Comparative Example 41 | 0.152 | 0.0221 | 6.9:1 | — |

Properties of black magnetic acicular composite particles

| Examples and Comparative Examples | BET specific surface area value (m²/g) | Coercive force value (Oe) | Saturation magnetization value (emu/g) |
|---|---|---|---|
| Example 96 | 35.9 | 683 | 74.1 |
| Example 97 | 40.1 | 832 | 76.3 |
| Example 98 | 32.1 | 700 | 80.3 |
| Example 99 | 50.8 | 915 | 78.8 |
| Example 100 | 54.9 | 1,906 | 133.9 |
| Example 101 | 35.6 | 673 | 73.2 |
| Example 102 | 43.8 | 821 | 76.6 |
| Example 103 | 32.9 | 691 | 76.8 |
| Example 104 | 53.3 | 883 | 76.8 |
| Example 105 | 52.6 | 1,891 | 127.5 |
| Comparative Example 39 | 38.8 | 681 | 76.4 |
| Comparative Example 40 | 52.2 | 896 | 81.3 |
| Comparative Example 41 | 62.3 | 902 | 81.3 |

Properties of black magnetic acicular composite particles

| Examples and Comparative Examples | Volume resistivity (Ω·cm) | Blackness (L* value) (-) | Carbon black desorption percentage (%) | Thickness of carbon black coat (μm) |
|---|---|---|---|---|
| Example 96 | $5.1 \times 10^4$ | 18.4 | 6.1 | 0.0024 |
| Example 97 | $3.1 \times 10^5$ | 19.5 | 6.8 | 0.0023 |
| Example 98 | $2.6 \times 10^5$ | 18.9 | 7.3 | 0.0022 |
| Example 99 | $3.8 \times 10^5$ | 19.3 | 8.5 | 0.0024 |
| Example 100 | $7.5 \times 10^5$ | 19.1 | 6.6 | 0.0022 |
| Example 101 | $2.1 \times 10^4$ | 19.2 | 4.6 | 0.0024 |
| Example 102 | $8.3 \times 10^4$ | 19.1 | 3.6 | 0.0023 |
| Example 103 | $6.5 \times 10^5$ | 18.3 | 2.1 | 0.0022 |
| Example 104 | $1.1 \times 10^5$ | 18.5 | 3.1 | 0.0021 |
| Example 105 | $1.4 \times 10^5$ | 18.3 | 4.6 | 0.0024 |

TABLE 19-continued

| | | | | |
|---|---|---|---|---|
| Comparative Example 39 | $6.9 \times 10^8$ | 24.5 | — | — |
| Comparative Example 40 | $5.4 \times 10^7$ | 24.3 | — | — |
| Comparative Example 41 | $1.6 \times 10^7$ | 23.1 | 48.3 | — |

TABLE 20

Production of magnetic coating composition

| Examples and Comparative Examples | Kind of magnetic acicular particles | Weight ratio of particles to resin (-) | Amount of carbon black added (ratio to magnetic particles) (part by weight) |
|---|---|---|---|
| Example 106 | Example 96 | 5.0:1 | 0.50 |
| Example 107 | Example 97 | 5.0:1 | 0.50 |
| Example 108 | Example 98 | 5.0:1 | 0.50 |
| Example 109 | Example 99 | 5.0:1 | 0.50 |
| Example 110 | Example 100 | 5.0:1 | 0.50 |
| Example 111 | Example 101 | 5.0:1 | 0.50 |
| Example 112 | Example 102 | 5.0:1 | 0.50 |
| Example 113 | Example 103 | 5.0:1 | 0.50 |
| Example 114 | Example 104 | 5.0:1 | 0.50 |
| Example 115 | Example 105 | 5.0:1 | 0.50 |
| Example 116 | Example 96 | 5.0:1 | 0.00 |
| Example 117 | Example 98 | 5.0:1 | 2.50 |
| Example 118 | Example 100 | 5.0:1 | 1.50 |
| Comparative Example 42 | Comparative Example 39 | 5.0:1 | 0.50 |
| Comparative Example 43 | Comparative Example 40 | 5.0:1 | 0.50 |
| Comparative Example 44 | Comparative Example 41 | 5.0:1 | 0.50 |

| Examples and Comparative Examples | Properties of coating composition Viscosity (cP) | Properties of magnetic recording medium Thickness of magnetic layer (μm) | Coercive force value (Oe) |
|---|---|---|---|
| Example 106 | 2,714 | 3.5 | 736 |
| Example 107 | 2,970 | 3.3 | 899 |
| Example 108 | 2,202 | 3.5 | 743 |
| Example 109 | 2,586 | 3.3 | 970 |
| Example 110 | 5,982 | 3.3 | 1,988 |
| Example 111 | 3,064 | 3.5 | 743 |
| Example 112 | 3,149 | 3.4 | 895 |
| Example 113 | 2,560 | 3.4 | 753 |
| Example 114 | 2,893 | 3.5 | 965 |
| Example 115 | 5,094 | 3.7 | 1,963 |
| Example 116 | 2,560 | 3.2 | 738 |
| Example 117 | 3,046 | 3.5 | 741 |
| Example 118 | 3,139 | 3.3 | 1,973 |
| Comparative Example 42 | 3,064 | 3.5 | 735 |
| Comparative Example 43 | 3,200 | 3.4 | 931 |
| Comparative Example 44 | 3,072 | 3.5 | 940 |

| Examples and Comparative Examples | Properties of magnetic recording medium | | |
|---|---|---|---|
| | Br/Bm (-) | Gloss (%) | Surface roughness Ra (nm) |
| Example 106 | 0.88 | 173 | 7.0 |
| Example 107 | 0.88 | 173 | 7.0 |
| Example 108 | 0.88 | 170 | 7.8 |
| Example 109 | 0.89 | 176 | 6.9 |
| Example 110 | 0.89 | 232 | 7.1 |

TABLE 20-continued

| Example 111 | 0.89 | 170 | 8.1 |
|---|---|---|---|
| Example 112 | 0.89 | 175 | 7.2 |
| Example 113 | 0.89 | 172 | 7.5 |
| Example 114 | 0.89 | 173 | 7.2 |
| Example 115 | 0.89 | 233 | 7.1 |
| Example 116 | 0.89 | 174 | 6.9 |
| Example 117 | 0.88 | 170 | 7.6 |
| Example 118 | 0.89 | 231 | 7.3 |
| Comparative Example 42 | 0.85 | 161 | 13.1 |
| Comparative Example 43 | 0.84 | 163 | 12.8 |
| Comparative Example 44 | 0.85 | 155 | 14.6 |

| | Properties of magnetic recording medium | | |
|---|---|---|---|
| Examples and Comparative Examples | Young's modulus (relative value) | Linear absorption ($\mu m^{-1}$) | Surface resistivity ($\Omega$/sq) |
| Example 106 | 135 | 1.49 | $1.6 \times 10^8$ |
| Example 107 | 136 | 1.41 | $3.8 \times 10^8$ |
| Example 108 | 139 | 1.52 | $6.4 \times 10^8$ |
| Example 109 | 137 | 1.52 | $1.3 \times 10^9$ |
| Example 110 | 135 | 1.42 | $1.1 \times 10^9$ |
| Example 111 | 138 | 1.46 | $7.2 \times 10^8$ |
| Example 112 | 141 | 1.43 | $9.2 \times 10^8$ |
| Example 113 | 136 | 1.53 | $2.6 \times 10^8$ |
| Example 114 | 139 | 1.51 | $1.1 \times 10^9$ |
| Example 115 | 136 | 1.55 | $1.3 \times 10^9$ |
| Example 116 | 136 | 1.61 | $1.2 \times 10^9$ |
| Example 117 | 135 | 1.63 | $4.6 \times 10^8$ |
| Example 118 | 135 | 1.43 | $9.2 \times 10^8$ |
| Comparative Example 42 | 122 | 0.63 | $8.1 \times 10^{11}$ |
| Comparative Example 43 | 123 | 0.89 | $8.3 \times 10^{11}$ |
| Comparative Example 44 | 123 | 1.12 | $7.6 \times 10^{10}$ |

What is claimed is:

1. A magnetic recording medium comprising:
a non-magnetic base film; and
a magnetic recording layer comprising a binder resin and black magnetic acicular composite particles having an average particle diameter of 0.051 to 0.72 $\mu$m, comprising
magnetic acicular particles,
a coating formed on surface of said magnetic acicular particles, comprising at least one organosilicon compound selected from the group consisting of:
(1) organosilane compounds obtainable from alkoxysilane compounds,
(2) polysiloxanes or modified polysiloxanes, and
(3) fluoroalkyl organosilane compounds obtainable from fluoroalkylsilane compounds, and
a carbon black coat formed on said coating layer comprising said organosilicon compound, in an amount of 0.5 to 10 parts by weight based on 100 parts by weight of said magnetic acicular particles.

2. A magnetic recording medium according to claim 1, wherein said magnetic acicular particles are particles having a coat which is formed on at least a part of the surface of said magnetic acicular particles and which comprises at least one compound selected from the group consisting of hydroxides of aluminum, oxides of aluminum, hydroxides of silicon and oxides of silicon in an amount of 0.01 to 20% by weight, calculated as Al or $SiO_2$, based on the total weight of the magnetic acicular particles coated.

3. A magnetic recording medium according to claim 1, wherein said modified polysiloxanes are compounds selected from the group consisting of:

(A) polysiloxanes modified with at least one compound selected from the group consisting of polyethers, polyesters and epoxy compounds, and (B) polysiloxanes whose molecular terminal is modified with at least one group selected from the group consisting of carboxylic acid groups, alcohol groups and a hydroxyl group.

4. A magnetic recording medium according to claim 1, wherein said alkoxysilane compound is represented by the general formula (I):

$$R^1_a SiX_{4-a} \quad (I)$$

wherein $R^1$ is $C_6H_5$—, $(CH_3)_2CHCH_2$— or n-$C_bH_{2b+1}$— (wherein b is an integer of 1 to 18); X is $CH_3O$— or $C_2H_5O$—; and a is an integer of 0 to 3.

5. A magnetic recording medium according to claim 4, wherein said alkoxysilane compound is methyl triethoxysilane, dimethyl diethoxysilane, phenyl triethoxysilane, diphenyl diethoxysilane, methyl trimethoxysilane, dimethyl dimethoxysilane, phenyl trimethoxysilane, diphenyl dimethoxysilane, isobutyl trimethoxysilane or decyl trimethoxysilane.

6. A magnetic recording medium according to claim 1, wherein said polysiloxanes are represented by the general formula (II):

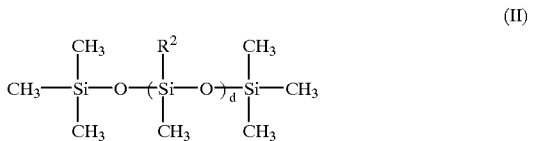

(II)

wherein $R^2$ is H— or $CH_3$—, and d is an integer of 15 to 450.

7. A magnetic recording medium according to claim 6, wherein said polysiloxanes are compounds having methyl hydrogen siloxane units.

8. A magnetic recording medium according to claim 3, wherein said polysiloxanes modified with at least one compound selected from the group consisting of polyethers, polyesters and epoxy compounds are represented by the general formula (III), (IV) or (V):

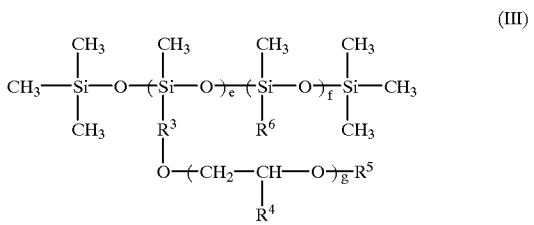

(III)

wherein $R^3$ is —(—$CH_2$—)$_h$—; $R^4$ is —(—$CH_2$—)$_i$—$CH_3$; $R^5$ is —OH, —COOH, —CH=$CH_2$, —C($CH_3$)=$CH_2$ or —(—$CH_2$—)$_j$—$CH_3$; $R^6$ is —(—$CH_2$—)$_k$—$CH_3$; g and h are an integer of 1 to 15; i, j and k are an integer of 0 to 15; e is an integer of 1 to 50; and f is an integer of 1 to 300;

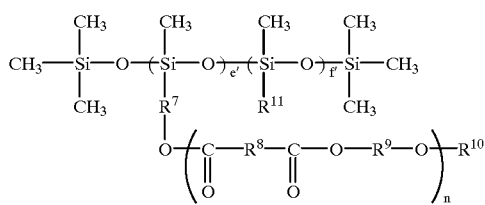

(IV)

wherein $R^7$, $R^8$ and $R^9$ are —$(-CH_2-)_q-$ and may be the same or different; $R^{10}$ is —OH, —COOH, —CH=CH$_2$, —C(CH$_3$)=CH$_2$ or —$(-CH_2-)_r-$CH$_3$; $R^{11}$ is —$(-CH_2-)_s-$CH$_3$; n and q are an integer of 1 to 15; r and s are an integer of 0 to 15; e' is an integer of 1 to 50; and f' is an integer of 1 to 300; or

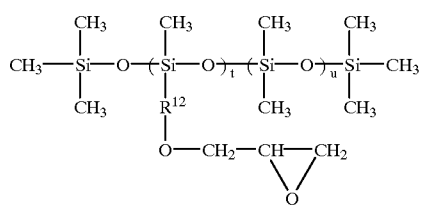

(V)

wherein $R^{12}$ is —$(-CH_2-)_v-$; v is an integer of 1 to 15; t is an integer of 1 to 50; and u is an integer of 1 to 300.

9. A magnetic recording medium according to claim 3, wherein said polysiloxanes whose molecular terminal is modified with at least one group selected from the group consisting of carboxylic acid groups, alcohol groups and a hydroxyl group are represented by the general formula (VI):

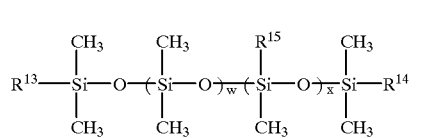

(VI)

wherein $R^{13}$ and $R^{14}$ are —OH, $R^{16}$OH or $R^{17}$COOH and may be the same or different; $R^{15}$ is —CH$_3$ or —C$_6$H$_5$; $R^{16}$ and $R^{17}$ are —$(-CH_2-)y_y-$; y is an integer of 1 to 15; w is an integer of 1 to 200; and x is an integer of 0 to 100.

10. A magnetic recording medium according to claim 1, wherein said fluoroalkylsilane compounds are represented by the general formula (VII):

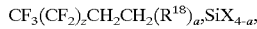  CF$_3$(CF$_2$)$_z$CH$_2$CH$_2$(R$^{18}$)$_{a'}$SiX$_{4-a'}$ (VII)

wherein $R^{18}$ is CH$_3$—, C$_2$H$_5$—, CH$_3$O— or C$_2$H$_5$O—; X is CH$_3$O— or C$_2$H$_5$O—; and z is an integer of 0 to 15; and a' is an integer of 0 to 3.

11. A magnetic recording medium according to claim 1, wherein the amount of said coating organosilicon compounds is 0.02 to 5.0% by weight, calculated as Si, based on the total weight of the organosilicon compounds and said magnetic acicular particles.

12. A magnetic recording medium according to claim 1, wherein said carbon black coat is obtained by mixing carbon black fine particles having a particle size of 0.005 to 0.05 μm with the magnetic acicular particles coated with at least one organosilicon compound while applying a shear force.

13. A magnetic recording medium according to claim 1, wherein the thickness of said carbon black coat is not more than 0.04 μm.

14. A magnetic recording medium according to claim 1, wherein said black magnetic acicular composite particles have an aspect ratio (average major axis diameter/average minor axis diameter) of 2:1 to 20:1.

15. A magnetic recording medium according to claim 1, wherein said black magnetic acicular composite particles have a BET specific surface area value of 16 to 160 m²/g.

16. A magnetic recording medium according to claim 1, wherein said black magnetic acicular composite particles have a blackness (L* value) of 15 to 23.

17. A magnetic recording medium according to claim 1, wherein said black magnetic acicular composite particles have a volume resistivity of not more than $1.0\times10^7$ Ω·cm.

18. A magnetic recording medium according to claim 1, wherein said black magnetic acicular composite particles have a geometrical standard deviation of major axis diameter of 1.01 to 2.0.

19. A magnetic recording medium according to claim 1, which further has a coercive force of 250 to 3500 Oe and a squareness residual magnetic flux density Br/saturation magnetic flux density Bm) of 0.85 to 0.95.

20. A magnetic recording medium according to claim 1, which further has a gloss of 150 to 300%, a surface roughness Ra of not more than 12.0 nm, and a linear absorption coefficient of coating film of 1.30 to 10.0 μm⁻¹.

21. A magnetic recording medium according to claim 1, which further has a surface resistivity of not more than $1.0\times10^{10}$ Ω/sq.

22. Black magnetic acicular composite particles for a magnetic recording medium, said black magnetic acicular composite particles having an average particle diameter of 0.051 to 0.72 μm, comprising:

magnetic acicular iron oxide particles which may contain Co, Al, Ni, P, Zn, Si or B, or may coat with cobalt or both cobalt and iron as magnetic acicular particles, a coating formed on surface of said magnetic acicular particles, comprising at least one organosilicon compound selected from the group consisting of:

(1) organosilane compounds obtainable from alkoxysilane compounds, (2) polysiloxanes or modified polysiloxanes, and (3) fluoroalkyl organosilane compounds obtainable from fluoroalkylsilane compounds, and a carbon black coat formed on said coating layer comprising said organosilicon compound, in an amount of 0.5 to 10 parts by weight based on 100 parts by weight of said magnetic acicular particles.

23. Black magnetic acicular composite particles according to claim 22, wherein said magnetic acicular particles are particles having a coat which is formed on at least a part of the surface of said magnetic acicular particles and which comprises at least one compound selected from the group consisting of hydroxides of aluminum, oxides of aluminum, hydroxides of silicon and oxides of silicon in an amount of 0.01 to 20% by weight, calculated as Al or SiO$_2$, based on the total weight of the magnetic acicular particles coated.

24. Black magnetic acicular composite particles according to claim 22, wherein the thickness of said carbon black coat is not more than 0.04 μm.

25. Black magnetic acicular composite particles according to claim 22, wherein said black magnetic acicular composite particles have an aspect ratio (average major axis diameter/average minor axis diameter) of 2:1 to 20:1, a BET specific surface area value of 16 to 160 m²/g, a blackness (L* value) of 15 to 23, a volume resistivity of not more than $1.0 \times 10^7$ Ω·cm, and a geometrical standard deviation of major axis diameter of 1.01 to 2.0.

26. Black magnetic acicular composite particles for a magietic recording medium, said black magnetic acicular composite particles having an average particle diameter of 0.051 to 0.72 μm, comprising:

magnetic acicular metal particles containing iron as a main component which contain Co, Al, Ni, P, Zn, Si, B or rare earth elements, or magnetic acicular iron alloy particles containing Co, Al, Ni, P, Zn, Si, B or rare earth elements, as magnetic acicular particles, a coating formed on surface of said magnetic acicular particles, comprising at least one organosilicon compound selected from the group consisting of:
(1) organosilane compounds obtainable from alkoxysilane compounds,
(2) polysiloxanes or modified polysiloxanes, and
(3) fluoroalkyl organosilane compounds obtainable from fluoroalkylsilane compounds, and
a carbon black coat formed on said coating layer comprising said organosilicon compound, in an amount of 0.5 to 10 parts by weight based on 100 parts by weight of said magnetic acicular particles.

27. Black magnetic acicular composite particles according to claim 26, wherein said magnetic acicular particles are particles having a coat which is formed on at least a part of the surface of said magnetic acicular particles and which comprises at least one compound selected from the group consisting of hydroxides of aluminum, oxides of aluminum, hydroxides of silicon and oxides of silicon in an amount of 0.01 to 20% by weight, calculated as Al or $SiO_2$, based on the total weight of the magnetic acicular particles coated.

28. Black magnetic acicular composite particles according to claim 26, wherein the thickness of said carbon black coat is not more than 0.04 μm.

29. Black magnetic acicular composite particles according to claim 26, wherein said black magnetic acicular composite particles have an aspect ratio (average major axis diameter/average minor axis diameter) of 2:1 to 20:1, a BET specific surface area value of 16 to 160 m²/g, a blackness (L* value) of 15 to 23, a volume resistivity of not more than $1.0 \times 10^7$ Ω·cm, and a geometrical standard deviation of major axis diameter of 1.01 to 2.0.

30. Black magnetic acicular composite particles according to claim 26, wherein said modified polysiloxanes are compounds selected from the group consisting of:
(A) polysiloxanes modified with at least one compound selected from the group consisting of polyethers, polyesters and epoxy compounds, and
(B) polysiloxanes whose molecular terminal is modified with at least one group selected from the group consisting of carboxylic acid groups, alcohol groups and a hydroxyl group.

31. Black magnetic acicular composite particles according to claim 26, wherein said alkoxysilane compound is represented by the general formula (I):

wherein $R^1$ is $C_6H_5$—, $(CH_3)_2CHCH_2$— or n-$C_bH_{2b+1}$— (wherein b is an integer of 1 to 18); X is $CH_3O$— or $C_2H_5O$—; and a is an integer of 0 to 3.

32. Black magnetic acicular composite particles according to claim 26, wherein said polysiloxanes are represented by the general formula (II):

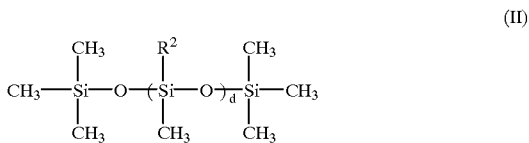

wherein $R^2$ is H— or $CH_3$—, and d is an integer of 15 to 450.

33. Black magnetic acicular composite particles according to claim 30, wherein said polysiloxanes modified with at least one compound selected from the group consisting of polyethers, polyesters and epoxy compounds are represented by the general formula (III), (IV) or (V):

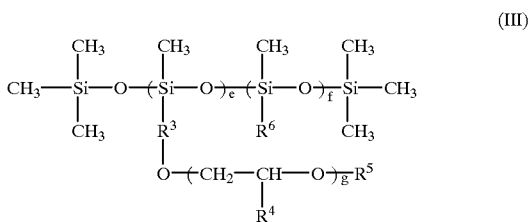

wherein $R^3$ is —$(-CH_2-)_h$—; $R^4$ is —$(-CH_2-)_i$—$CH_3$; $R^5$ is —OH, —COOH, —CH=$CH_2$, —$C(CH_3)$=$CH_2$ or —$(-CH_2-)_j$—$CH_3$; $R^6$ is —$(-CH_2-)_k$—$CH_3$; g and h are an integer of 1 to 15; i, j and k are an integer of 0 to 15; e is an integer of 1 to 50; and f is an integer of 1 to 300;

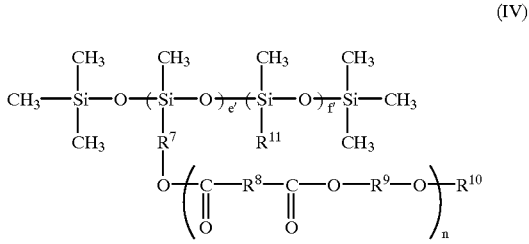

wherein $R^7$, $R^8$ and $R^9$ are—$(-CH_2-)_q$— and may be the same or different; $R^{10}$ is —OH, —COOH, —CH=$CH_2$, —$C(CH_3)$=$CH_2$ or —$(-CH_2-)_r$—$CH_3$; $R^{11}$ is —$(-CH_2-)_s$—$CH_3$; n and q are an integer of 1 to 15; r and s are an integer of 0 to 15; e' is an integer of 1 to 50; and f' is an integer of 1 to 300; or

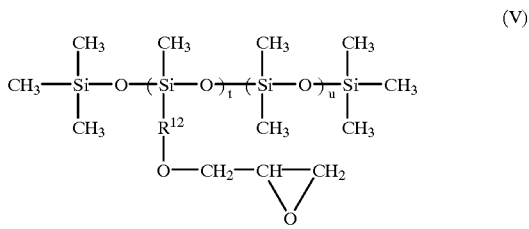

wherein $R^{12}$ is —$(-CH_2-)_v$—; v is an integer of 1 to 15; t is an integer of 1 to 50; and u is an integer of 1 to 300.

34. Black magnetic acicular composite particles according to claim 30, wherein said polysiloxanes whose molecular terminal is modified with at least one group selected from the group consisting of carboxylic acid groups, alcohol groups and a hydroxyl group are represented by the general formula (VI):

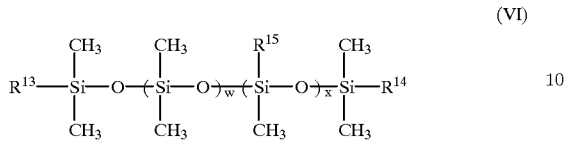
(VI)

wherein $R^{13}$ and $R^{14}$ are —OH, $R^{16}$OH or $R^{17}$COOH and may be the same or different; $R^{15}$ is —CH$_3$ or —C$_6$H$_5$; $R^{16}$ and $R^{17}$ are —(—CH$_2$—)$_y$—; y is an integer of 1 to 15; w is an integer of 1 to 200; and x is an integer of 0 to 100.

35. Black magnetic acicular composite particles according to claim 26, wherein said fluoroalkylsilane compounds are represented by the general formula (VII):

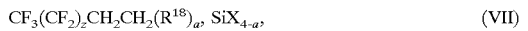
(VII)

wherein $R^{18}$ is CH$_3$—, C$_2$H$_5$—, CH$_3$O— or C$_2$H$_5$O—; X is CH$_3$O— or C$_2$H$_5$O—; and z is an integer of 0 to 15; and a' is an integer of 0 to 3.

36. Black magnetic acicular composite particles according to claim 26, wherein the amount of said coating organosilicon compounds is 0.02 to 5.0% by weight, calculated as Si, based on the total weight of the organosilicon compounds and said magnetic acicular particles.

37. In a method of forming a magnetic recording medium comprising a non-magnetic base film, and a magnetic recording layer comprising a binder resin and magnetic particles, the improvement comprising using as magnetic particles black magnetic acicular composite particles having an average particle diameter of 0.051 to 0.72 μm, comprising magnetic acicular particles,
a coating formed on surface of said magnetic acicular particles, comprising at least one organosilicon compound selected from the group consisting of:
(1) organosilane compounds obtainable from alkoxysilane compounds,
(2) polysiloxanes or modified polysiloxanes, and
(3) fluoroalkyl organosilane compounds obtainable from fluoroalkylsilane compounds, and
a carbon black coat formed on said coating layer comprising said organosilicon compound, in an amount of 0.5 to 10 parts by weight based on 100 parts by weight of said magnetic acicular particles.

38. The method according to claim 37, wherein said magnetic acicular particles are particles having a coat which is formed on at least a part of the surface of said magnetic acicular particles and which comprises at least one compound selected from the group consisting of hydroxides of aluminum, oxides of aluminum, hydroxides of silicon and oxides of silicon in an amount of 0.01 to 20% by weight, calculated as Al or SiO$_2$, based on the total weight of the magnetic acicular particles coated.

39. A method of producing a magnetic recording medium, comprising forming on a non-magnetic base film a magnetic recording layer comprising a binder resin and as magnetic particles black magnetic acicular composite particles having an average particle diameter of 0.051 to 0.72 μm, comprising magnetic acicular particles,
a coating formed on surface of said magnetic acicular particles, comprising at least one organosilicon compound selected from the group consisting of:
(1) organosilane compounds obtainable from alkoxysilane compounds,
(2) polysiloxanes or modified polysiloxanes, and
(3) fluoroalkyl organosilane compounds obtainable from fluoroalkylsilane compounds, and
a carbon black coat formed on said coating layer comprising said organosilicon compound, in an amount of 0.5 to 10 parts by weight based on 100 parts by weight of said magnetic acicular particles.

* * * * *